(12) United States Patent
Forzani et al.

(10) Patent No.: US 12,467,933 B2
(45) Date of Patent: Nov. 11, 2025

(54) BODY FLUID IRON LEVEL PANEL ANALYZER

(71) Applicants: Erica Forzani, Mesa, AZ (US); David Jackemeyer, Tempe, AZ (US); Michael Serhan, Tempe, AZ (US)

(72) Inventors: Erica Forzani, Mesa, AZ (US); David Jackemeyer, Tempe, AZ (US); Michael Serhan, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 919 days.

(21) Appl. No.: 17/616,562

(22) PCT Filed: Jun. 8, 2020

(86) PCT No.: PCT/US2020/036660
§ 371 (c)(1),
(2) Date: Dec. 3, 2021

(87) PCT Pub. No.: WO2020/247935
PCT Pub. Date: Dec. 10, 2020

(65) Prior Publication Data
US 2022/0236293 A1    Jul. 28, 2022

Related U.S. Application Data

(60) Provisional application No. 62/858,421, filed on Jun. 7, 2019.

(51) Int. Cl.
*G01N 33/90* (2006.01)
*B01L 3/00* (2006.01)
(Continued)

(52) U.S. Cl.
CPC ............ *G01N 33/90* (2013.01); *B01L 3/5023* (2013.01); *B01L 3/502715* (2013.01);
(Continued)

(58) Field of Classification Search
None
See application file for complete search history.

(56) References Cited

U.S. PATENT DOCUMENTS 5,719,138 A    2/1998 Thomas, Jr. et al.
6,368,866 B1 *  4/2002 Lawlor .................. G01N 33/90
                                                    436/526
(Continued)

FOREIGN PATENT DOCUMENTS

CN           103512929 B     8/2015

OTHER PUBLICATIONS

Mehta et al., WO 2019/094950 A1, 2019, whole document. (Year: 2019).*

(Continued)

*Primary Examiner* — Lore R Jarrett
(74) *Attorney, Agent, or Firm* — Polsinelli PC

(57) ABSTRACT

Provided herein are systems and methods of assessing a concentration of iron in a body fluid sample, such as whole blood. Systems include a highly stable, fast reacting, and accurate sensing area of a sensor for contacting with a body fluid sample, wherein upon contact, the body fluid sample causes a color change to the sensor that correlates with the concentration of iron in the body fluid sample. The disclosed systems and methods generate one or more signal outputs of light intensity data, from which the concentration of iron in the body fluid sample is determined.

4 Claims, 50 Drawing Sheets

(51) Int. Cl.
| | |
|---|---|
| G01N 21/77 | (2006.01) |
| G01N 21/78 | (2006.01) |
| G01N 21/84 | (2006.01) |
| G01N 33/52 | (2006.01) |
| G01N 33/80 | (2006.01) |
| G01N 33/84 | (2006.01) |

(52) U.S. Cl.
CPC ......... *G01N 21/78* (2013.01); *G01N 21/8483* (2013.01); *G01N 33/525* (2013.01); *G01N 33/80* (2013.01); *G01N 33/84* (2013.01); *B01L 2300/0654* (2013.01); *B01L 2300/069* (2013.01); *G01N 2021/7759* (2013.01); *G01N 2201/062* (2013.01)

(56) References Cited

U.S. PATENT DOCUMENTS

| | | | |
|---|---|---|---|
| 7,379,167 | B2 | 5/2008 | Mawhirt et al. |
| 2008/0206874 | A1* | 8/2008 | Manka ............... G01N 33/2888 436/2 |
| 2016/0080548 | A1* | 3/2016 | Erickson ............... G01N 21/80 382/128 |
| 2017/0224257 | A1 | 8/2017 | Rogers |
| 2018/0071243 | A1 | 3/2018 | Poradosu et al. |
| 2019/0004042 | A1* | 1/2019 | Erickson .......... G01N 33/54388 |
| 2019/0101549 | A1* | 4/2019 | Mehrpour ........ G01N 33/57415 |

OTHER PUBLICATIONS

Zou et al., CN 104483494 A, 2015, whole document. (Year: 2015).*
International Search Report and Written Opinion issued in corresponding Application No. PCT/US2020/036660 on Aug. 31, 2020, 8 pages.
Kaplan LA, Pesce AJ. Clinical Chemistry: Theory, Analysis, and Correlation. 1st ed. St. Louis, MO: C.V. Mosby Company; 1984.
Iron Deficiency Anaemia: Assessment, Prevention, and Control. World Health Organization. Report No. 1.3, 2001.
National Institute of Health. Iron. Available from: https://ods.od.nih.gov/factsheets/Iron-HealthProfessional/ [Accessed Nov. 8, 2018].
WebMD. Are you getting enough iron. Available from: https://www.webmd.com/baby/are-you-getting-enough-iron [Accessed Nov. 8, 2018].
Mei Z, Cogswell ME, Looker AC, Pfeiffer CM, Cusick SE, Lacher DA, Grummer-Strawn LM. Assessment of iron status in US pregnant women from the National Health and Nutrition Examination Survey (NHANES), 1999s2006s. The American journal of clinical nutrition. Mar. 23, 2011;93(6):1312-20.
McCance RA, Widdowson EM. The absorption and excretion of iron following oral and intravenous administration. The Journal of physiology. Oct. 14, 1938;94(1):148-54.
Worwood M. The laboratory assessment of iron statustan update. Clinica chimica acta. Mar. 18, 1997;259(1-2):3-23.
Kohgo Y, Ikuta K, Ohtake T, Torimoto Y, Kato J. Body iron metabolism and pathophysiology of iron overload. International journal of hematology. Jul. 1, 2008;88(1):7-15.
Mayo Clinic. Hemachromatosis. Available from: https://www.mayoclinic.org/diseases-conditions/hemochromatosis/symptoms-causes/syc-20351443 [Accessed Nov. 8, 2018].
Baker RD, Greer FR. Clinical ReporttDiagnosis and prevention of iron deficiency and iron-deficiency anemia in infants and young children (0s3 years of age). Pediatrics. Oct. 5, 2010:peds-2010.
Lozoff B, Jimenez E, Smith JB. Double burden of iron deficiency in infancy and low socioeconomic status: a longitudinal analysis of cognitive test scores to age 19 years. Archives of pediatrics & adolescent medicine. Nov. 1, 2006;160(11):1108-13.
Didukh SL, Muhina AN, Losev VN. Sorption-Photometric Determination of Iron (II) in Drinking Waters Using Titanium Dioxide Based Sorbents Modified with Polihexamethylene Guanidine, Ferrozine or Ferene S. Journal of Siberian Federal University. Chemistry. Jan. 1, 2015;8(1):35.
Hsieh YH, Hsieh YP. Kinetics of Fe (III) reduction by ascorbic acid in aqueous solutions. Journal of agricultural and food chemistry. May 15, 2000;48(5):1569-73.
Direct colorimetric method for iron determination in serum or plasma(Rep.). (n.d.). Wiener Lab.
Snell FD, Cornelia Snell T. Colorimetric methods of analysis. D. Van Nostrand Company, Inc; New York; 1954.
Liter energy battery Nokia BH-111 BH-214 Bluetooth headset battery 352030 200MAH lithium battery MP4 MP3 small toys. AliExpress. Available from: http://www.aliexpress.com/item/Liter-energy-battery-NOKIA-BH-111-BH-214-Bluetooth-headset-battery-352030-190MAH-lithium-battery-MP4/32829651640.html?ws_ab_test=searchweb0_0,searchweb201602_3_10152_10151_10065_10344_10130_10068_10324_10547_10342_10325_10546_10343_10340_10548_.
Anaemia. World Health Organization. Available from: http://www.who.int/topics/anaemia/en/ [Accessed Nov. 11, 2018].
Shin C, Baik I. Transferrin saturation concentrations associated with telomeric ageing: a population-based study. British Journal of Nutrition. Jun. 2017;117(12):1693-701.
Ramsay WN. The determination of the total iron-binding capacity of serum. Clinica chimica acta. Jun. 1, 1957;2(3):221-6.
Hennessy DJ, Reid GR, Smith FE, Thompson SL. Fereneta new spectrophotometric reagent for iron. Canadian journal of chemistry. Apr. 1, 1984;62(4):721-4.
TIBC. University of California San Francisco Health. Available from: https://www.ucsfhealth.org/tests/003489.html [Accessed Nov. 11, 2018].
Iron Absorption. Harvard information center for sickle cell and thalassemic disorders. Available from: http://sickle.bwh.harvard.edu/iron_absorption.html [Accessed Nov. 12, 2018].

* cited by examiner

200

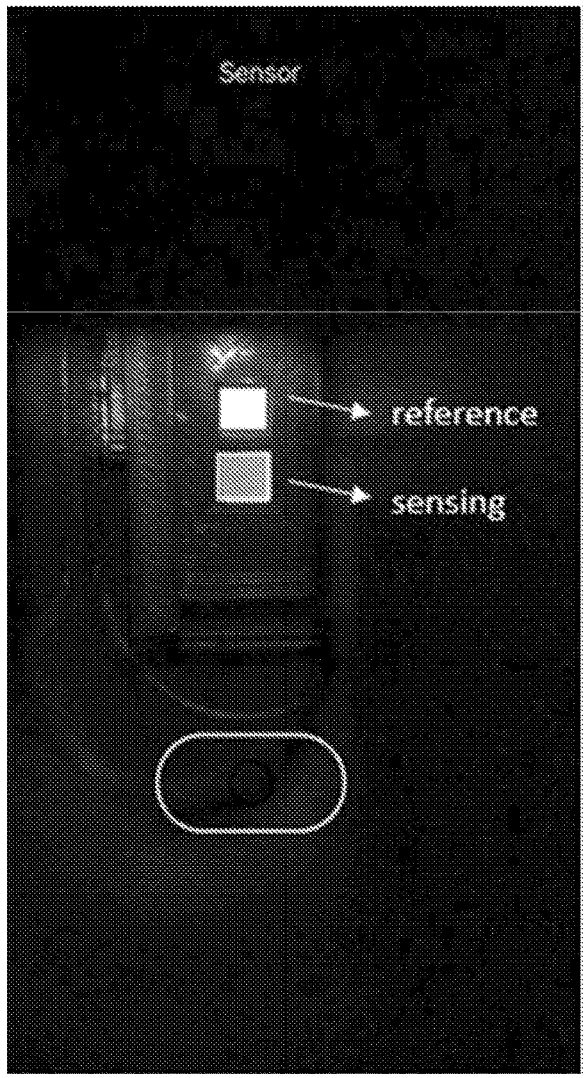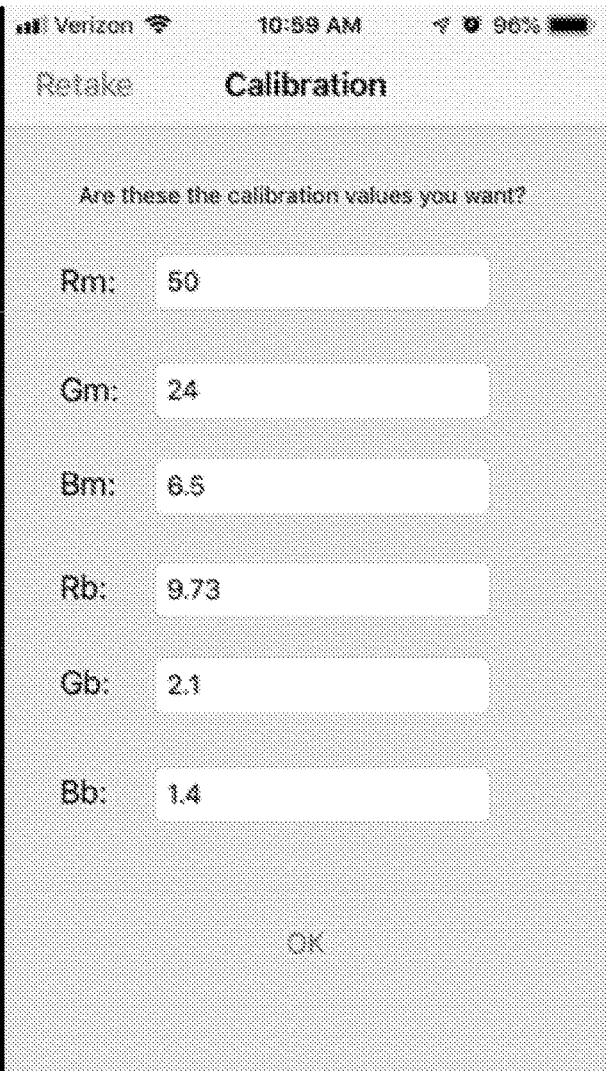
FIG. 5C                    FIG. 5D

|              |         |
|--------------|---------|
| 8            |         |
| Sensor R     | 52.998  |
| Sensor G     | 58.893  |
| Sensor B     | 60.27   |
|              |         |
| Ref R        | 68.972  |
| Ref G        | 74.056  |
| Ref B        | 73.292  |
|              |         |
| Hue          | 191.36  |
| Saturation   | 0.064   |
| Lightness    | 0.222   |
|              |         |
| Abs R        | 0.114   |
| Abs G        | 0.099   |
| Abs B        | 0.085   |

Save Results

FIG. 5E

| | | Red Signal | Red Reference | Red Absorbance |
|---|---|---|---|---|
| Day 1 | Average | 212.7 | 233.6 | 0.0407 |
| | Standard deviation | 1.1 | 0.5 | 0.0018 |
| Day 2 | Average | 210.1 | 236.3 | 0.0510 |
| | Standard deviation | 3.5 | 4.3 | 0.0018 |
| Day 3 | Average | 211.0 | 235.8 | 0.0508 |
| | Standard deviation | 7.1 | 7.6 | 0.0015 |

US 12,467,933 B2

BODY FLUID IRON LEVEL PANEL ANALYZER

CROSS-REFERENCE TO RELATED APPLICATIONS

This application is a U.S. National Stage Application of International Application No. PCT/US2020/036660, filed Jun. 8, 2020, which claims priority from U.S. Patent Application No. 62/858,421, filed Jun. 7, 2019, the contents of which are hereby incorporated by reference in their entirety.

FIELD

The present disclosure generally relates to measuring the concentration of iron in the blood. In particular, the present disclosure provides systems and methods for self-collecting and measuring iron concentration in a blood sample.

BACKGROUND

Iron deficiency, a leading cause of anemia, is one of the globe's top nutritional disorders according to the World Health Organization. Pregnant women, infants and young children, frequent blood donors, cancer patients, gastrointestinal disease patients, and patients with heart failures are the most at-risk populations for anemia. Hemochromatosis, on the other hand, is a genetic disorder characterized by an excess of iron. Hemochromatosis is currently a "silent" disease that destroys liver cells while causing progressively worse cirrhosis.

To diagnose anemia caused by iron deficiency, complete blood count (CBC) and hemoglobin is tested, along with tests for serum iron, serum ferritin, and transferrin levels/total-iron binding capacity (TIBC). Another test is the ratio of unsaturated transferrin iron to saturated transferrin iron. To diagnose hemochromatosis, the same tests are applied. However, these tests are costly, may take up to 24 hours to receive results, and are administered by licensed professionals.

It is with these observations in mind, among others, that various aspects of the present disclosure were conceived and developed.

SUMMARY

In one aspect, the present disclosure provides systems and methods for a sensor strip 100/200, (sometimes referred to herein as a "sensor" 100/200), that allows for processing, e.g., filtration of a body fluid sample 112 such as whole blood via a flow through a series of at least three membrane layers: a first layer 102/202 configured for receiving a whole blood sample and providing an evenly wetted surface; a second layer 106/206 configured for primary filtration of cellular components; and a third layer 108/208 configured for secondary filtration of cellular components, and comprising a sensing area. In one aspect, the first layer 102/202 includes a screening film 104/204; the second layer 106/206 is saturated with or otherwise comprises a first reagent for reducing iron (III) to iron (II) in the body fluid sample 112; and the sensing area of the third layer 108/208 is saturated with or otherwise comprises a second reagent for chelating iron (II) to form a chromogen complex, wherein formation of the chromogen complex causes a color change to the sensor that correlates with the concentration of iron in the body fluid sample 112. The system 100/200 can be configured for example for vertical flow of the body fluid 112 through the series of layers. The systems and methods 100/200 disclosed herein are configured for ease, rapidity and convenience of use in any of a range of point of care settings.

In another aspect, the present disclosure provides a system 100/200 for measuring the concentration of iron in a body fluid sample 112. The system 100/200 defines a sensor 100/200 including a first layer 102/202 operable to receive the body fluid sample 112. The body fluid sample 112 may have a volume of about 10 to about 200 µL. In one aspect, the first layer 102/202 includes a screening film 104/204. The sensor 100/200 includes a second layer 106/206 adjacent to the first layer 102/104, the second layer 106/206 being saturated with or otherwise comprising a first reagent for reducing iron (III) to iron (II) in the body fluid sample. The sensor 100/200 further includes a third layer 108/208 located adjacent to the second layer 106/206, the third layer comprising a sensing area 108/208A. The sensing area 108/208A is saturated with or otherwise comprises a second reagent for chelating iron (II) to form a chromogen complex, wherein formation of the chromogen complex causes a color change to the sensor 100/200 that correlates with the concentration of iron in the body fluid sample 112. In some aspects, the sensor 100/200 further includes a reference area 108/208A without a reagent modification included for providing a visual reference. The system further includes a fourth layer 110/210 operable as a detection sink.

In any of the disclosed systems and methods, the body fluid sample 112 may be any body fluid sample, such as any body fluid or blood sample containing red blood cells, and in one aspect is whole blood. In any of the disclosed systems 100/200, formation of the chromogen complex may cause a color change to the sensor 100/200 within a period of minutes, for example within about 5 minutes following contact of the body fluid sample 112 with the sensor 100/200. The color change can be quantified by measuring the absorbance of the sensor at 590-610 nm or in the range of the red absorption spectrum. The color change can be further correlated with the concentration of ferritin, hemoglobin, and/or a red blood cell count in the body fluid sample 112. In some aspects, the first reagent comprises a reducing agent, an acid, a chelating agent, or combinations thereof, and the second reagent comprises Ferene. In some aspects, the reducing agent is ascorbic acid, the acid is citric acid, and the chelating agent is thiourea. In some aspects of the system 100/200, the sensor 100/200 further includes a fifth layer saturated with iron and a sixth layer saturated with magnesium carbonate for measuring total iron binding capacity. The system further includes a device 400 for lighting the sensor 100/200 for reading with a light detector, comprising a window 402 for the light detector, a mechanism for receiving the sensor 100/200, and a plurality of LED lights 408.

Another aspect of the present disclosure, provides at least one non-transitory computer readable medium 300 storing instructions, which when executed by at least one processor 302, cause the at least one processor 302 to: receive light intensity data comprising light intensities from a sensing area 108/208A and a reference area 208B of a sensor 100/200 after a body fluid sample 112 is placed on the sensing area 108/208A of the sensor 100/200 and causes a color change to the sensor 100/200 that correlates with the concentration of iron in the body fluid sample 112; extract red-green-blue (RGB) component values or red spectrum light intensities from the light intensity data of the sensing area 108/208A and the reference area 208B; calculate the absorbance of the RGB component values or red spectrum light intensities for the sensing area 108/208A and the reference area 208B; and calculate iron concentration in the body fluid sample 112 in the sensing area 108/208A from the absorbance of the RGB component values or red spectrum light intensity for the sensing area 108/208A and reference area 208B. In one aspect of the invention, the processor 302 displays iron concentration, RGB values, absorbance values, hue, saturation, and/or lighting for the light intensity data and in some aspects, generates a report including at least the absorbance of the RGB component values for both the sensing area 108/208A and the reference area 208B and the iron concentration in the body fluid sample 112 for the light intensity data. In some aspects, the light intensity data comprises one or more images of the sensing area 108/208A and the reference area 208B.

The sensor 100/200 for use with the aforementioned non-transitory computer readable medium 300 storing instructions includes a first layer 102/202 including a screening film 104/204 operable to receive the body fluid sample 112, a second layer 106/206 adjacent to the first layer 102/202 and including a first reagent for reducing iron (III) to iron (II) in the body fluid sample 112, a third layer 108/208 adjacent to the second layer 106/206, the third layer 108/208 comprising a sensing area 108/208A comprising a second reagent for chelating iron (II) to form a chomogen complex and a reference area 208B without the second reagent, and a fourth layer 110/210 operable as a detection sink.

A further aspect of the present disclosure provides a method 600 of calculating a concentration of iron in a body fluid sample 112. The method 600 includes the steps of: placing 622 a body fluid sample 112 on a sensing area 108/208A of a sensor 100/200, where the body fluid sample 112 causes a color change to the sensor 100/200 that correlates with the concentration of iron in the body fluid sample 112; generating 624 light intensity data comprising light intensities of the sensing area 108/208A and a reference area 208B of the sensor 100/200; and calculating 630 the concentration of iron in the body fluid sample 112 in the sensing area 108/208A from an absorbance of RGB component values or red spectrum light intensities of the light intensity data for the sensing area 108/208A and reference area 208B. In some aspect, the method 600 further includes extracting 626 RGB components or red spectrum light intensities from the sensing area 108/208A and the reference area 208B; and calculating 628 the absorbance of the RGB component values or red spectrum light intensity for the sensing area 108/208A and the reference area 208B. In some aspects, the method 600 further includes displaying 610 the iron concentration, measuring total iron binding capacity in the sensing area 108/208A of the sensor 100/200, and calculating the concentration of ferritin, hemoglobin, and/or a red blood cell count in the body fluid sample 112.

Another aspect of the present disclosure provides a system 100/200 for measuring the concentration of iron in a body fluid sample 112, the system 100/200 comprising a series of at least three membrane layers. The three membrane layers comprise a first layer 102/202 comprising a screening film 104/204 and configured for receiving the body fluid sample 112, a second layer 106/206 adjacent to the first layer 102/202 and saturated with or otherwise comprising a first reagent for reducing iron (III) to iron (II) in the body fluid sample 112, and configured for primary filtration of cellular components in the body fluid sample 112, and a third layer 108/208 configured for secondary filtration of cellular components, and comprising a sensing area 108/208A saturated with or otherwise comprising a second reagent for chelating iron (II) to form a chromogen complex, wherein formation of the chromogen complex causes a color change to the sensor 100/200 that correlates with the concentration of iron in the body fluid sample 112. Each of the layers are configured for vertical flow of the body fluid sample 112 through the layers in series, and the body fluid sample 112 is whole blood.

BRIEF DESCRIPTION OF THE DRAWINGS

FIGS. 5A-5H show storyboard views of the app. FIG. 5A shows the homescreen in one embodiment. FIG. 5B shows user parameters for data collection in one embodiment. FIG. 5C shows camera positioning screen in one embodiment. FIG. 5D shows calibration values in one embodiment. FIG. 5E shows temporary data from each run in one embodiment. FIG. 5F shows data history in one embodiment. FIG. 5G shows result details of select run chosen from the history in one embodiment. FIG. 5H shows access to "Mail" to email CSV file of user-selected run(s) in one embodiment.

FIG. 6A shows an outside view; FIG. 6B shows a side view; FIG. 6C shows a top view; and FIG. 6D shows an inside view of a sensor and two light diffusion layers.

FIG. 26A shows absorbance vs. reaction time profile for 50 µg/dL and 100 µg/dL iron standards with 4 mM Ferene in the reaction media. FIG. 26B shows the corresponding absorbance derivative profile.

FIG. 27A shows absorbance vs. reaction time profile for 2 mM and 4 mM Ferene solutions with 100 µg/dL iron standard in the reaction media. FIG. 27B shows the corresponding absorbance derivative profile.

Corresponding reference characters indicate corresponding elements among the view of the drawings. The headings used in the figures do not limit the scope of the claims.

DETAILED DESCRIPTION

Figure 1A:
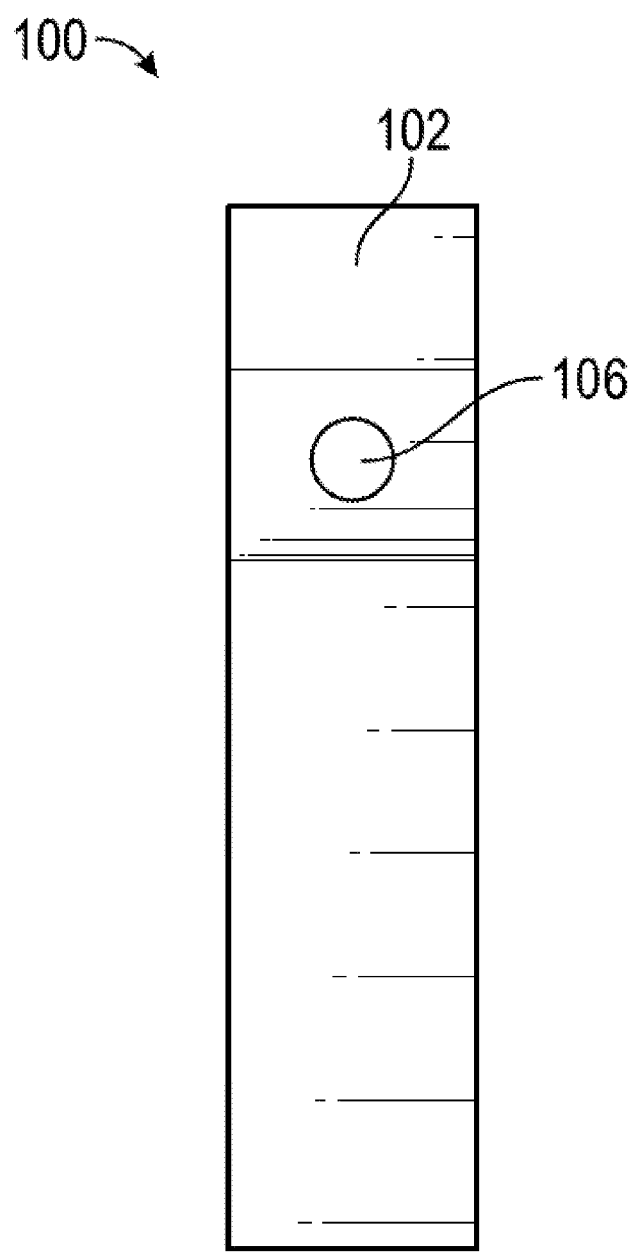
FIG. 1A shows a top view of a sampling port of a sensor strip with separated layers.
Figure 1B:
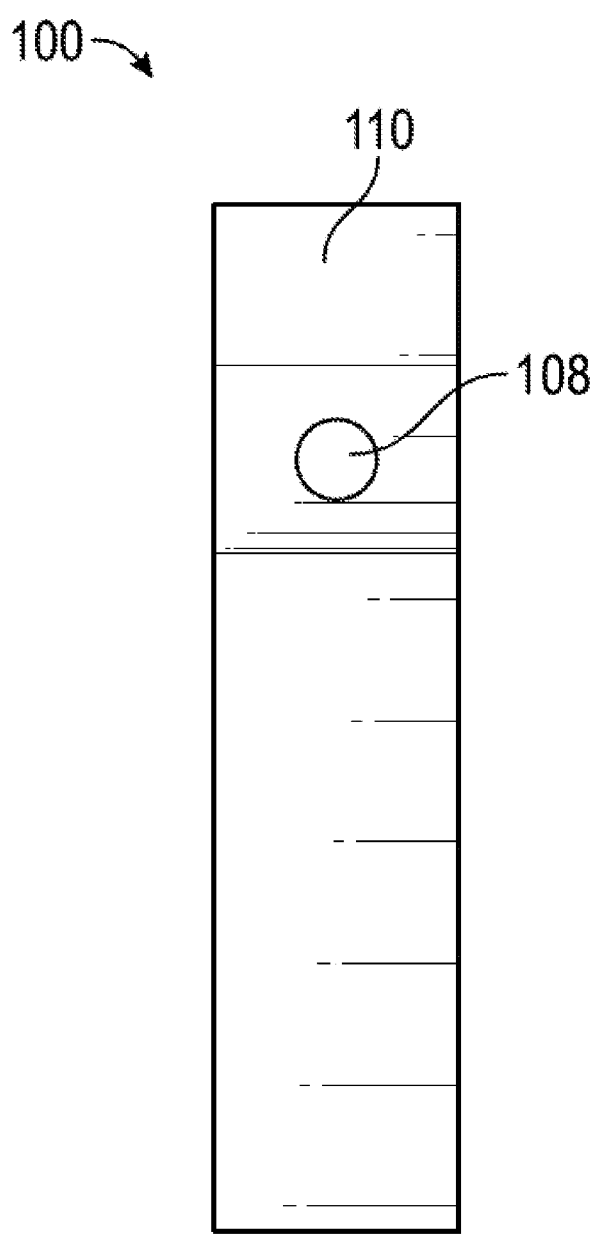
FIG. 1B is a top view of a top view of a detection sink of the sensor strip of FIG. 1C is a side view of the sensor strip.
Figure 1C:
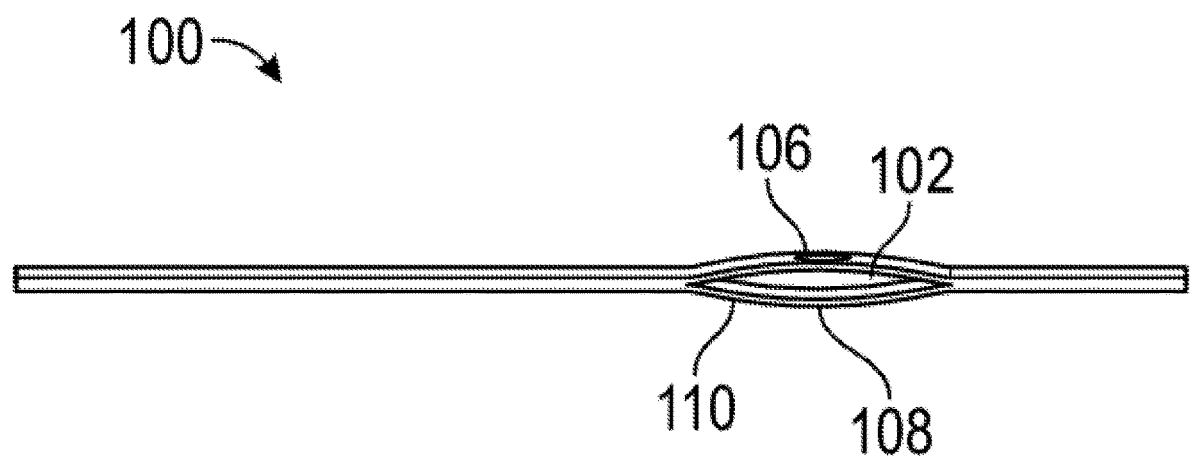
FIG. 1D is a sensor strip design with separated layers of the sensor.
FIG. 1E is a diagram of a sensor strip in one embodiment.
Figure 1D:
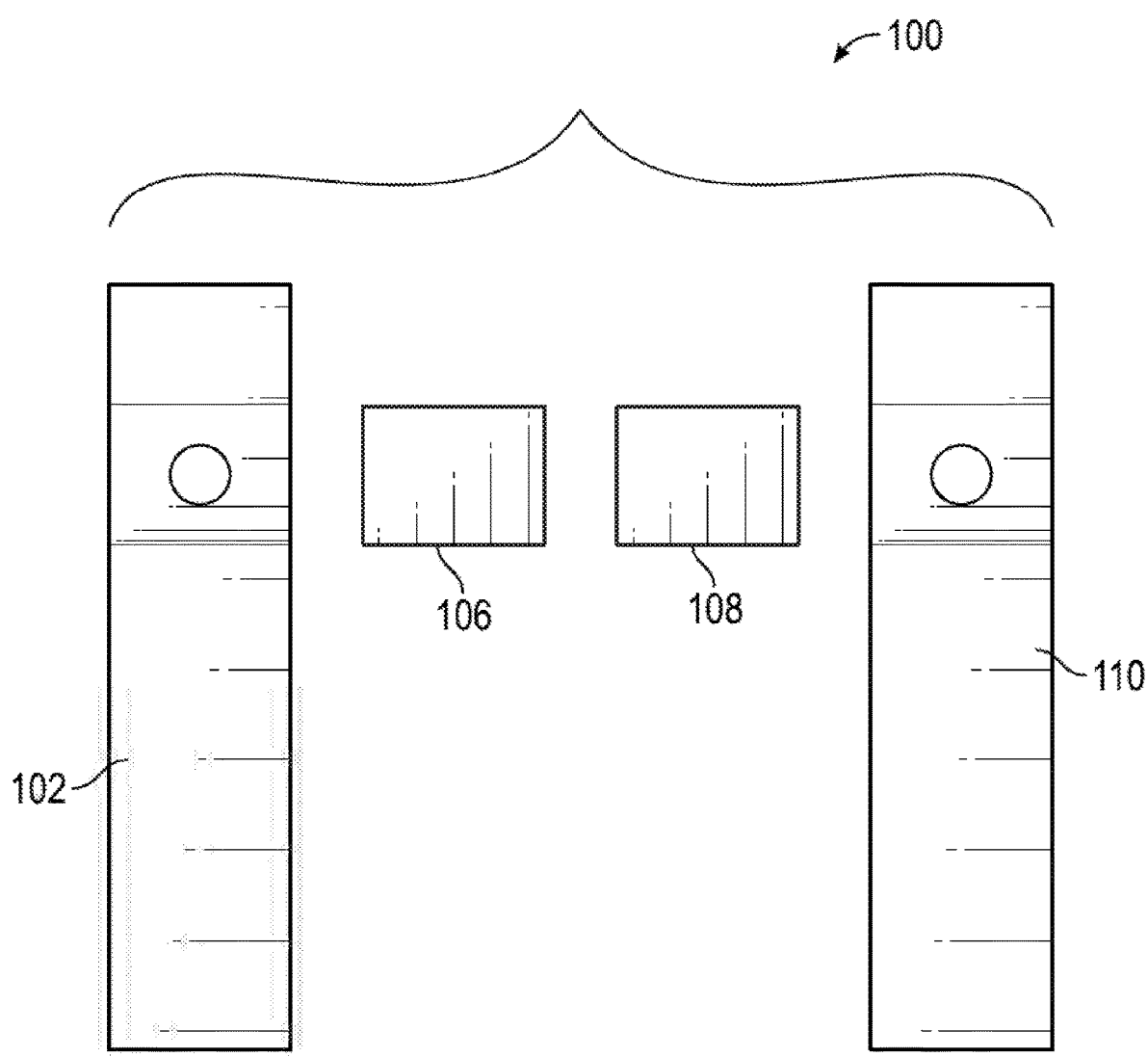
Figure 1E:
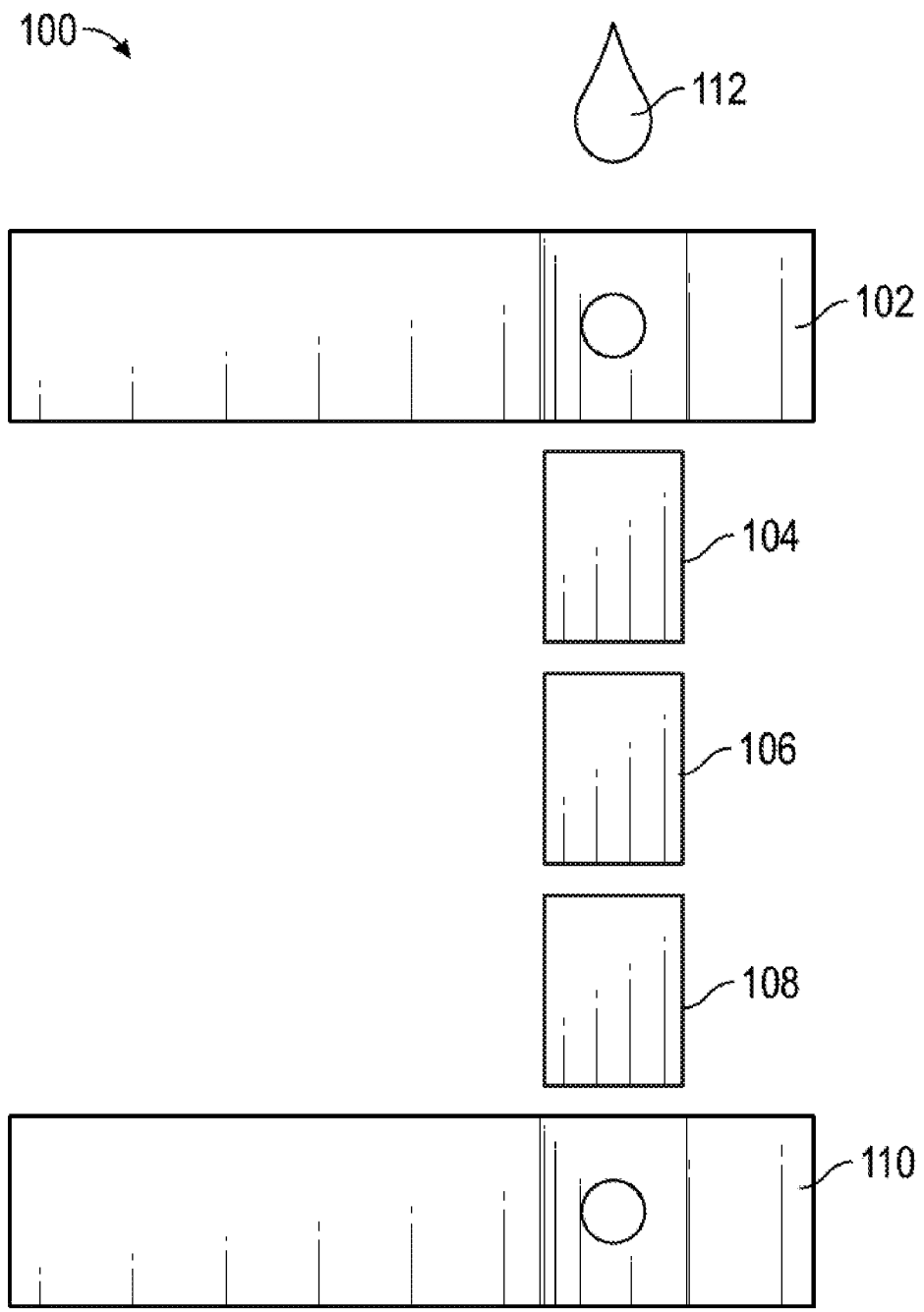

The present disclosure provides methods for quantifying the iron concentration from a body fluid sample, such as a blood sample, which may be for example a whole blood sample. The present disclosure also provides devices for provide consistent data collection from the body fluid sample. An advantage of the device and methods disclosed herein is that they are cheaper, more accessible, and provide results in a much shorter amount of time than currently used methods. Other features, advantages and aspects of the systems and methods of the present disclosure are described more thoroughly below.

Several definitions that apply throughout this disclosure will now be presented. As used herein, "about" refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result.

The term "comprising" means "including, but not necessarily limited to"; it specifically indicates open-ended inclusion or membership in a so-described combination, group, series and the like. The terms "comprising" and "including" as used herein are inclusive and/or open-ended and do not exclude additional, unrecited elements or method processes. The term "consisting essentially of" is more limiting than "comprising" but not as restrictive as "consisting of." Specifically, the term "consisting essentially of" limits membership to the specified materials or steps and those that do not materially affect the essential characteristics of the claimed invention.

Iron deficiency, a leading cause of anemia, is one of the globe's top nutritional disorders according to the World Health Organization. Hemochromatosis, on the other hand, is a genetic disorder characterized by an excess of iron. Current methods of measuring iron concentration, such as CBC and TIBC, are costly and take at least 24 hours to return results.

Colorimetric detection involves a change of color induced by the analyte in study. There are two methods of colorimetric analysis: non-enzymatic and enzymatic. Non-enzymatic methods do not require an enzyme to produce a change in color, as the name suggests. Enzymatic analysis requires an enzyme to cause a change in color (e.g. enzymelinked immunoabsorbent assay). The system and methods described herein utilize non-enzymatic colorimetric analysis due to its convenience and short time-to-results.

Provided herein is a system for measuring the concentration of iron in a body fluid sample. In some examples, the system may also detect ferritin, hemoglobin, and/or a red blood cell count in the body fluid sample. In some examples, the body fluid sample may be a blood sample. The system may be cheaper and more accessible than existing iron tests. The system may include a highly stable and robust sensor having a series of layers for receiving the body fluid sample and generating a colorimetric reaction such that the iron concentration in the body fluid sample may be quantified by image analysis.

In some examples, the system may further include a device for illuminating the sensor so that an accurate and consistent image of the sensor may be captured. For example, a reader device may include a 3D-printed box with a window for mobile device placement and white LED lights, to maintain constant illumination of the sensor. In some examples, the image is captured using a mobile device or a photodetector (light detector). For image capture, the system may further include image analysis software application to determine the red-green-blue (RGB) component values of the pixels in the image and calculate the resulting absorbance and iron concentration. In some examples, the software may be on the mobile device (e.g. phone). For example, a mobile application for users may take pictures or capture light intensities in a stand-alone device for the sensing and reference areas and calculate iron concentration based on the difference of RGB values or captured light intensities, which indicate iron absorbance, between the two regions. The system and resulting methods may be a point-of-care system or an at-home system that may take only 1-5 minutes to use and receive results.

If RGB values are measured by the system, a validation with standard RGB value extraction software is needed, and a calibration curve with analyte standards can be established between RGB absorbance and standard iron concentration and may be tested to ensure performance. In the application herein, the system and method correlation were 98% compared to standard methods, showing the system and method is accurate to be used in a non-professional setting. This timely and economically efficient sensor is estimated to cost significantly less than the standard iron body fluid test, opening up the door to more personalized and accessible healthcare.

FIGS. 1A-1E show a solid-phase sensor strip 100, sometimes referred to herein as a "sensor" 100, which allows for capillary action of the body fluid to the sensor, where a body fluid sample 112 then flows through multiple sensor layers. In some examples, the body fluid sample is a blood sample. In an embodiment, the sensor may include a first layer 102 having a screening film 104 operable to receive the body fluid sample, a second layer 106 adjacent to the first layer 102 having a first reagent for reducing iron (III) to iron (II) in the body fluid sample, a third layer 108 adjacent to the second layer 106 having a sensing area comprising a second reagent for chelating iron (II) to form a chromogen complex, as detailed further below, and a reference area without reagents, and a fourth layer 110 operable as a detection sink. In some examples, the screening film 104 may be separate from or integral with the first layer 102. In some examples, the second layer 106, and the third layer 108 may be separate from or integral with a single unit layer. When placed in contact with the sensor 100, the body fluid sample 112 causes a color change to the sensor by reacting with the first reagent and then the second reagent to form the chromogen complex, which manifests as a color change to the sensor 100 (or sensor 200 as detailed below), and the absorbance of the color change correlates with the concentration of iron in the body fluid sample. In some examples, the sensor may also provide a color change that correlates with the detection of ferritin, hemoglobin, and/or a red blood cell count.

Figure 2A:
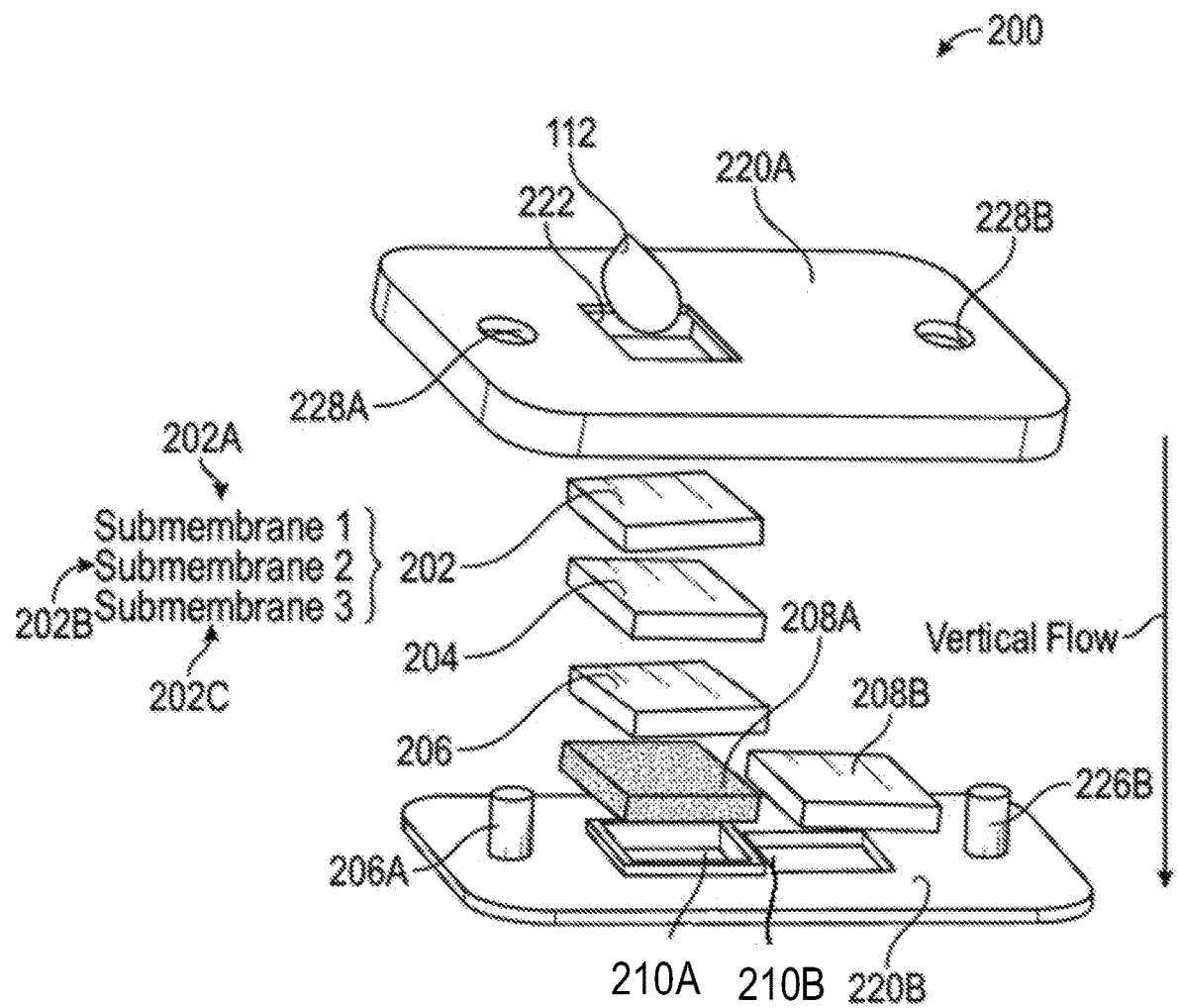
FIG. 2A is an exploded view showing an alternate embodiment of the sensor strip featuring a sensing substrate and a reference substrate.
Figure 2B:
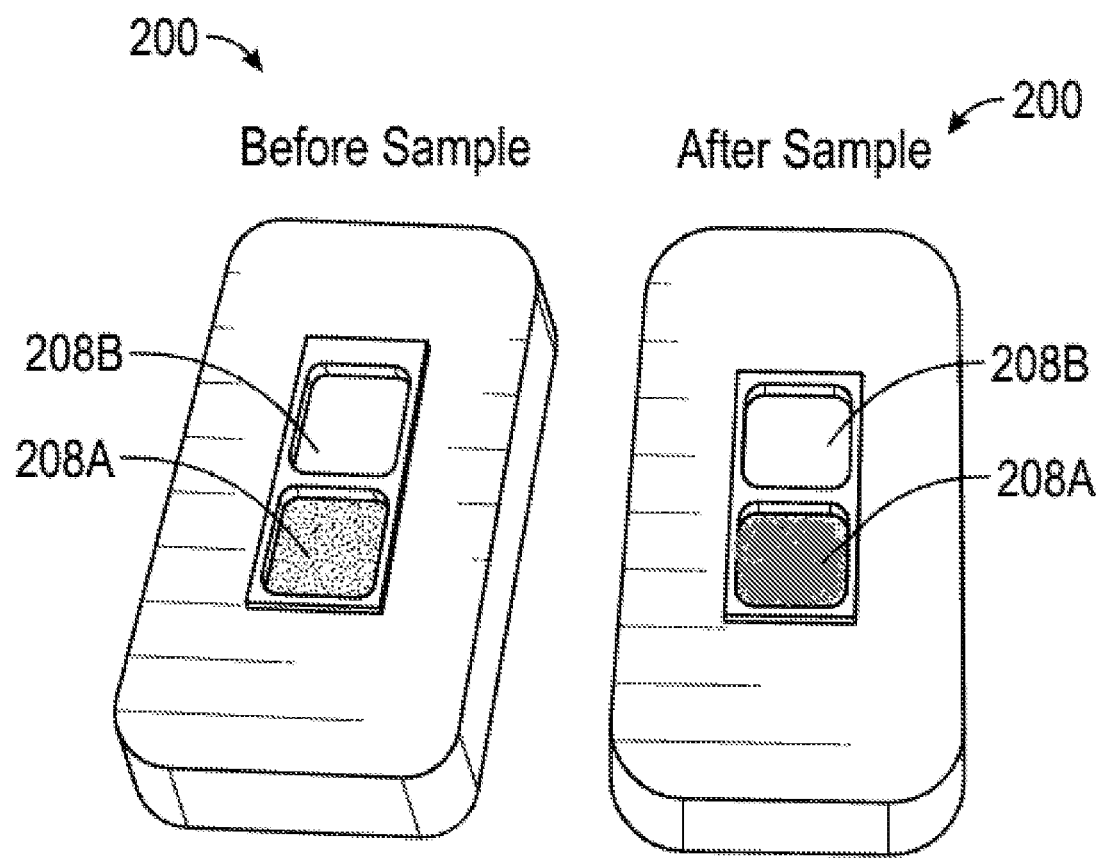
FIG. 2B shows a sensor strip design in another embodiment with images of sensing and reference substrates before and after sampling.
Figure 2C:
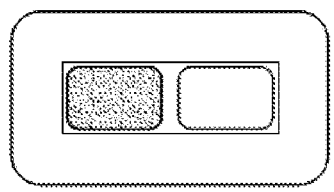
FIG. 2C shows a batch of mass produced sensors.
Figure 2C:
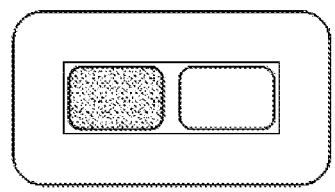
Figure 2C:
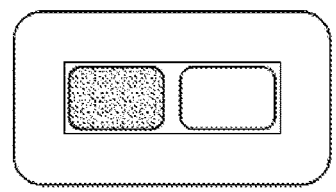
Figure 2C:
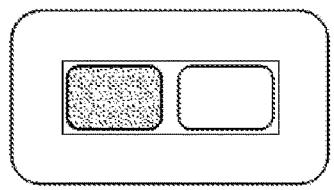
Figure 2C:
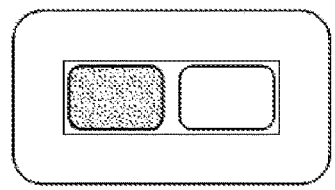
Figure 2C:
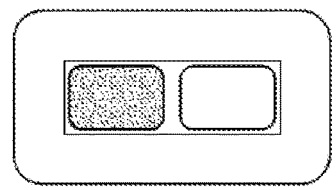
Figure 2C:
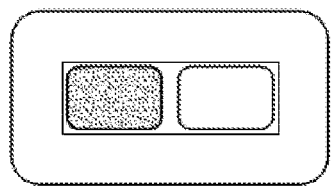
Figure 2C:
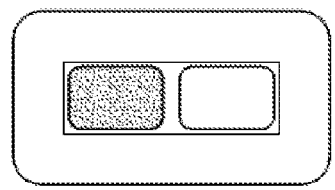
Figure 2C:
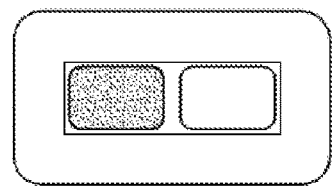

Referring to FIGS. 2A-2C, a second embodiment of the sensor strip 200, sometimes referred to herein as the "sensor" 200, is shown. in FIG. 2A, an exploded view of the sensor strip 200 shows a casing 220 enveloping a screening film layer 204, a first layer 202, a second layer 206 and a third sensing layer 208A. The sensor strip 200 further includes a reference layer 208B located adjacent to the third sensing layer 208A. In some aspect, the reference layer 208B does not provide the same color change as the sensing layer 208A and can thus provide a consistent reference point for data normalization when measuring RGB intensity of light reflecting from the sensing layer 208A. In FIG. 2B, two test sensors 200 are shown. The sensor 200 on the left shows an unused sensing layer 208A and a reference layer 208B. In contrast, the sensor on the right shows a used sensing layer 208A having reacted with the body fluid sample 112 and changed color. The used reference layer 208B on the right remains the same color as the unused reference layer 208B on the left. Referring to FIG. 2A, the casing 220 may be comprised of a first half 220A and a second half 220B. The first half 220A may include a back window 222 for receiving the body fluid sample 112 such that the layers 202, 204, 206 and 208 are saturated with the body fluid sample 112. The second half 220B includes a fourth layer 210 operable as a detection sink and a window for displaying the fluid 112 after passing through the sensing layer 208A and reference layer 208B.

Figure 15:
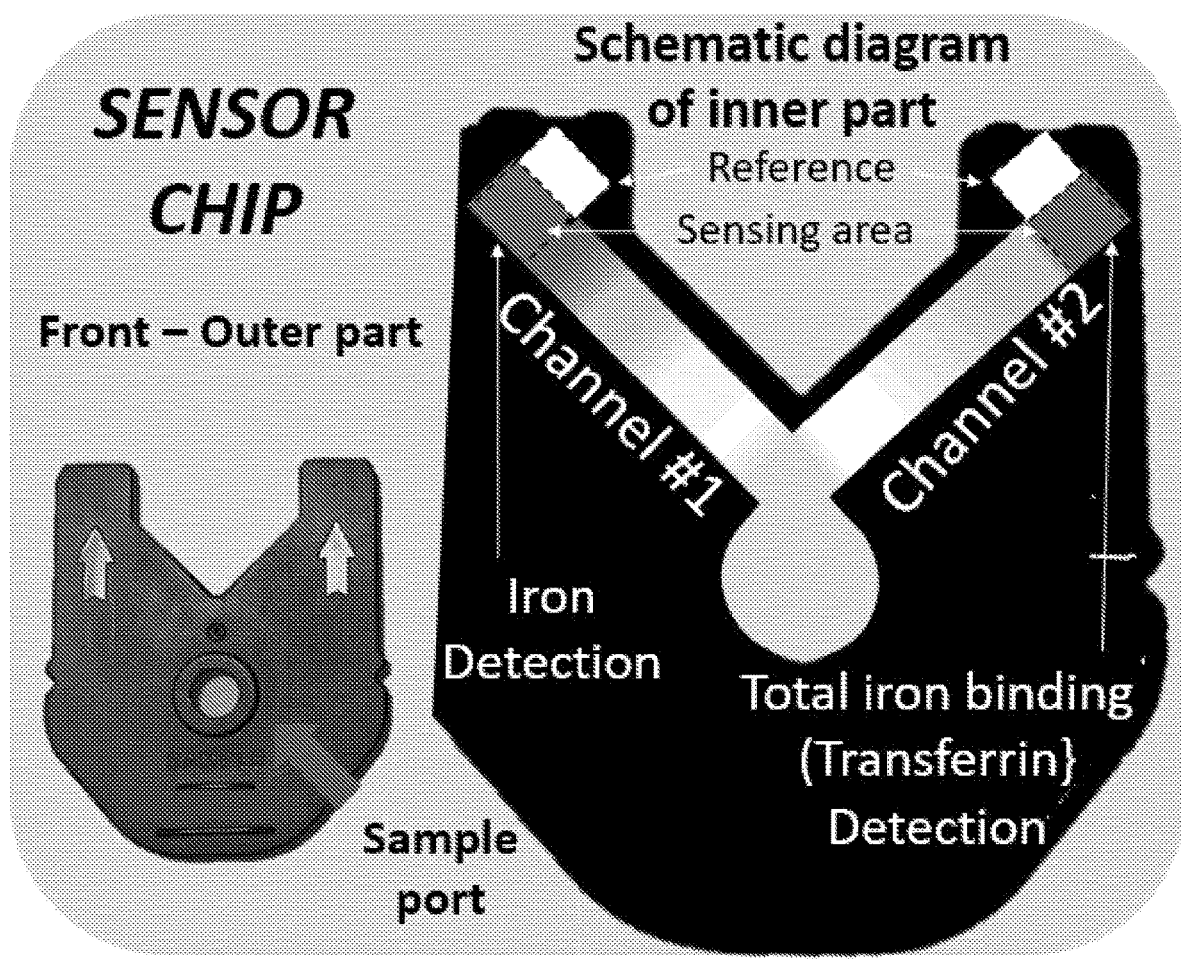
FIG. 15 shows a sensor layout for measuring simultaneously iron (channel #1), and TIBC (channel #2).

In some examples, the layers may be stacked vertically or laterally. The layers may be stacked vertically, so that a body fluid sample may flow vertically through the layers of the sensor 100/200 or may be arranged sequentially so the body fluid runs laterally as shown in FIG. 15. In some examples, the second layer 106/206 is integrated with the third layer 108/208 in a single layer.

The first layer 102/202 separates clear body fluid (e.g. plasma) from whole body fluid (e.g. blood). In an example, the first layer 102/202 may include multiple microchannel materials (e.g. a glass fiber pad) or any asymmetric fibrous material with different pore sizes throughout the material. The first layer 102/202 may also be impregnated with red blood cells agglutinating reagents such as poly, or di saccharides. The second layer 106/206 may include an absorbent saturated with the first reagent through which iron (III) is reduced to iron (II). Potential interferants, such as copper ions, are chelated with chelating agents such as thiourea in the second layer 106/206. In some examples, the second layer 106/206 may be non-stick dip fiber pads, nitrocellulose fibers or hydrophilic fibrous material saturated with the first reagent. The third layer 108/208 may include a thin paper-like material saturated with the second reagent through which iron (II) is chelated to form the chromogen complex, producing a blue color change. In some examples, the third layer 108/208 may be filter paper saturated with the second reagent. Other absorbing fibrous materials can be used for the second layer 106/206 and third layer 108/208. The second layer 106/206 may be merged with the third layer 108/208, which may provide a sensor having two layers: one layer to separate clean body fluid (e.g., plasma) from raw body fluid (e.g., whole blood), and the other layer embedded in both the reducing reagent, conditioning reagents (for pH and chelation) and the chromogen.

Figure 17:
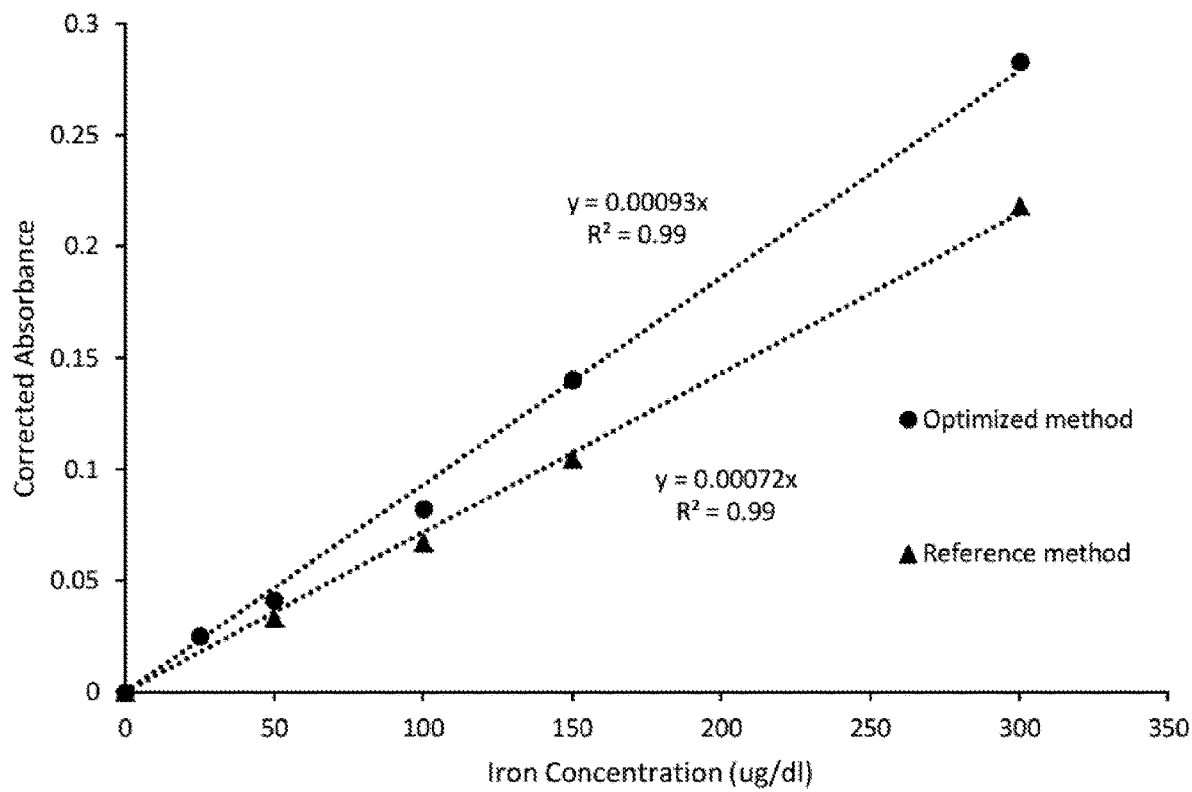
FIG. 17 illustrates the comparison of the calibration curves from a reference spectrophotometric method, which consists of a 5:1:1 volume ratio (reagent A:reagent B:iron standard) and gives a slope of 0.00072, with an optimized spectrophotometric method, which consist of a 3:1:1 volume ratio (reagent A:reagent B:iron standard), and the elimination of a surfactant component from the reference method, which produced false high absorbance readings.

The first reagent may be a reducing agent, an acid, a chelating agent, or combinations thereof. Non-limiting examples of the first reagent include ascorbic acid, citric acid, thiourea, and water. For example, the reducing agent may be ascorbic acid, the acid may be citric acid, and the chelating agent may be thiourea. Non-limiting examples of the second reagent include Ferene and water. Iron (II) may be chelated with Ferene to form a Ferene complex. In an example, the first reagent and second reagent may be present in the sensor in ratios between 3:1:1 to 5:1:1 volume ratio (first reagent:second reagent:body fluid) or higher 5+: 1:1. FIG. 17 shows the effect of the reagent-sample volume ratios of 5:1:1 (marked as reference) and 3:1:1 (marked as optimized) as an example the effect of changing the ratio of the reagent-sample volumes in the sensitivity of the iron detection response.

In an example, the body fluid sample may be a volume of about 10 μL to about 200 μL. In various examples, the body fluid sample may have a volume ranging from about 10 μL to about 50 μL, about 20 μL to about 75 μL, about 50 μL to about 100 μL, about 75 μL to about 150 μL, or about 100 μL to about 200 μL. The sensor may be about 9 mm by about 45 mm and the sensing area may be about 5 mm to 8.5 mm by about 5 mm to about 8.5 mm.

Figure 3:
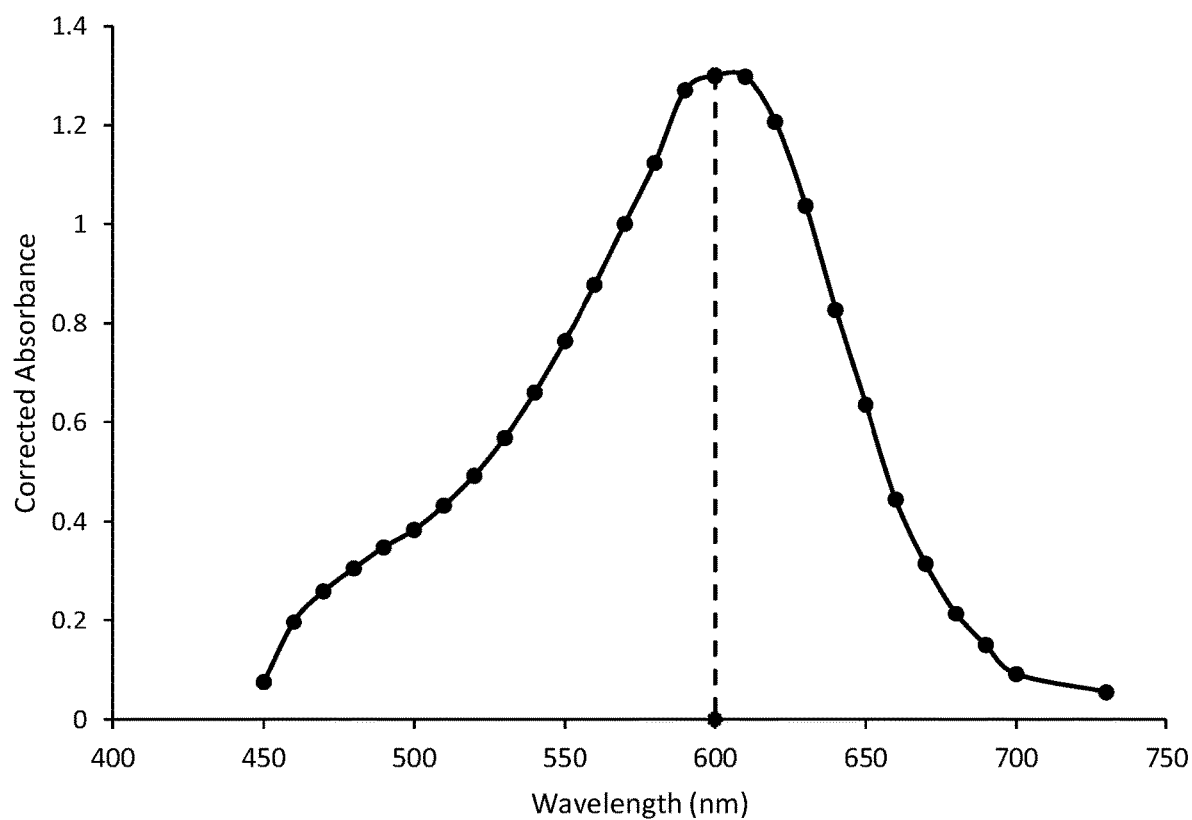
FIG. 3 shows the absorption spectrum of the iron detection complex: iron (II)—ferene complex.

When placed in contact with the first layer 102/202 of sensor 100/200, the body fluid sample causes a color change on the sensing area 108/208A of the sensor 100/200 within about 5 minutes. In various examples, the color change may occur within about 1 minute, about 2 minutes, about 5 minutes, or about 10 minutes. The color change may be quantified by measuring the absorbance of the sensor at 590-610 nm (FIG. 3). In an example, the absorbance may be determined from assessing the RGB component values of light intensity data (such as data from an image) of the sensor after a body fluid sample has been added and reacted with the sensor. In some examples, only the red component values may be analyzed because the red component is closest to the peak absorption for the Ferene complex. In some examples, the reflected light from the sensor may be captured by a filter-conditioned light detector of red light component. In some examples, a light emitting diode (LED) with red color may be used instead of a white light, and the reflected light from the sensor may be captured by a light detector.

In some aspect, the sensor may further include a fifth layer saturated with iron and a sixth layer saturated with magnesium carbonate for measuring total iron binding capacity (FIGS. 1A-1D and 15). In other aspect, the layers of the sensor may be layers within fluidic channels and the sensor may include more than one channel, such that one channel may react with the body fluid sample to measure iron concentration and one channel may react with the body fluid sample the measure total iron binding capacity, as seen in FIG. 15.

As seen in FIGS. 6A-6D and 8A-8B, the system may further include a device 400 for lighting the sensor 100/200 for reading with a light detector. In some examples, the light detector may be a camera or other detector on a mobile device. The device 400 may include a window 402 for the light detector or mobile device, a recess 404 for receiving the sensor 100/200, and a plurality of LED lights 408. The device may further include at least one diffuser 406 for diffusing the light from the plurality of LED lights 408. The device 400 may fully enclose the sensor 100/200 so that the plurality of LED lights 408 provides consistent lighting for capturing the image. The device 400 may include a controller 410 for operating the plurality of LED lights 408. The device 400 may also include a mobile device holder 420 including a gripping mechanism 422 to receive the mobile device 10 and provide for proper and consistent placement of the mobile device 10 in relation to the sensing area 108A and reference area 108B of the sensor 100/200.

Figure 9A:
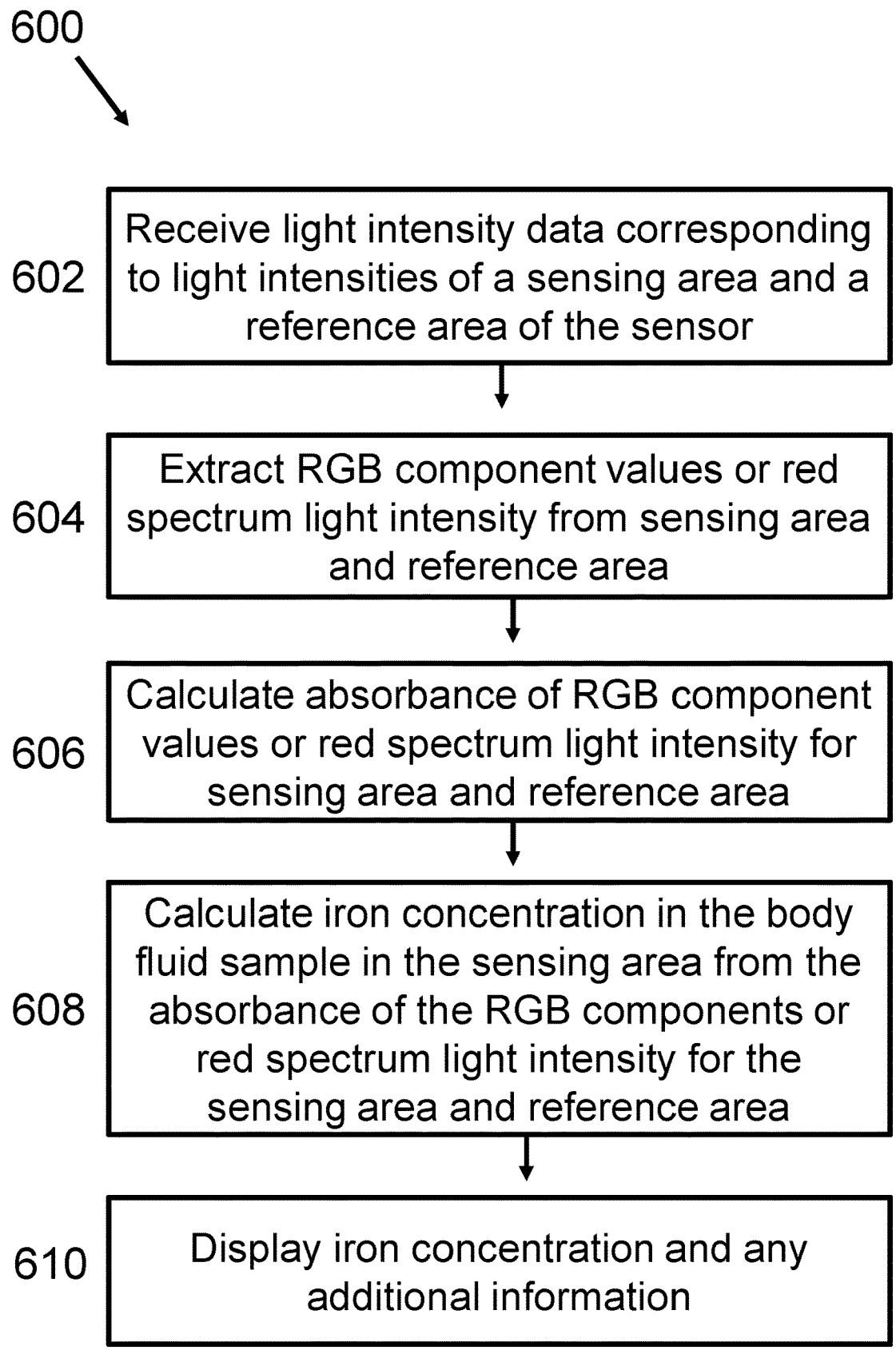
FIG. 9A shows a method for receiving light intensity data from the sensor and calculating iron concentration in the body fluid sample based on the light intensity data from the sensor.

Referring to FIG. 9A, further provided herein is at least one non-transitory computer readable medium storing instructions which when executed by at least one processor, cause the at least one processor to receive light intensity data comprising light intensities of a sensing area and a reference area of a sensor (block 602 of method 600); extract red-green-blue (RGB) component values or red spectrum light intensities from the sensing area and the reference area or light intensity (block 604); calculate the absorbance of the RGB component values or red spectrum light intensity for the sensing area and the reference area (block 606); and calculate iron concentration in the body fluid sample in the sensing area from the absorbance of RGB component or red spectrum light intensity for the sensing area and reference area (block 608). In an example, the light intensity data may be one or more images or data sets of a sensing area and a reference area of a sensor. In some examples, the light intensity data may be received after a body fluid sample is placed on the sensing area of the sensor and causes a color change to the sensor that correlates with the concentration of iron in the body fluid sample. In some examples, the light intensity data may also provide for detection of ferritin, hemoglobin, and/or a red blood cell count in the body fluid sample.

In an example, the at least one processor may further receive calibration values from a user. In another example, the at least one processor may display iron concentration, RBG values, absorbance values, hue, saturation, and/or light intensities for each image or light intensity data set (block 610). In other examples, the at least one processor may generate a report including at least the absorbance of the RGB component values or red-light intensity values for the sensing area and the reference area and the iron concentration in the body fluid sample for each image or light intensity data set.

In other examples, the application may use QR codes that encode the calibration values and increase user convenience. As a result, the at least one processer may receive an image from a QR scanner. Furthermore, the app may be used to calculate concentrations of multiple molecules as long as those molecules have verified calibration curves. QR codes that each correspond to a specific molecule's calibration data, which may be empirically determined, and may increase the versatility of the app.

Figure 9B:
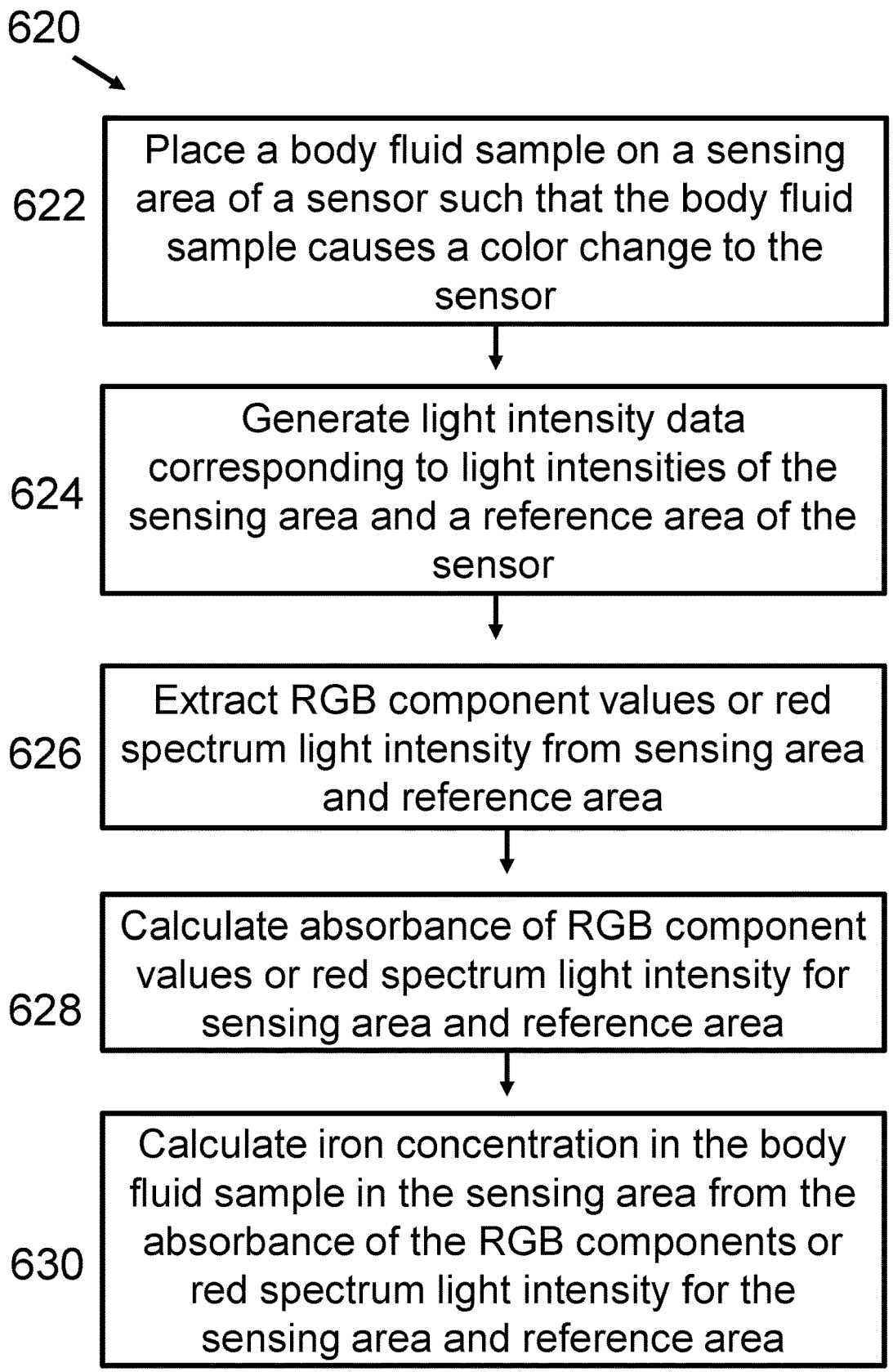
FIG. 9B shows a method for receiving a body fluid sample and calculating iron concentration in the body fluid sample using the sensor.

Also provided in FIG. 9B is a method 620 of calculating a concentration of iron in a body fluid sample 112. The method 620 may include placing a body fluid sample on a sensing area of a sensor, where the body fluid sample causes a color change to the sensor that correlates with the concentration of iron in the body fluid sample (block 622); generating light intensity data from one or more signal outputs of the sensing area and a reference area of the sensor (block 624); and calculating the concentration of iron in the body fluid sample in the sensing area from an absorbance of RGB component values or red light intensity values of the light intensity data for the sensing area and reference area (block 630). In an example, the signal output for the light intensity data includes one or more images or light intensity data sets.

In an example, the method may further include extracting RGB values from pixels from the sensing area and the reference area (block 626); averaging RGB component values of the pixels in the sensing area and the reference area; and calculating the absorbance of the RGB component values or red-light intensity for the sensing area and the reference area (block 628). In another example, the method may further include receiving calibration values from a user. In other examples, the method may further include displaying the iron concentration, RBG values, absorbance values, hue, saturation, and/or light intensity for each image or data set. The method may further include generating a report including at least the absorbance of the RGB component values or red-light intensity for the sensing area and the reference area and the iron concentration in the body fluid sample for each image. In other examples, the method may further include measuring total iron binding capacity in the sensing area of the sensor. In some examples, the method may also include calculating the concentration of ferritin, hemoglobin, and/or a red blood cell count in the body fluid sample.

Figure 16:
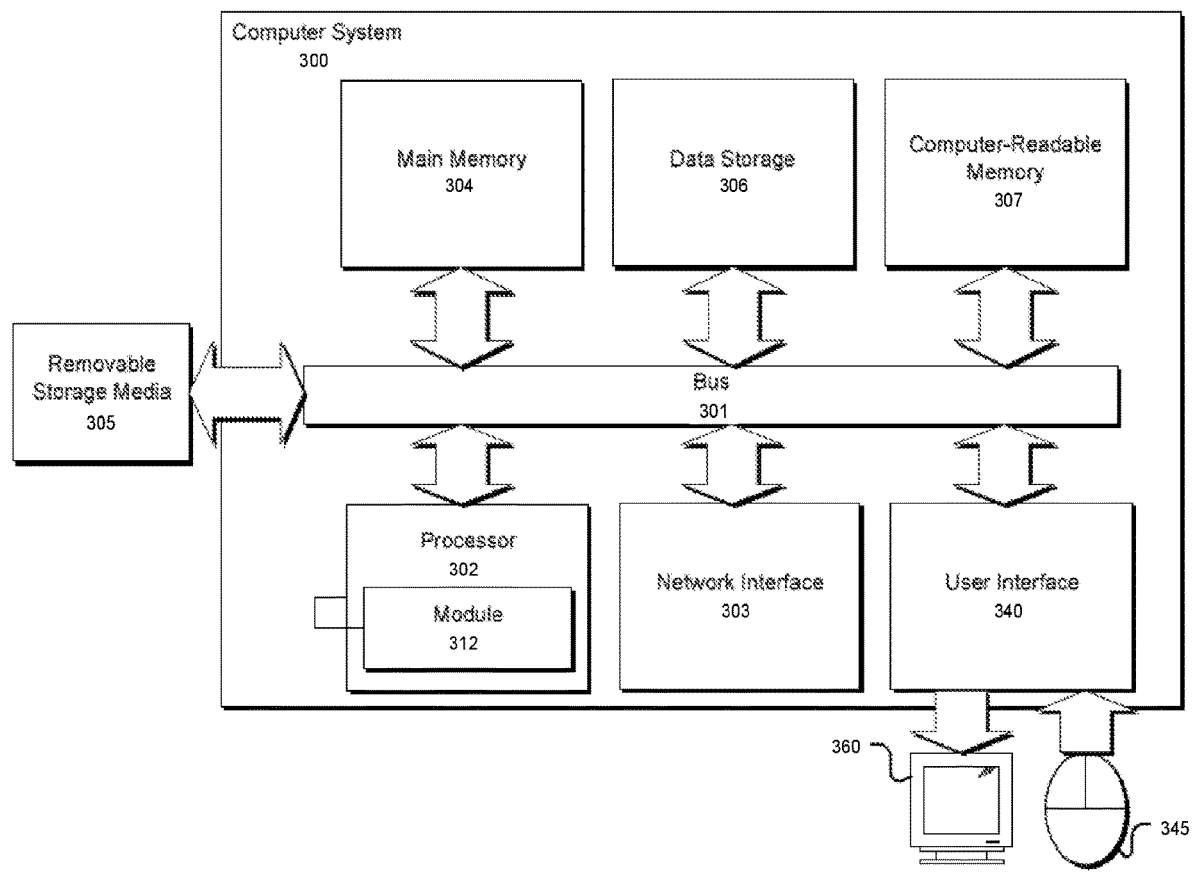
FIG. 16 illustrates an example of a suitable computing system used to implement various aspects of the present system and methods for measuring the concentration of iron in a body fluid sample.

FIG. 16 illustrates an example of a suitable computing system 300 used to implement various aspects of the present system and methods for measuring the concentration of iron in a body fluid sample. Example aspect described herein may be implemented at least in part in electronic circuitry, in stand-alone device executing firmware; in computer hardware executing firmware and/or software instructions; and/or in combinations thereof. Example aspect also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain aspect are described herein as including one or more modules 312. Such modules 312 are hardware-implemented, and thus include at least one tangible unit capable of performing certain operations and may be configured or arranged in a certain manner. For example, a hardware-implemented module 312 may comprise dedicated circuitry that is permanently configured (e.g., as a special-purpose processor, such as a field-programmable gate array (FPGA) or an application-specific integrated circuit (ASIC)) to perform certain operations. A hardware-implemented module 312 may also comprise programmable circuitry (e.g., as encompassed within a general-purpose processor or other programmable processor) that is temporarily configured by software or firmware to perform certain operations. In some example aspect, one or more computer systems (e.g., a standalone system, a client and/or server computer system, or a peer-to-peer computer system) or one or more processors may be configured by software (e.g., an application or application portion) as a hardware-implemented module 312 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering aspect in which hardware-implemented modules 312 are temporarily configured (e.g., programmed), each of the hardware-implemented modules 312 need not be configured or instantiated at any one instance in time. For example, where the hardware-implemented modules 312 comprise a general-purpose processor configured using software, the general-purpose processor may be configured as respective different hardware-implemented modules 312 at different times. Software may accordingly configure a processor 302, for example, to constitute a particular hardware-implemented module at one instance of time and to constitute a different hardware-implemented module 312 at a different instance of time.

Hardware-implemented modules 312 may provide information to, and/or receive information from, other hardware-implemented modules 312. Accordingly, the described hardware-implemented modules 312 may be regarded as being communicatively coupled. Where multiple of such hardware-implemented modules 312 exist contemporaneously, communications may be achieved through signal transmission (e.g., over appropriate circuits and buses) that connect the hardware-implemented modules. In aspect in which multiple hardware-implemented modules 312 are configured or instantiated at different times, communications between such hardware-implemented modules may be achieved, for example, through the storage and retrieval of information in memory structures to which the multiple hardware-implemented modules 312 have access. For example, one hardware-implemented module 312 may perform an operation and may store the output of that operation in a memory device to which it is communicatively coupled. A further hardware-implemented module 312 may then, at a later time, access the memory device to retrieve and process the stored output. Hardware-implemented modules 312 may also initiate communications with input or output devices.

As illustrated, the computing system 300 may be a general purpose computing device, although it is contemplated that the computing system 300 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 302, a main memory 304 (e.g., a system memory), and a system bus 301 that couples various system components of the general purpose computing device to the processor 302. The system bus 301 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 300 may further include a variety of computer-readable media 307 that includes removable/non-removable media and volatile/nonvolatile media but excludes transitory propagated signals. Computer-readable media 307 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 304 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 302. For example, in one embodiment, data storage 306 holds an operating system, application programs, and other program modules and program data.

Data storage 306 may also include other removable/non-removable, volatile/nonvolatile computer storage media. For example, data storage 306 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 300.

A user may enter commands and information through a user interface 340 or other input devices 345 such as a tablet, electronic digitizer, a microphone, keyboard, and/or pointing device, commonly referred to as mouse, trackball or touch pad. Other input devices 345 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 345 are often connected to the processor 302 through a user interface 340 that is coupled to the system bus 301 but may be connected by other interface and bus structures, such as a parallel port, game port or a universal serial bus (USB). A monitor 360 or other type of display device is also connected to the system bus 301 via user interface 340, such as a video interface. The monitor 360 may also be integrated with a touch-screen panel or the like.

The general purpose computing device may operate in a networked or cloud-computing environment using logical connections of a network interface 303 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN) but may also include other networks. Such networking environments are commonplace in offices, enterprise-wide computer networks, intranets and the Internet.

When used in a networked or cloud-computing environment, the general purpose computing device may be connected to a public and/or private network through the network interface 303. In such aspect, a modem or other means for establishing communications over the network is connected to the system bus 301 via the network interface 303 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

EXAMPLES

Example 1: Reagent Preparation

Iron bound to transferrin is released and reduced to iron (II) in the presence of ascorbic acid (H$_2$A) according to the following chemical reaction:

$$2Fe^{3+}+H_2A \rightarrow 2Fe^{2+}+A+2H^+ \quad (1)$$

The reduced iron reacts with a chromogen reagent, ferene, to form a blue-colored complex that can be detected at 590-610 nm (FIG. 3). The intensity of the color is directly proportional to the concentration of iron in the sample.

Two reagents were prepared, and their chemical compositions are shown in Tables 1 and 2. In reagent A, iron (III) is converted to iron (II). Iron (II) is then chelated to chromogen in reagent B.

TABLE 1

Chemical composition of reagent A

| Chemical Species | Function | Concentration |
|---|---|---|
| Ascorbic Acid | Reducing agent | 34 mM |
| Citric Acid | Acidic pH | 200 mM |
| Thiourea | $Cu^{2+}$ suppression | 100 mM |
| DI water | solvent | |

TABLE 2

Chemical composition of reagent B

| Chemical Species | Function | Concentration |
|---|---|---|
| Ferene | chromogen | 4 mM |
| DI water | solvent | |

Figure 18:
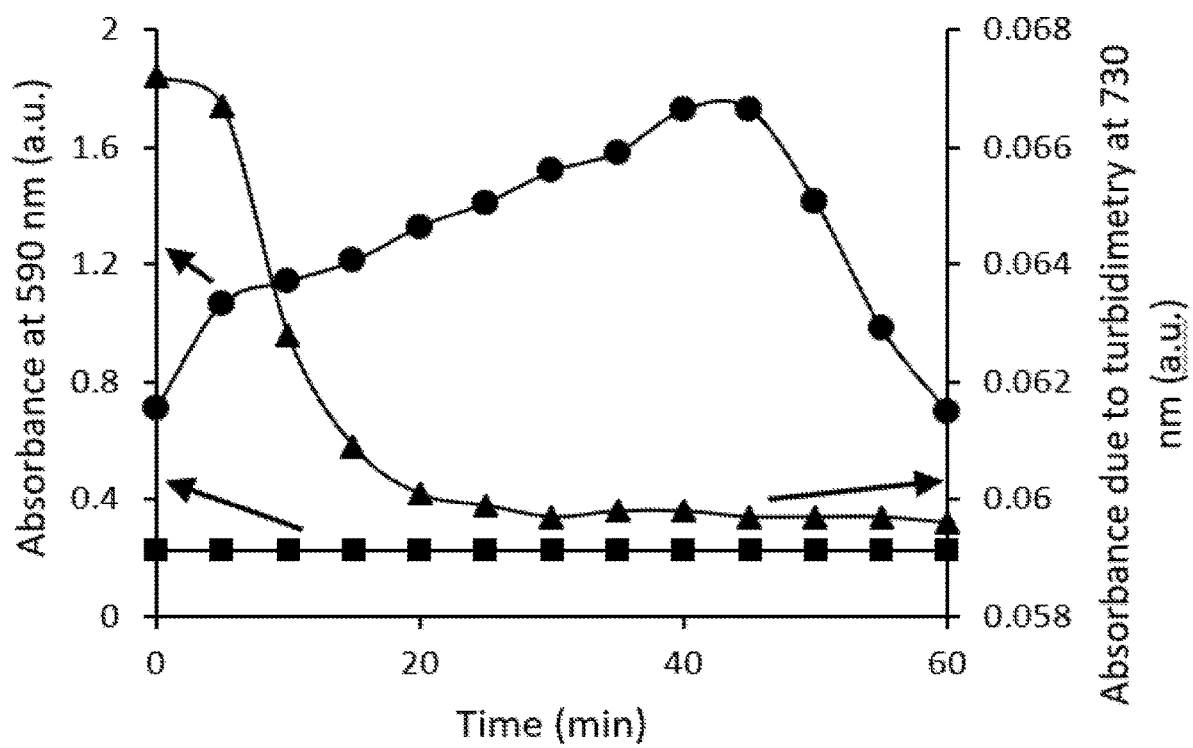
FIG. 18 illustrates on: Left y-axis: Profile of iron detection absorbance change at 590 nm vs time for a serum sample of 231 µg/dL total iron, using the reference spectrophotometric method (circles) and the optimized method (mentioned in FIG. 17) (squares), and on Right y-axis: Turbidimetry analysis—profile of absorbance change at an iron complex non-absorbing wavelength (730 nm) vs time for the same serum sample of 231 µg/dL total iron, using the reference method, (triangles). The non-null values of absorbance in the reference method as consequence of the precipitation of sample proteins with the surfactant used in the method. This significantly precluded from a rapid response to iron (45+ min time response needed).

A surfactant was not included in reagent A because it caused turbid samples in the presence of proteins. As seen in FIG. 18, even though absorbance from turbidity due to protein precipitation continually reduced, almost entirely by 60 minutes, the iron detection absorption due to turbidimetry effects were noted to be 3 times the expected absorbance values. Addition of surfactant that causes protein precipitation over-predicted iron concentrations, and thus no surfactant was used, as shown in Tables 1 and 2.

Example 2: Standard Preparation

Six different standards (Table 3) were prepared from a 1 g/L stock solution of iron (III) nitrate nano-hydrate with 0.5 M nitric acid. Adding nitric acid minimized hydroxyl formation and decreased pH for faster reduction kinetics with ascorbic acid.

TABLE 3

Standard concentrations

| Standards | Concentration (g/dl) |
|---|---|
| A | 50 |
| B | 150 |
| C | 300 |
| D | 500 |
| E | 750 |
| F | 1000 |
| G | blank |

Example 3: Sensor Design and Assembly

Liquid-phase analysis, which is the standard laboratory procedure for iron measurements from body fluid, requires draws (e.g. venous), sample processing by medical professionals, handling and shipping of the body fluid sample, and expensive instrumentation; thus, a cheaper alternative solid-phase sensor strip design was developed.

The solid-phase design allows for capillary action of the body fluid to the sensor, where the body fluid then flows through multiple sensing layers (FIG. 1, FIG. 2, FIG. 15, Table 4, Table 5). The top or upstream layer receives the body fluid in a screening film designed to separate cell-clean body fluid from whole body fluid (e.g. serum from whole blood). The second layer consists of an absorbent saturated with reagent A through which iron (III) is reduced to iron (II). Potential interferents, such as copper ions, are chelated with thiourea in the second layer as well. The final layer, which is attached to the detection sink, consists of a thin paper-like material saturated with reagent B through which iron (II) is chelated to form the chromogen complex, producing a blue color change. The final layer was divided into two sections: sensing and reference. The reference area, a blank not saturated with reagent B, was added to reduce glare and normalize readings taken from the sensor. An application (app) was then developed to quantify the color change and correlate the degree of color change to concentration of iron in body fluid. Body fluid samples required user-friendly, self-drawing capillary body fluid technology to obtain 20-30 µL samples for approximately 5-minute processing and rapid colorimetric analysis.

The reference method introduces 200 mM citric acid, 34 mM ascorbic acid, 100 mM thiourea, and surfactant (named "reagent A") to the standard or body fluid sample, followed by Ferene at >3 mM (named "reagent B"), with final volume ratios 5:1:1 (reagent A:reagent B: sample). Two issues with the reference method led to the so-called "optimized method": 1) an interest to increase sensitivity and 2) a need to reduce or eliminate protein precipitation during the incubation of serum samples. Increasing iron-containing sample and Ferene concentrations by simply reducing the "reagent A" volume toward 3:1:1 ratios was chosen. Table 4 shows the resulting final molar ratios of the "reference" and "optimized" method right before using spectrophotometer.

TABLE 4

Comparison of molar concentration ratios of reagents to iron for different analytical methods

| Reagent | Reference Method | Optimized Method | Sensor Strip Method |
|---|---|---|---|
| AA | $9.5 \times 10^3$ | $5.7 \times 10^3$ | $2.7 \times 10^3$ |
| Citric acid | $55 \times 10^3$ | $34 \times 10^3$ | $16 \times 10^3$ |
| Thiourea | $28 \times 10^3$ | $17 \times 10^3$ | $8.0 \times 10^3$ |
| Ferene | $2.2 \times 10^2$ | $2.2 \times 10^2$ | $3.2 \times 10^2$ |
| Iron | 1.0 | 1.0 | 1.0 |

Table 5 represents a description of examples of different alternatives of sensor components.

TABLE 5

Description of sensor components

| Material | Function |
|---|---|
| Polyvinyl film, plastic or glass | Sample port |
| Polysulfone membrane, glass fiber or hydrophilic asymmetric membranes | Body fluid separation |
| Nitrocellulose membrane such as blotting paper (Bio-Rad), hydrophilic membranes with good wetting properties | Saturated with reagent A |
| Filter paper or hydrophilic membranes with good wetting properties | Saturated with reagent B |
| Polyvinyl film, plastic or glass | Detection sink |

For example, in one sensor assembly, a polyvinyl plastic sheet was coated with a double-layered, easily-peeled adhesive. The polyvinyl plastic sheet was then cut into 9 mm by 45 mm rectangular sensor strips using a laser cutter (Universal Laser Systems). Each material was dipped in its proper reagent, and the dipped samples were placed in an oven at 55° C. for four hours. After the substrates were completely dry, the same laser cutter was used to cut each sample into 8.5 mm by 8.5 mm squares. The adhesive layer of the sensors was then peeled off, and each substrate was placed in its appropriate position on the sensor. Finally, the substrates were sandwiched together using the two strips. Given the materials used, the estimated cost for each sensor strip is less than $1. Instead of using the adhesive-plastic sheet system, sensor strips can be 3-D printed or made from mold with a plastic molding process.

Example 4: Detection Mechanism

Initial tests to find the absorption spectrum of the ferene complex were conducted using the spectrophotometer, the industry standard. The absorbance spectrum showed that the excitation wavelength of iron is about 600 nm (FIG. 3). So, Light Emitting Diodes (LEDs) with excitation wavelengths in the range of 600 nm (red-light intensity) or light detectors filtering other wavelengths, except in the range 600 nm may be used as part of the detection mechanism.

Figure 4:
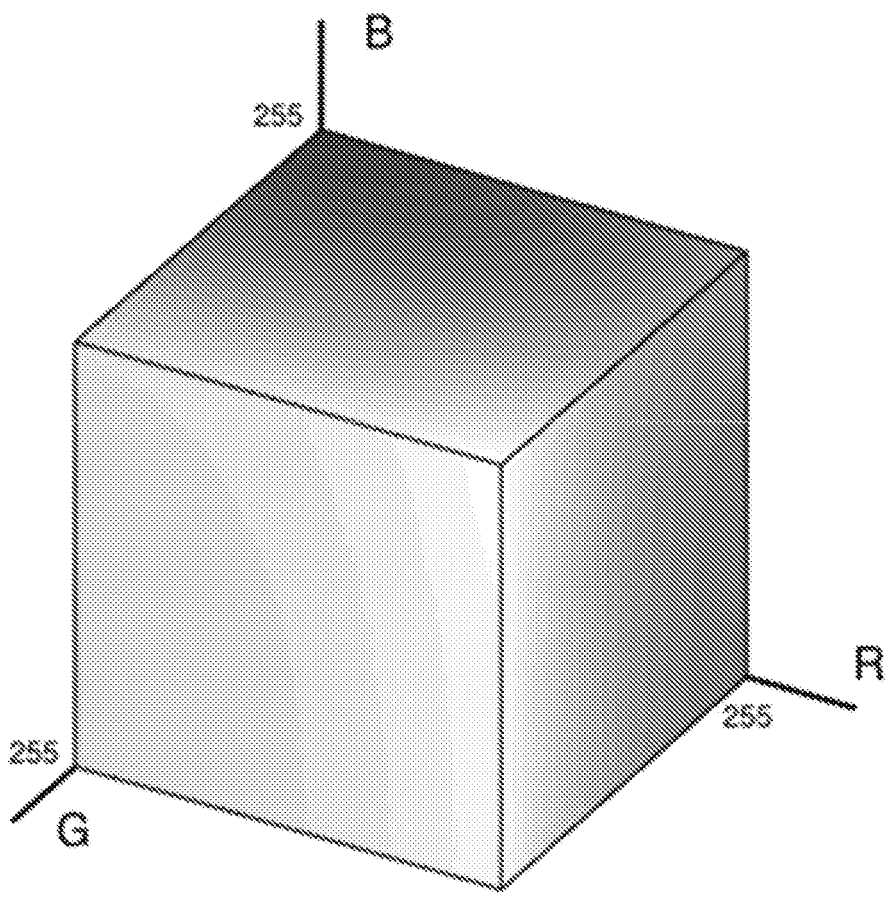
FIG. 4 shows the RGB colorspace.

On the other hand, RGB is one of the most commonly-used vector systems to define color (FIG. 4). Values for each component of RGB range from 0 to 255, with (0, 0, 0) being black and (255, 255, 255) being white. However, the green and blue component of the RGB vector were disregarded in this project because the red (620 nm-660 nm) component is closest to the peak absorption (600 nm) in the absorption spectrum of the Ferene complex (FIG. 3).

Example 5: Application Development

Storyboard setup was developed to simplify user navigation (FIG. 5). Users first take a picture of the sensor after it has changed color and then enter calibration values based on empirical calibration curves. The sensor then returns the iron concentration based on the calibration values, which represent the coefficients of the calibration curves obtained later in this report.

Figures 5A, 5B:
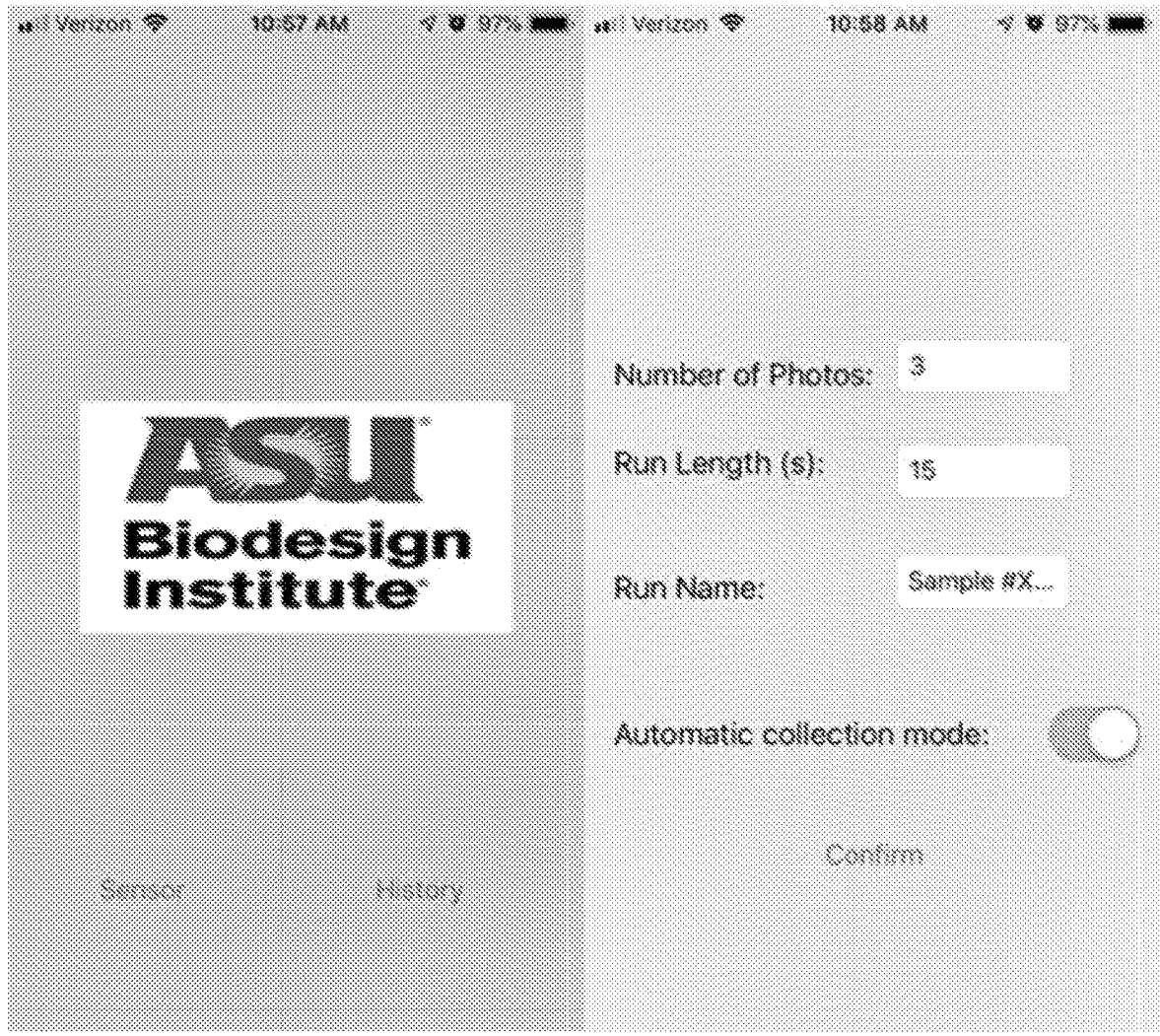
Figure 5F:
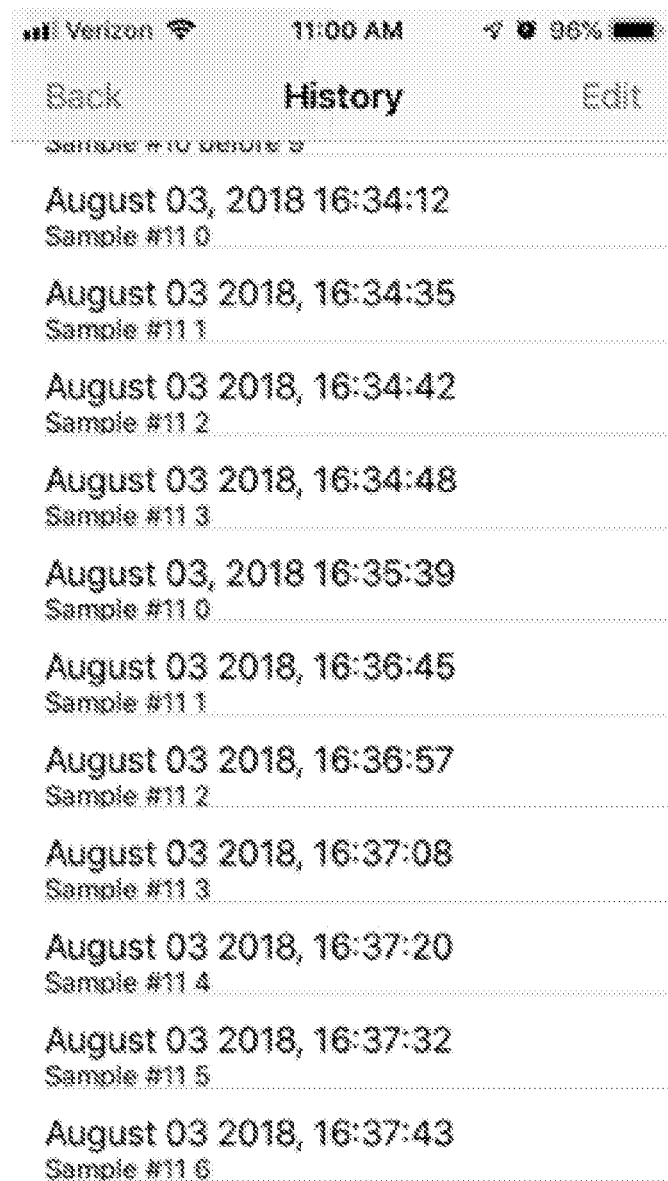

Two boxes outlined in yellow (sensor) and blue (reference) mark the sensing and reference areas of the sensor. The user must move the phone to align the sensing and reference areas with the colored boxes, as seen in FIG. 5C. No manual adjustment may be needed for a reader with a mobile device mount. After the user takes the picture, the picture is converted from a user interface image to a core graphics image, the image form that the software can modify. The app then extracts the pixels from the area defined by the boxes and averages the RGB component values of the pixels in the area. After image processing is complete, the app calculates the absorbance of each RGB component using the following equation:

$$\text{absorbance } R = -\log \frac{\text{Sensor R}}{\text{Reference R}} \tag{2}$$

Figure 5G:
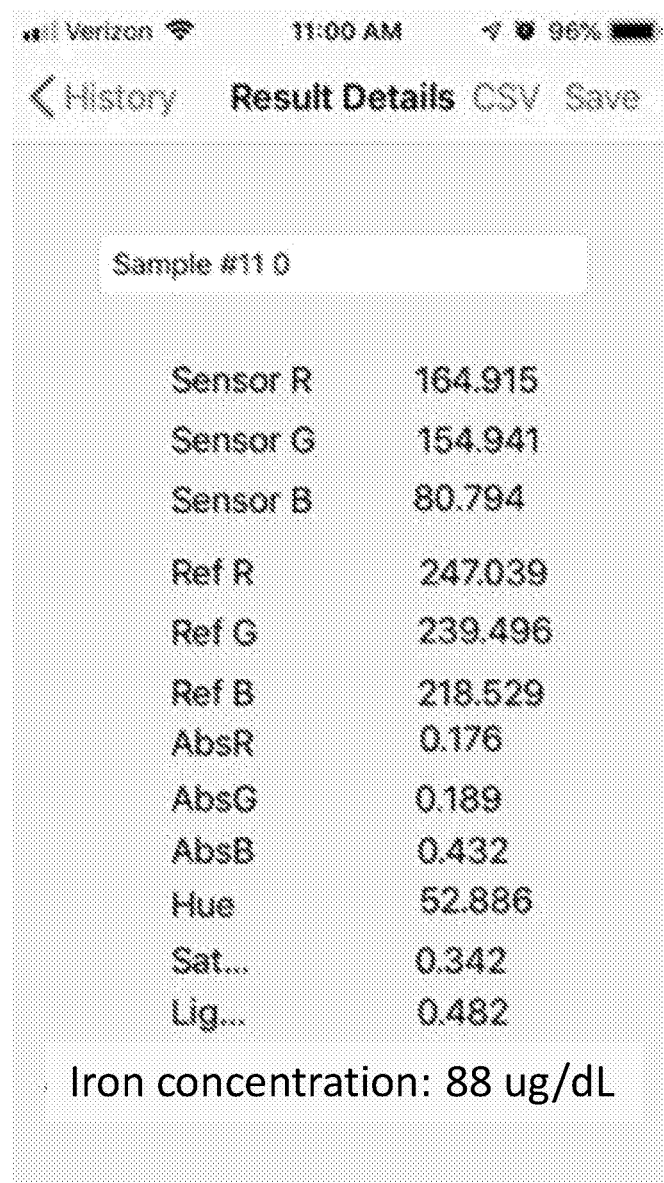
Figure 5H:
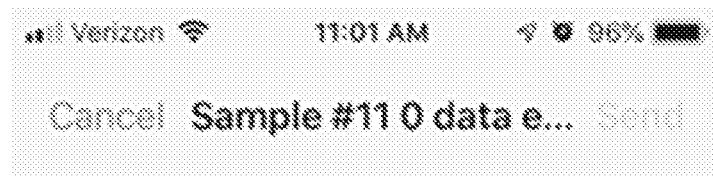
Figure 5H:
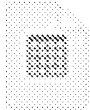
Figure 6A:
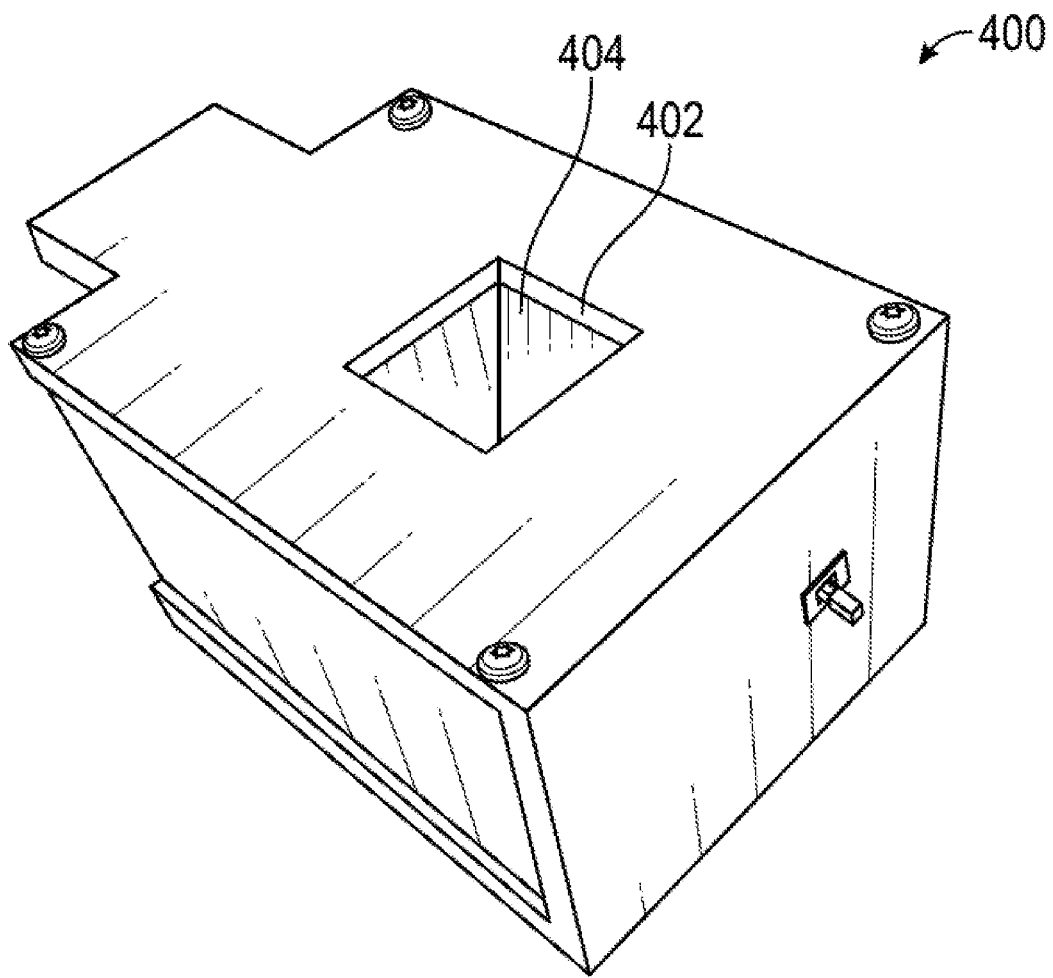
FIGS. 6A-6D shows a detection chamber design in one embodiment.
Figure 6B:
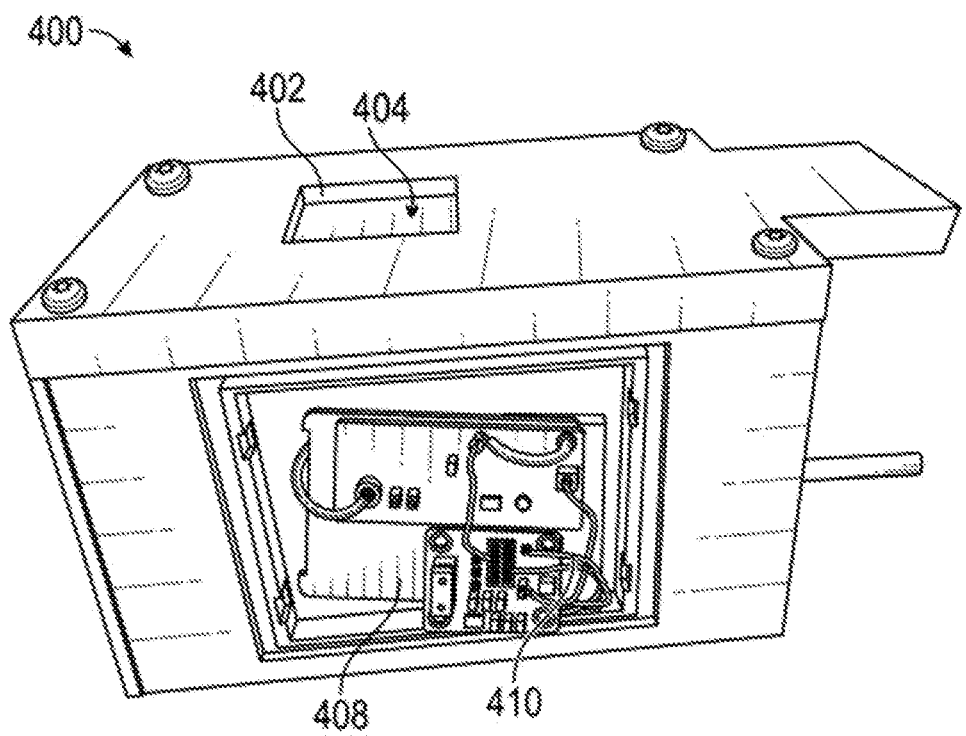
Figure 6C:
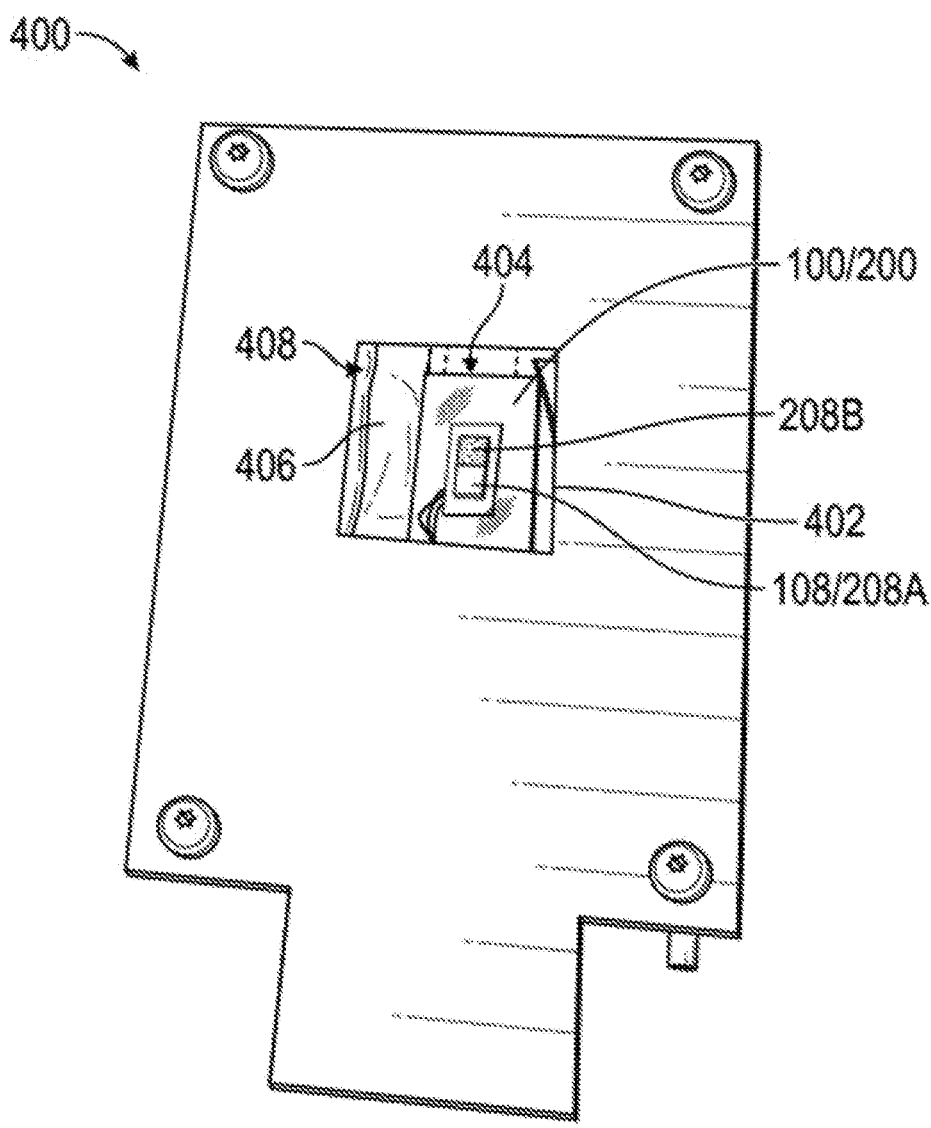
Figure 6D:
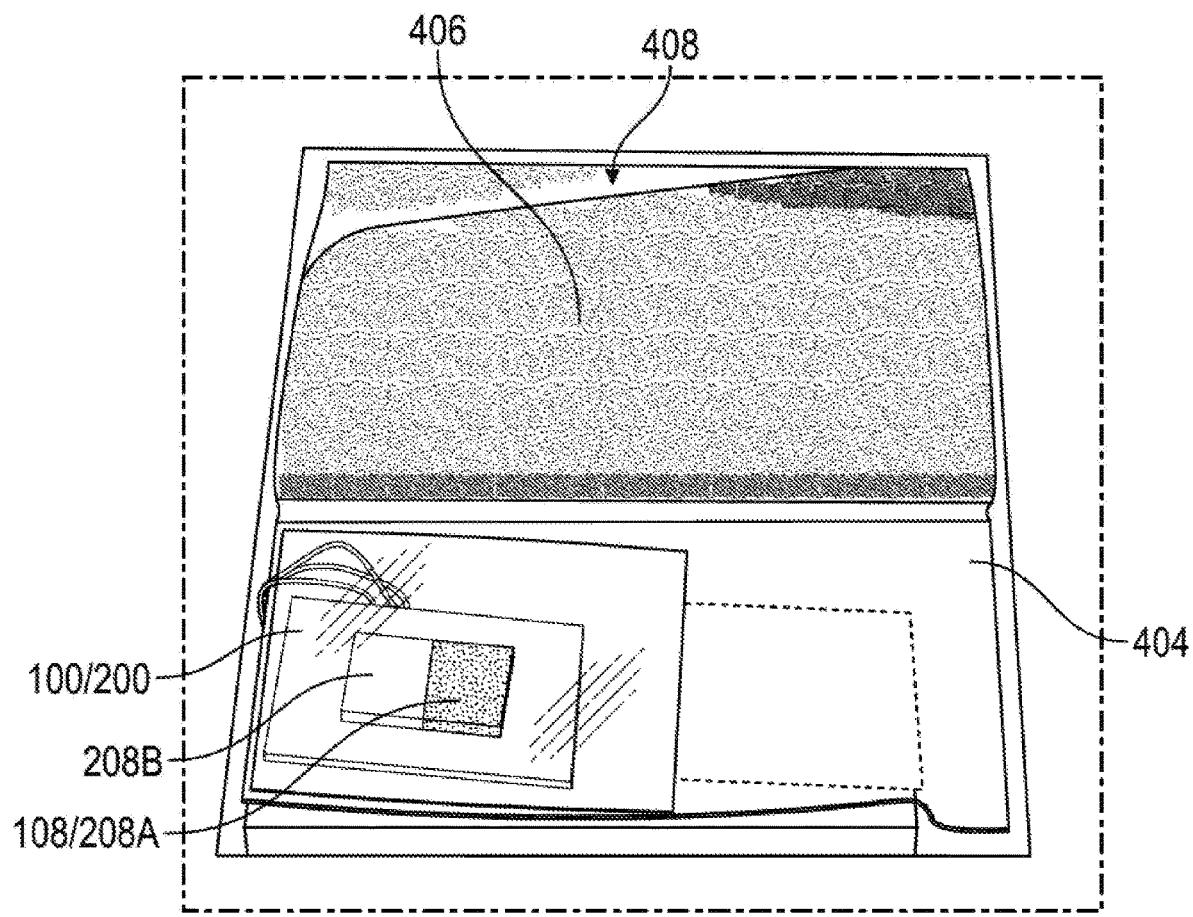

Iron concentration was then calculated using the following calibration equation:

$$\text{Iron concentration} = \frac{\text{absorbance } R - b}{m} \tag{3}$$

with b and m being the user-entered calibration values. View 7 in the app displays the user's iron concentration (FIG. 5G).

For the user's convenience, a chronological, editable history table of the user's iron concentration was built to store past runs of the app. A SQL server stores the data of each instance of the app. The history table also currently displays RGB values, absorbances, hue, saturation, and lighting obtained for each run. In addition, users can select certain runs from the table, save the data as a CSV file, and email the CSV to selected recipients.

Example 6: Reader Development

A "reader", a 3D-printed container with a window to put the user's phone, was developed to obtain optimal lighting on the sensor (FIG. 6). Inside the reader, four LED lights connected by wires to a rechargeable, Li-polymer 3.7V 700 mAh battery were used for illumination. Two diffuser layers, a tri-pyramid patterned diffuser and a piece of paper between each set of two lights and the patterned diffuser, were added to homogenously spread the lighting on the sensor. The sensor is placed on a sliding broom to be inserted into the reader in the same position for each trial.

Example 7: Validation and Verification

Figure 7A:
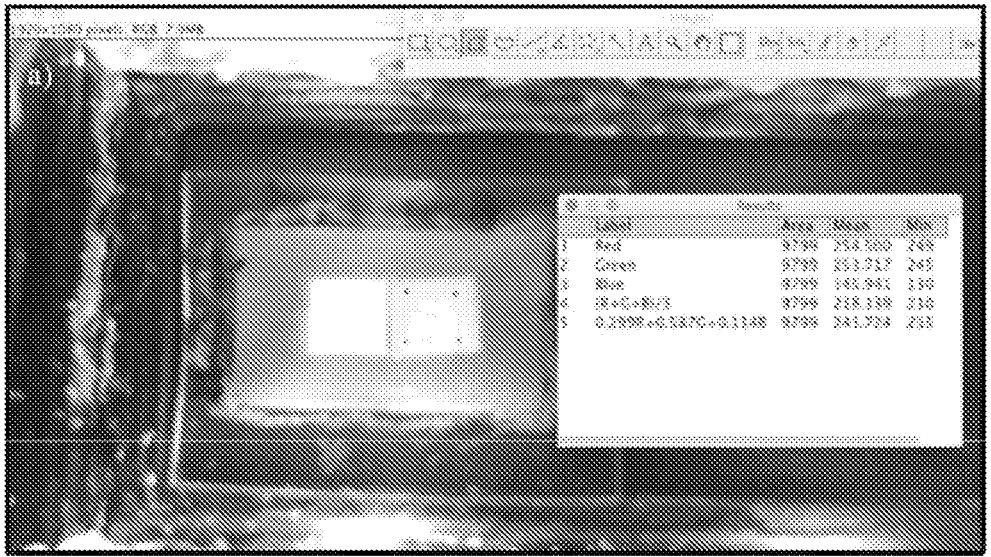
FIG. 7A shows an example of ImageJ software.
Figure 7B:
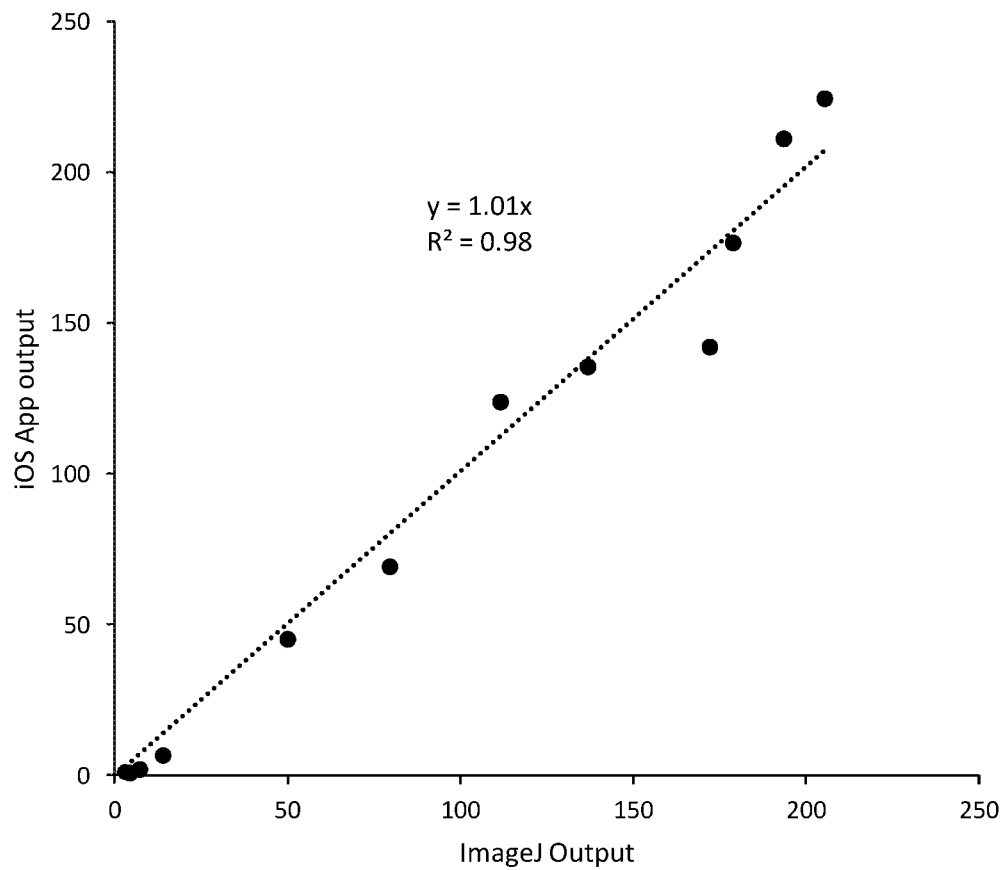
FIG. 7B shows a red verification curve.
Figure 7C:
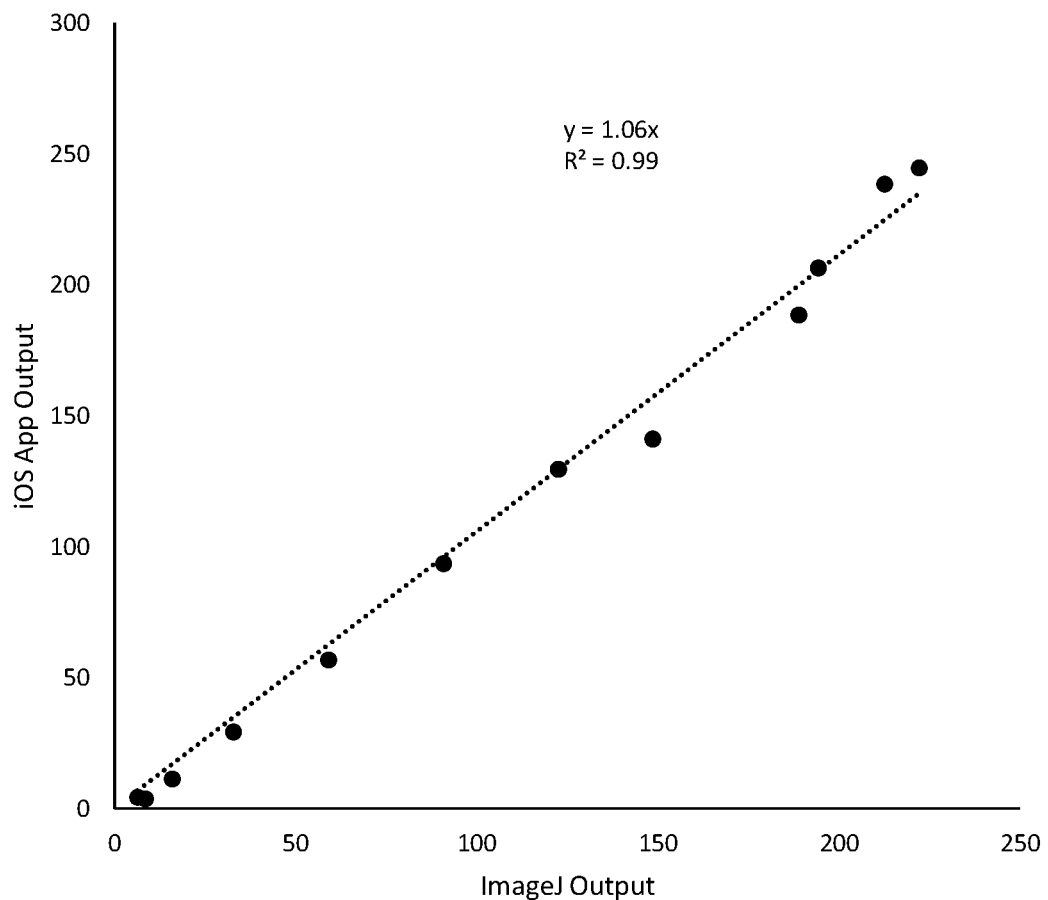
FIG. 7C shows a green verification curve.
Figure 7D:
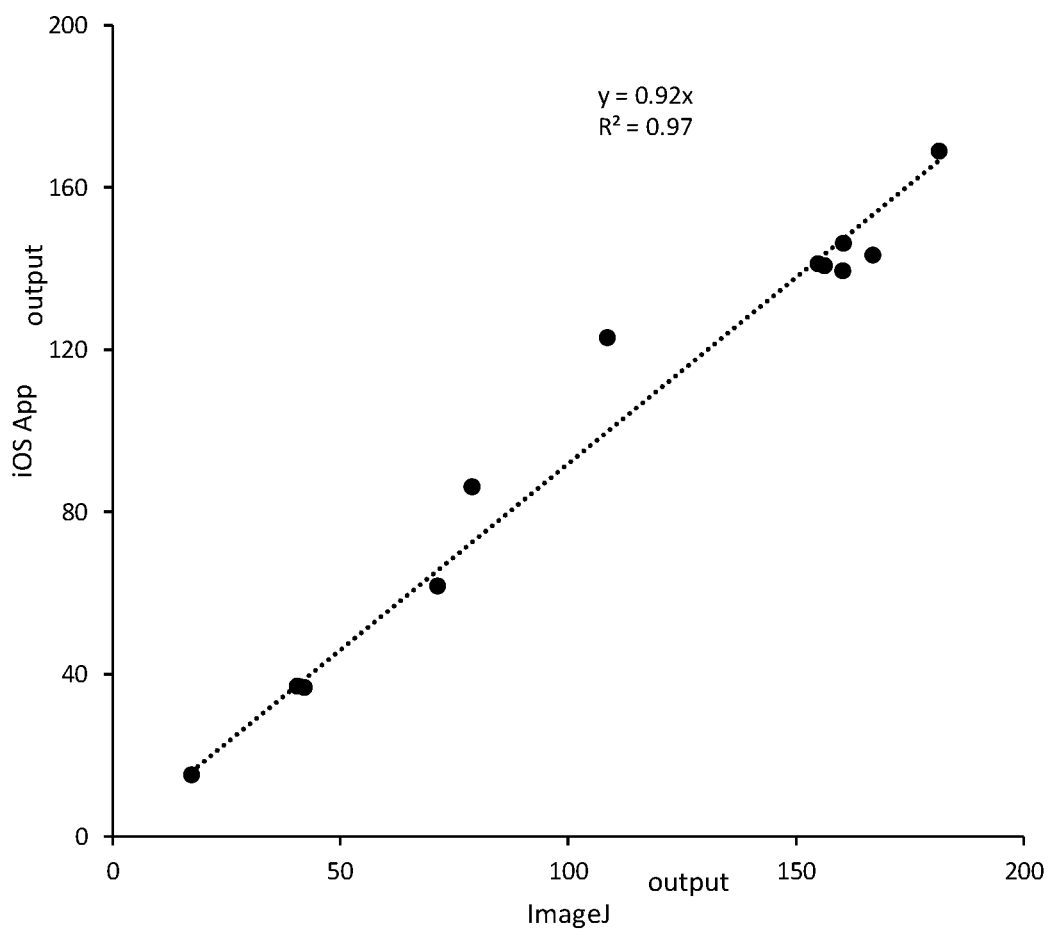
FIG. 7D shows a blue verification curve.
Figure 8A:
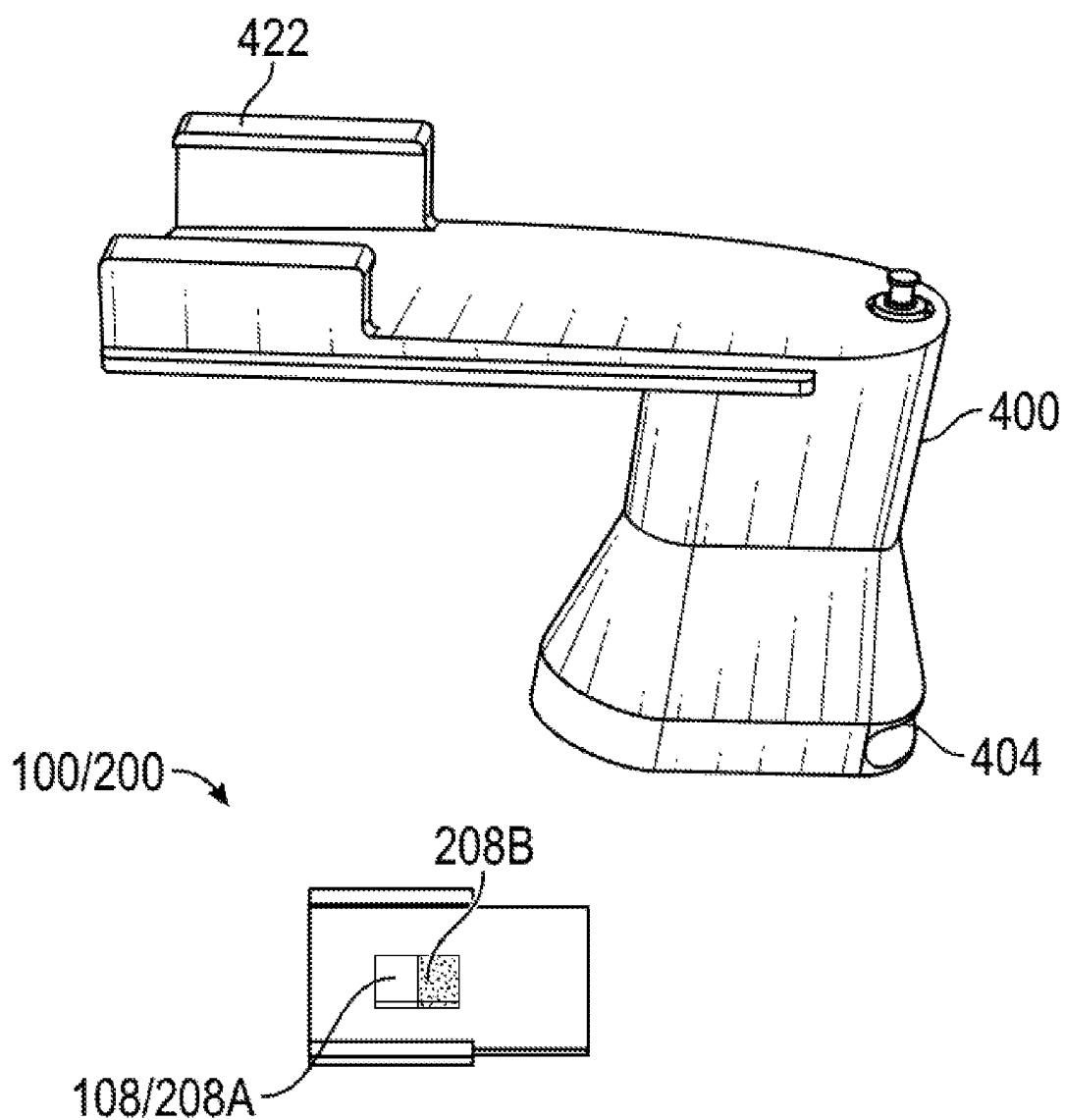
FIG. 8A shows a detection chamber design in an embodiment with a mobile device mount.
Figure 8B:
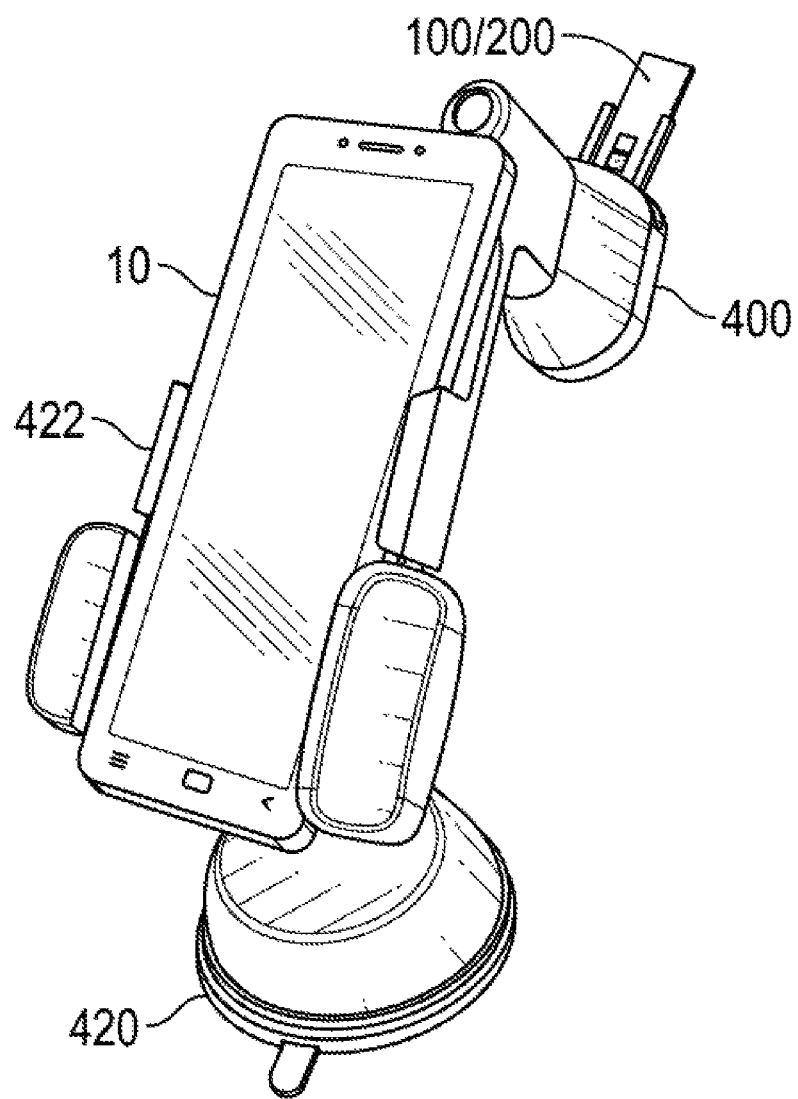
FIG. 8B shows a mobile device secured to a case that integrates the detection chamber with an LED lighting, and a specific app, analyzing body fluid iron dripped into a single, secured sensing strip. The image shows the user inserting the sensor strip into the bottom of the chamber

The app was validated with ImageJ, the standard software that returns average RGB values of a defined area of an image (FIG. 7A). A color gradient of 12 RGB combinations was created and printed out on paper. The app and ImageJ were used to take pictures of each of the colors, and the RGB values for each of the pictures from both the app and ImageJ were compared and graphed (FIG. 7B-7D). An average 97.88% correlation across red, green, and blue was obtained, proving that the app can be trusted to return accurate results.

Figure 10:
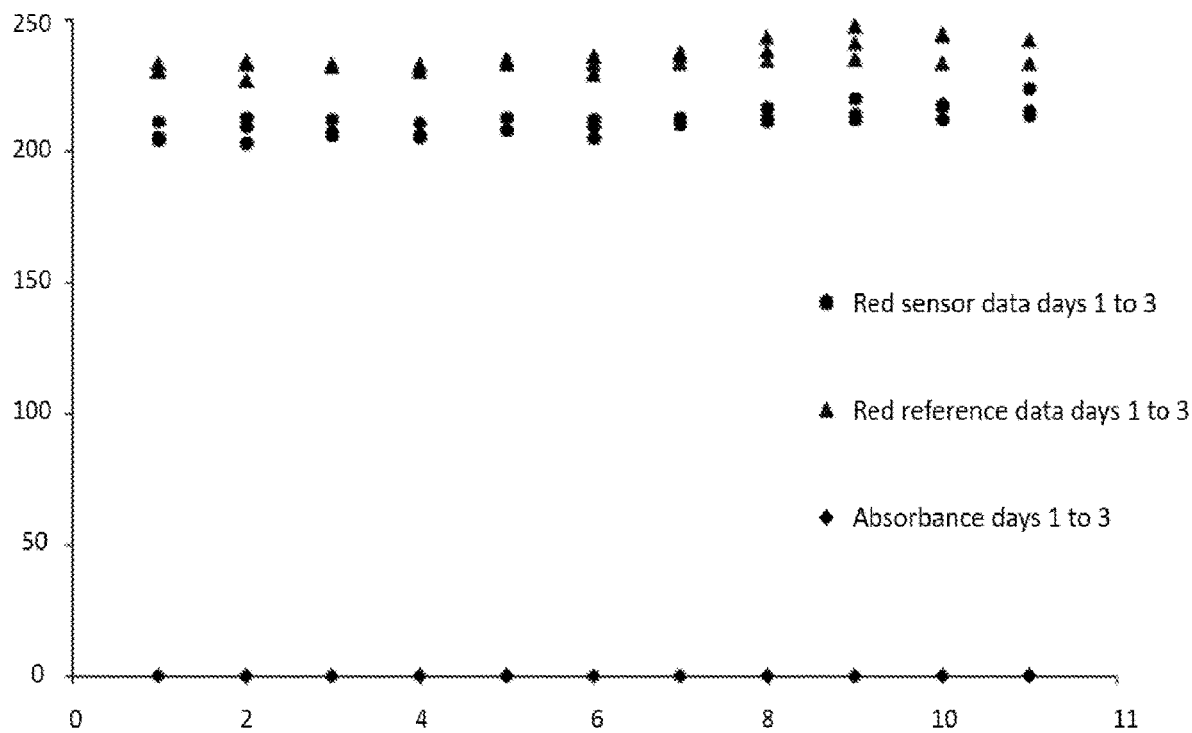
FIG. 10 shows red component signals from the application on sensing and reference substrates on three different days. Consequently, absorbance values were calculated. In the span of 3 days, average sensing signals were 212.7, 210.1 and 211 respectively while average reference signals were 233.6, 236.3 and 235.8 respectively indicating good reproducibility.

External factor analysis was conducted to ensure physical factors such as adjustments in the positioning of the sensor and lighting differences between runs with the reader did not affect the reading of the sensor taken by the app. Unused, dry sensors were used. 12 trials were conducted on three different days. Each trial consists of inserting sensor, turning LED on, taking the image and then removing the sensor (FIG. 10). Results showed small variation between sensing, reference and calculated absorbance values of the red component. The variability of the sensor positioning, and lighting conditions are very minimal. Thus, the sensors are uniform and can be expected to return very similar results.

Figure 11A:
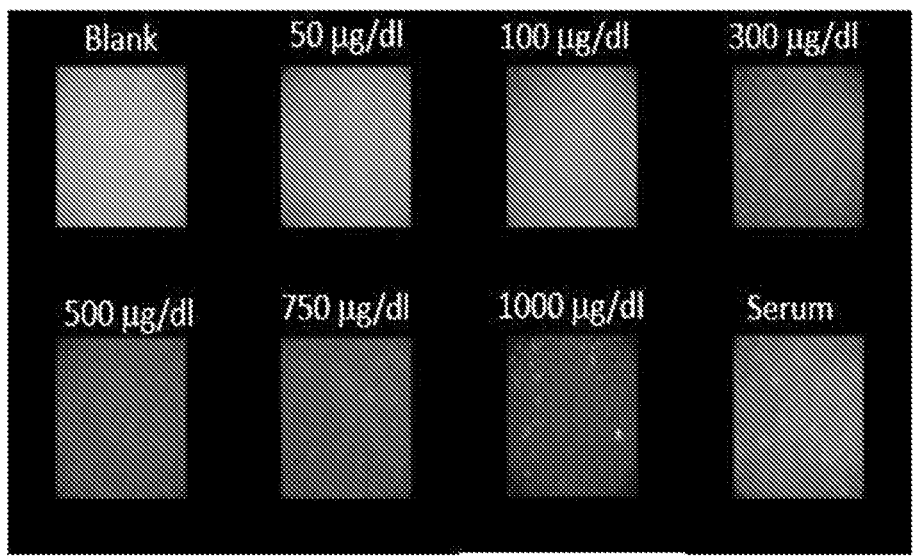
FIG. 11A shows the color profile of sensor images.

Several sensor strips were prepared following the sensor assembly outlined in Example 3. Twenty microliter standards and serum samples were added to the sample port. After one minute, images were taken and analyzed with ImageJ. A clear color profile was observed, indicating appropriate sensitivity for iron detection (FIG. 11A).

Figure 11B:
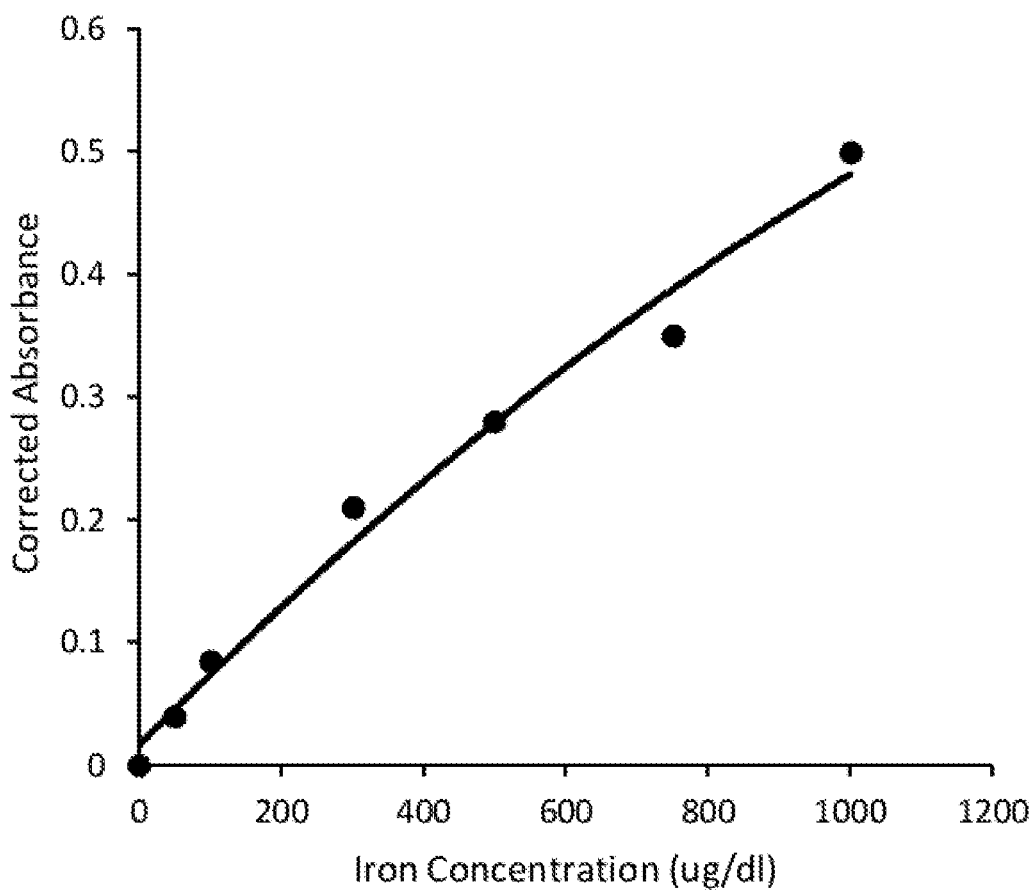
FIG. 11B shows a calibration curve using ImageJ for iron concentrations between 50 and 1000 µg/d L.

The maximum concentration of the standard used in FIG. 11B's calibration curve was 1000 g/dl despite serum iron concentrations seldom exceeding 300 g/dL. However, this calibration curve still verifies that the solid-state sensor design is effective and that a correlation exists between color intensity and iron concentration.

Coefficient of variation (% CV) is a statistical tool used to measure dispersity of data.

$$\% \text{ CV} = 100\% \times (\text{standard deviation/mean}) \tag{4}$$

% CV was utilized throughout the work to evaluate the reproducibility of the different method and comparatively assess the advantages of the new method and sensor strips. Table 6 shows an example of dispersion analysis with ImageJ method applied to iron detection on the new sensor strips. The CV (%) was lower than 10%, indicating and acceptable analytical performance of image J method and new sensor strips.

TABLE 6

| ImageJ data dispersion analysis | | | |
|---|---|---|---|
| Concentration (g/dl) | Average output | Standard deviation | CV (%) |
| 50 | 0.092 | 0.002 | 2 |
| 150 | 0.144 | 0.011 | 8 |

Figure 12:
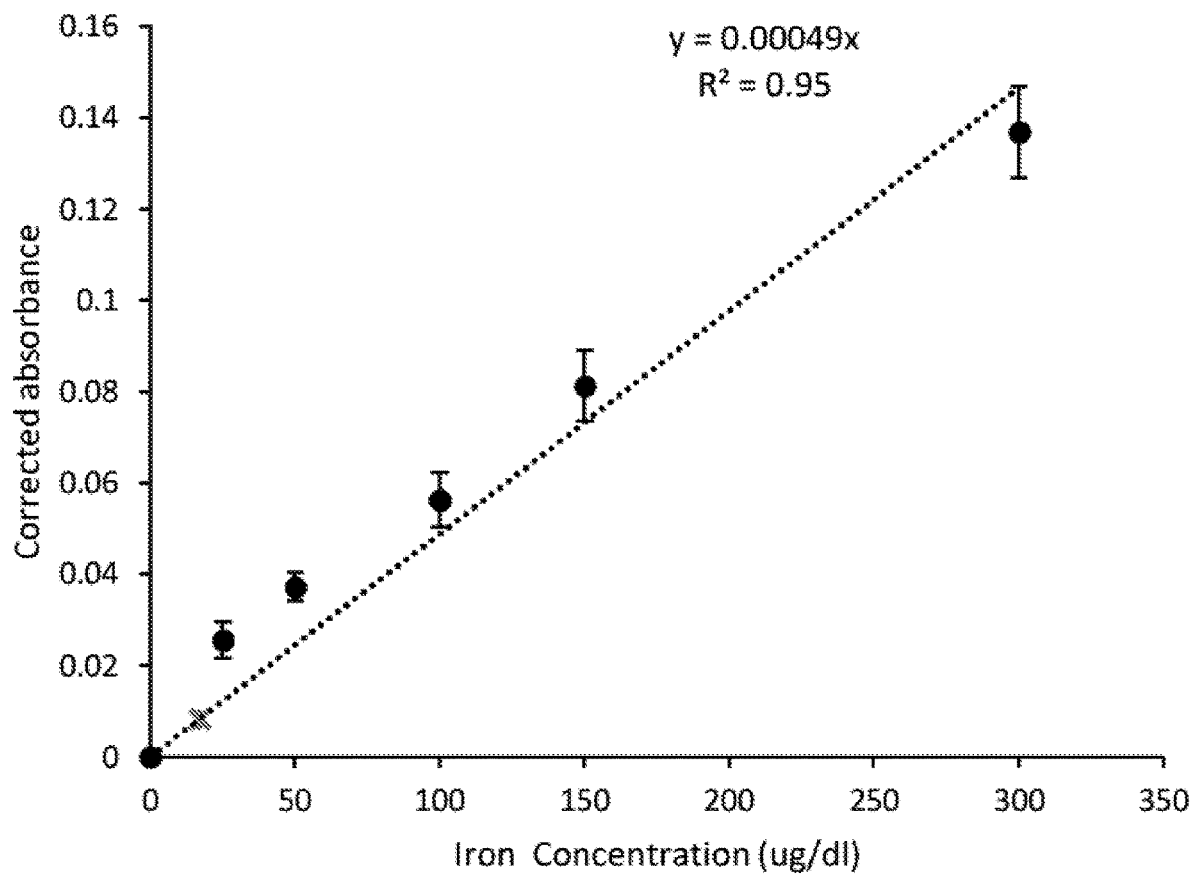
FIG. 12 shows the application's calibration curve for iron detection with a limit of detection of 16 µg/dL (cross).

The same procedure to find the calibration curve of the iron samples using ImageJ was repeated to find the calibration curve using the app (FIG. 12). Five different standards of 0 µg/dL, 50 µg/dL, 100 µg/dL, 150 µg/dL, and 300 µg/dL were tested.

Based on the corrected absorbance curve, the calibration curve can be represented as follows:

$$\text{absorbance R} = m \times \text{iron concentration} + h \quad (5)$$

where m is 4. 9E-4 and b is 0. Solving for iron concentration in equation 5 gives equation 3.

To measure the detection limit of the system, an estimated detection limit (LoD) of 16.5 μg/dL total iron concentration was calculated from the assessed sensitivity, and assuming a signal equal to 3 times the noise level from 30 blank samples and is shown in FIG. 12 as a red asterisk.

Figure 13:
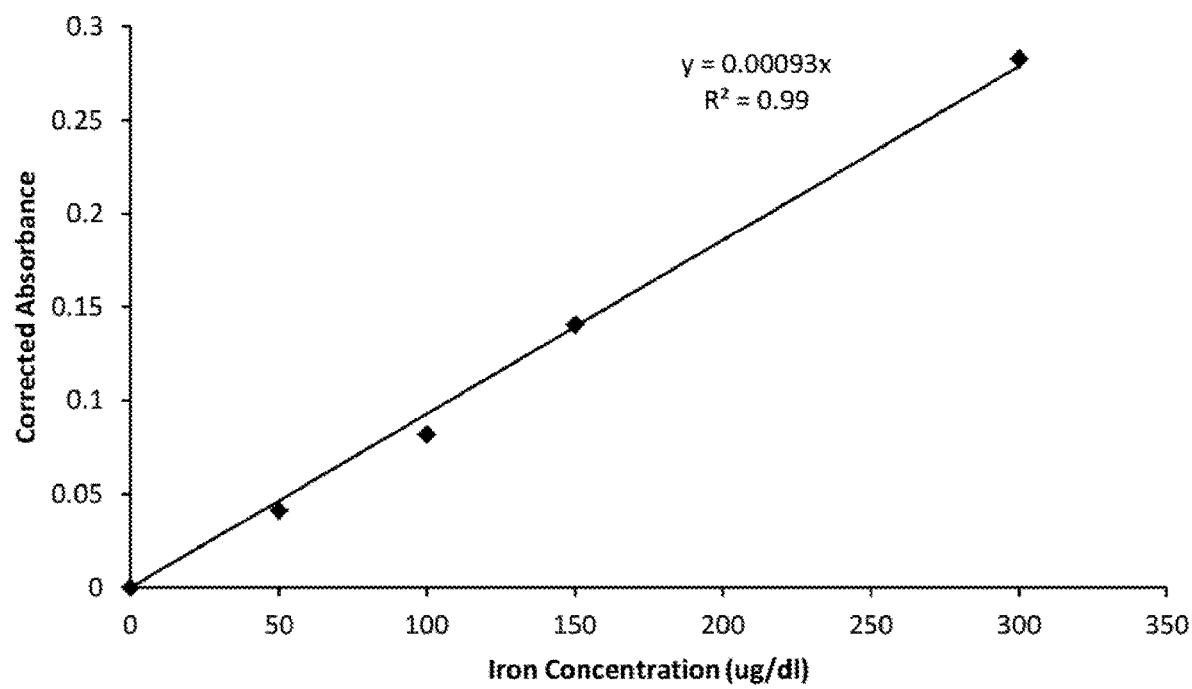
FIG. 13 shows a spectrophotometer's calibration curve for iron detection.

To verify the app's calibration curve, a spectrophotometer-based calibration curve using the optimized method was created to act as the gold standard (FIG. 13). Once again, the same five standards used to create the gradient for the app's calibration curve were used. The high correlation (0.99) between the linear fit and the data proved that the spectrophotometer-based calibration using the optimized method can be regarded as the gold standard.

The app-based calibration performance was then compared to the spectrophotometer-based calibration performance, using the optimized method. Four samples each of standards 0 μg/dL, 50 μg/dL, 100 μg/dL, 150 μg/dL, and 300 μg/dL were created and tested with both methods. Results from the trials are displayed below (Table 7). The app-based calibration rendered acceptable analytical performance compared with the spectrophotometer-based calibration, using the optimized method.

TABLE 7

Comparison of application to spectrophotometer

| Reading Method | Slope | CV (%) |
|---|---|---|
| Spectrophotometer | 0.00093 | 2.2 |
| Mobile application | 0.00047 | 10.5 |

Figure 14:
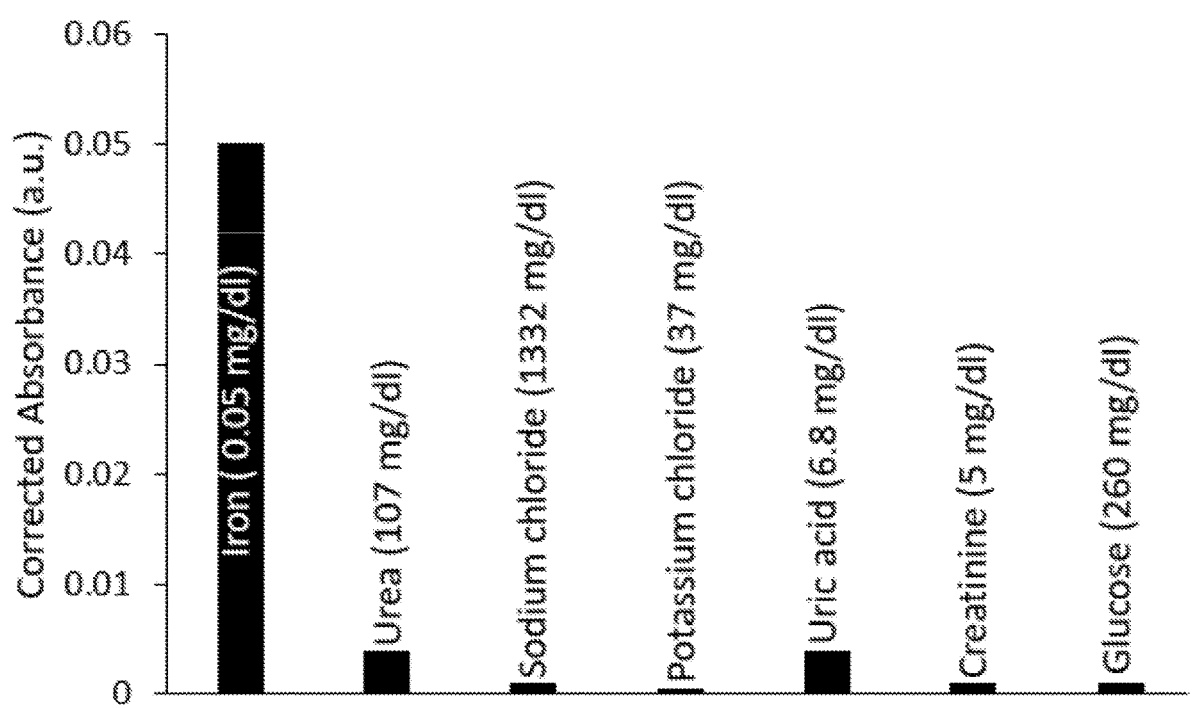
FIG. 14 shows interference analysis comparing the red absorbance signals of iron to different potential interferents present in body fluid such as urea, sodium chloride, potassium chloride, uric acid, creatinine. Iron is the only molecule that significantly crosses the detection threshold level.

To ensure that the sensor only responded to iron, the sensor was tested with common interferants also found in body fluid (Table 8), in accordance with the concentration of each found in body fluid. Only iron elicited a significant response from the sensor (FIG. 14). From these results, it can be concluded that the sensor is only sensitive to iron relative to other molecules in the body fluid.

TABLE 8

Concentrations of Interferants tested

| Interferant | Concentration |
|---|---|
| Uric acid | 6.8 mg/dL |
| NaCl | 228 mM |
| Glucose | 2.6 g/dL |
| Albumin | 5.0 g/dL |
| Urea | 107 mg/dL |
| Creatinine | 5 mg/dL |
| Iron (II) | 50 μg/dL |
| KCl | 37 mg/dL |
| Ions | 0.15M NaCl + PBS (pH 7.4) |

Using the calibration curves from the app-based method (example shown in FIG. 12), blood iron concentrations were assessed, and compared with LabCorp results assessed for the same sample. Table 9 summarizes the results, which demonstrated accurate performance of the new sensor strips and phone-app based method.

TABLE 9

Concentrations of blood iron tested by different methods and Lab-Corp

| Source | Concentration (μg/dL) | Number of replicates |
|---|---|---|
| Phone app | 227 | 4 |
| Spectrophotometer | 238 | 15 |
| Lab-Corp | 231 | — |

Figure 19:
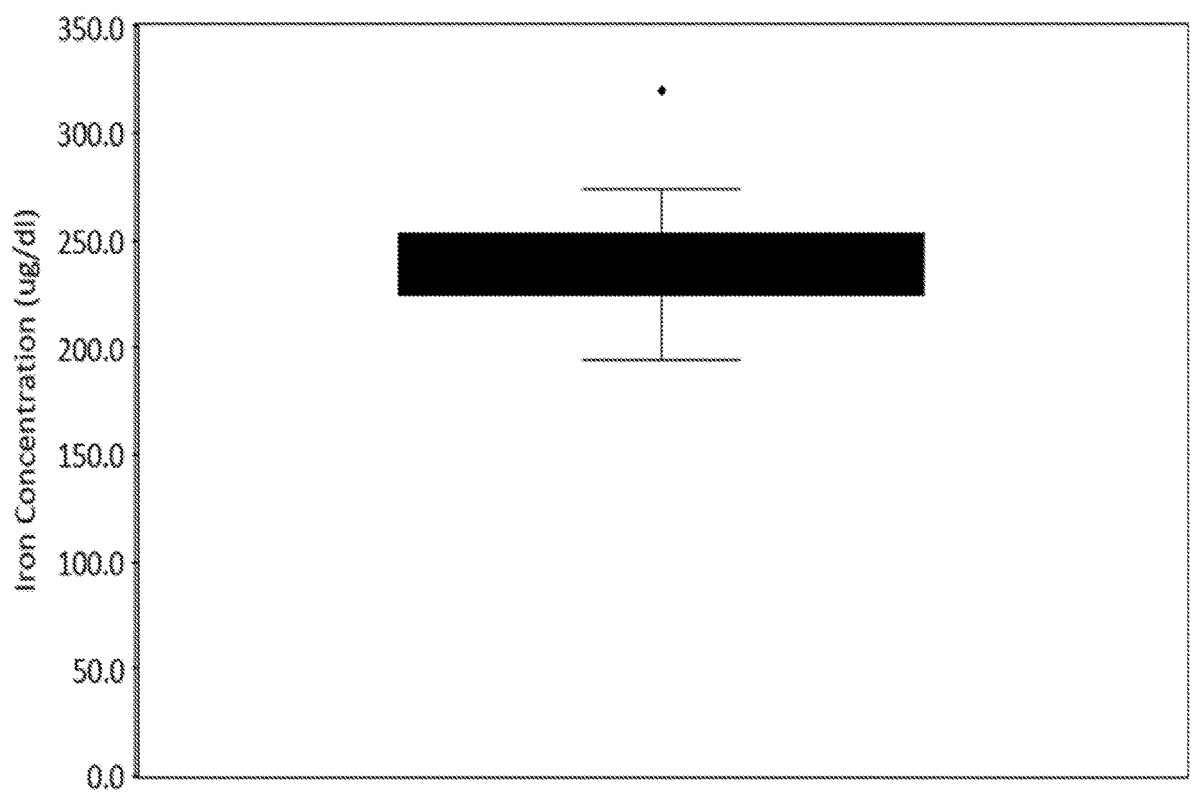
FIG. 19 illustrates a box plot with the average, maximum and minimum values of 19 serum samples analyzed for iron concentration using the built-in box-plot graph. The average of the 19 samples was 238.1 µg/dL with a percent coefficient of variation of 7.5%.

Human venous body fluid sample (with known iron (III) concentration of 231 μg/dL) were available for in-house testing as well as to be sent to LabCorp for processing, thereby producing at least 20 serum replicates for in-house analysis. FIG. 19 displays the box-plot illustrating a qualitative statistical dispersion of the data.

Example 8: Iron Detection Reaction Stability

The stability of the iron detection sensor strip, including reagents, substrates, and housing was stablished by introducing the pre-packed sensors in an oven at 45° C. for several days. After the heating procedure, the sensitivity of the sensor strip was 100% kept. This probed the combination of reagents, substrates and housing from the present invention produce a highly stable and robust sensor and therefore, sensing system.

Example 9: Total Iron Binding Capacity (TIBC) and Percentage of Iron Saturation

TIBC is defined as the maximum amount of iron that can bind with transferrin while percentage of iron saturation is the ratio of serum iron to the total iron binding capacity. TIBC may be incorporated into the sensor.

Initial experiments were conducted in liquid solutions via a spectrophotometer at 600 nm to develop the chemical components of the sensor strip for TIBC.

Figure 20:
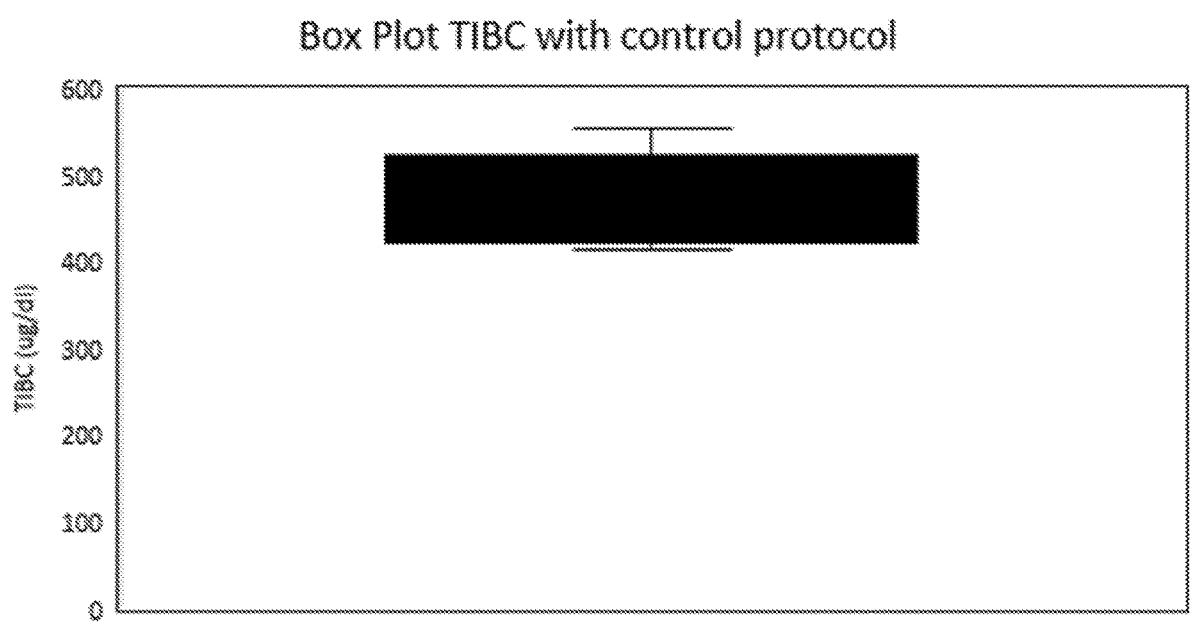
FIG. 20 illustrates a box plot with the average, minimum, and maximum values of 5 serum samples analyzed for TIBC, using a control protocol.
Figure 21:
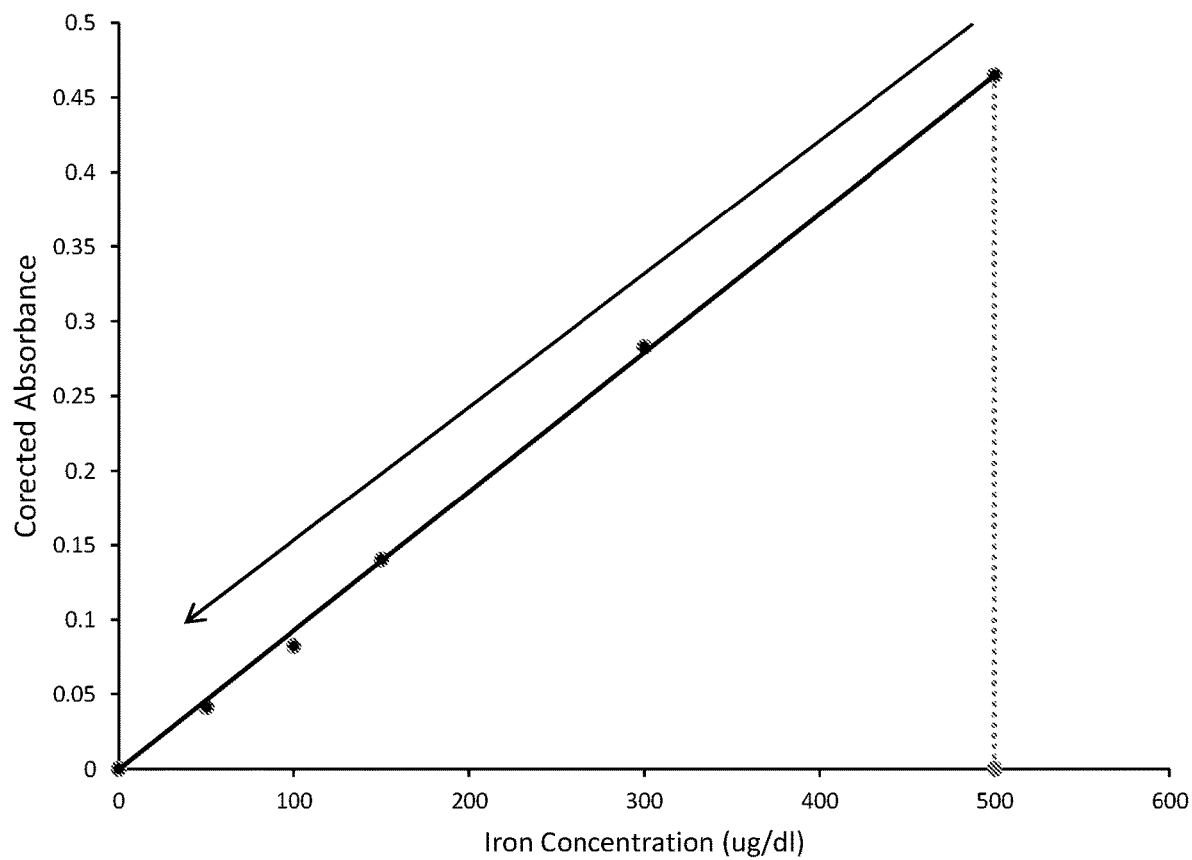
FIG. 21 illustrates the resulting absorbance decrease for the iron detection reaction after addition of $MgCO_3$ to a solution of 500 µg/dL during the optimization of the amount of $MgCO_3$ for development of TIBC in the sensor strip.
Figure 22:
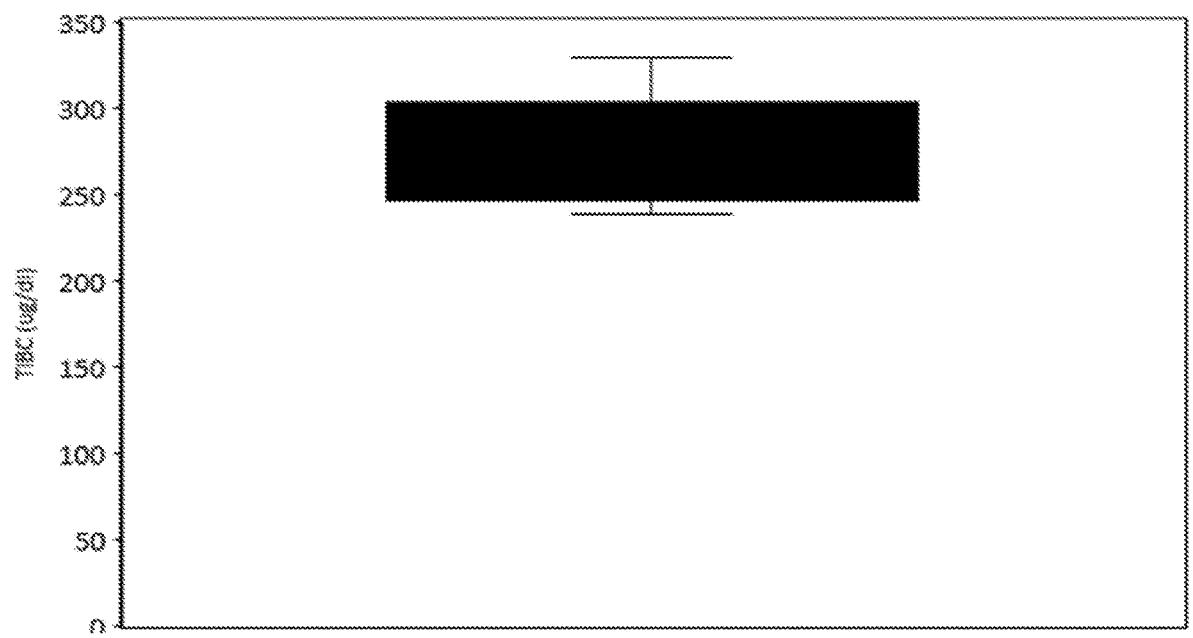
FIG. 22 illustrates a box plot with the average, minimum, and maximum values of 6 serum samples analyzed for TIBC, using the methods described herein.
Figure 23:
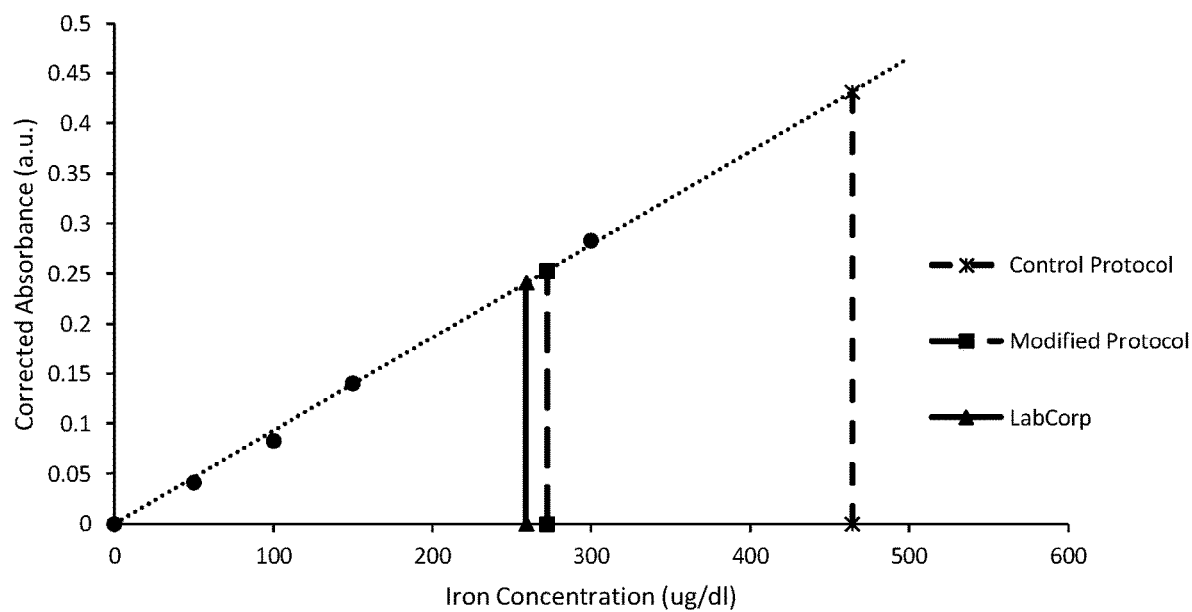
FIG. 23 illustrates the TIBC results (marked on x-axis) of a blood sample from the control protocol, the new device and methods described herein (in the sensor strip), and the LabCorp reference values. As can be seen, the new device and methods match the LabCorp reference value.
Figure 24:
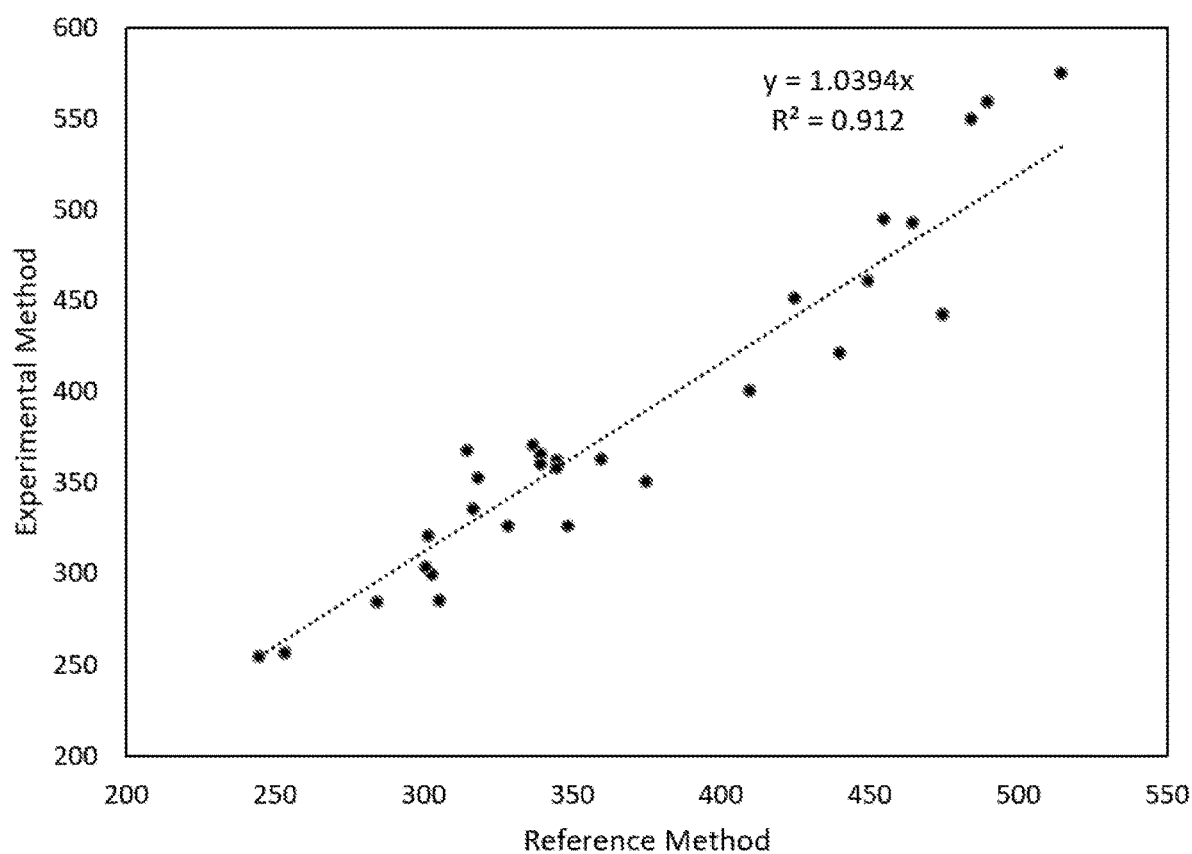
FIG. 24 illustrates a correlation plot for TIBC measurements with plasma samples between experimental and reference method with correlation slope of 1.0394 and regression coefficient of 0.912.
Figure 25:
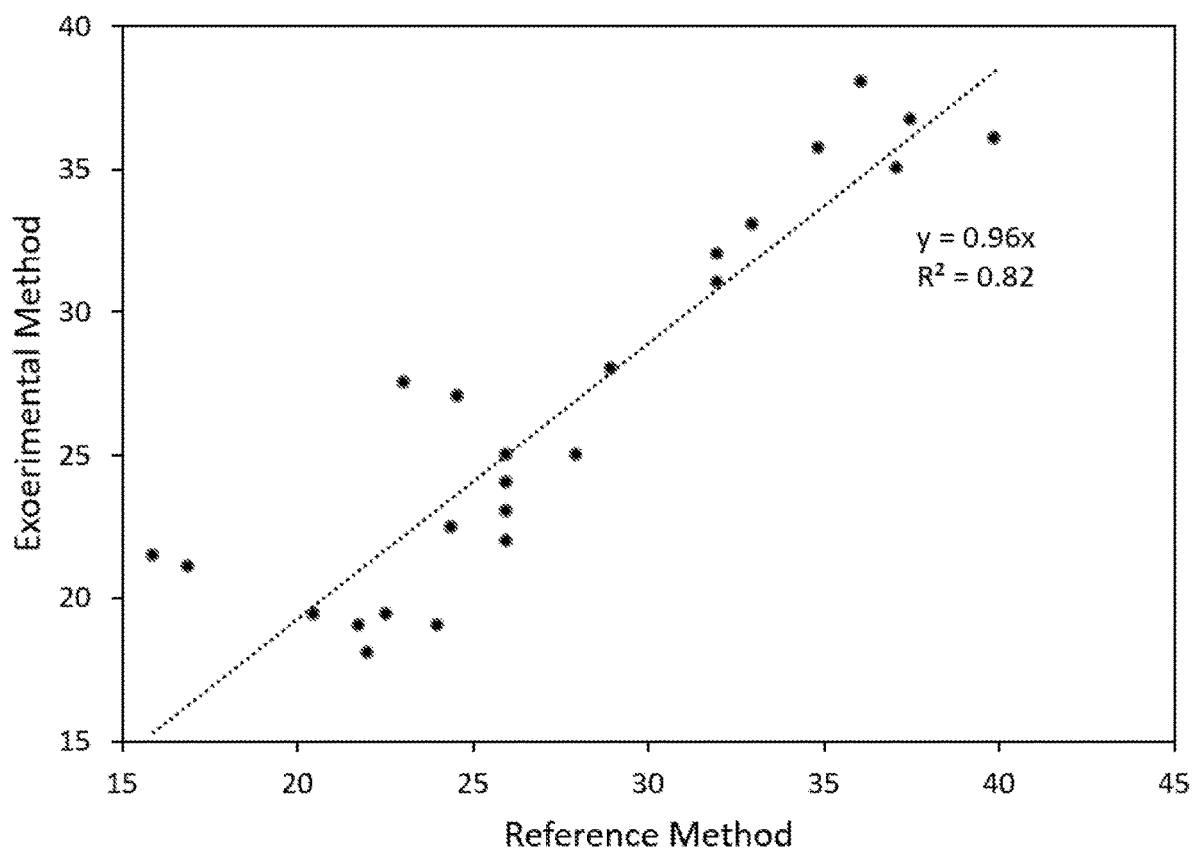
FIG. 25 illustrates a correlation plot for TIBC measurements in plasma between experimental and reference method with correlation slopes of 0.96 and regression coefficients of 0.82.

The liquid-phase analysis of TIBC using the spectrophotometer may be translated into a solid-sensor design that will calculate not only body fluid iron but also TIBC. To do so, magnesium carbonate was utilized. Magnesium carbonate is known for its high affinity towards free iron and low affinity towards iron-bound to transferrin. This property can be exploited by saturating cell-free body fluid samples (e.g. serum or plasma) with iron and then precipitating excess ions with magnesium carbonate. Reagents A and B as described above were used as developed for the detection of total iron (Table 1, Table 2). The amounts of magnesium carbonate and its molar ratio to iron concentrations were investigated to produce accurate results. FIGS. 21, 22 and 23 illustrate the process of optimization, where an increase of the iron concentration and a reduction of $MgCO_3$ concentration rendered accurate and appropriate results for implementation in a sensor strip. As an example, FIG. 20 displays a box-plot showing reproducible results from five replicates of the known human body fluid sample with an average reading of 464 μg/dL. To one volume of bodily fluid, 0.5 volumes of 2000 μg/dl iron sample may be added to saturate all unbound transferrin. This is followed by adding 20 mg $MgCO_3$/ml of serum sample to precipitate all unreacted iron. This example is not limited to the suggested chemical ratios. Iron concentrations can range between 1000 μg/dl and 3000 μg/dl; however, the added volume must be adjusted accordingly. For example, with a 1000 μg/dl standard, 1 volume must be added. In addition, the mass of the $MgCO_3$ added may be between 14 mg of $MgCO_3$/ml of serum to 25 mg of $MgCO_3$/ml of serum.

Body fluid samples from healthy and unhealthy individuals were drawn and examined for total iron and TIBC, using the developed set of reagents, and methodology.

Table 10 summarizes the TIBC results from 6 samples of the body fluid of one unhealthy individual. The percent of iron saturation is the ratio between the concentration of serum iron to TIBC.

TABLE 10

Total iron binding capacity validation

| Method | TIBC (g/dL) | % iron saturation |
|---|---|---|
| Example protocol | 272 | 87 |
| LabCorp | 259 | 91 |

The TIBC of healthy individuals is between 240 and 450 g/dL, and the transferrin saturation ranges from 20% to 50%. The TIBC results in Table 10 fall outside this range. This means that the individual has high concentrations of serum iron.

For a TIBC sensor strip, a first design is similar to the original sensor strip but with two additional layers: a layer for iron saturation and a layer for magnesium carbonate precipitation.

A second design is similar to the description in FIG. 15 and relies on lateral flow and involves two channels emerging from one common sample port. The channel #2 named "transferrin" refers to the detection of total iron bound to transferrin, and therefore the TIBC, which is the ratio of absorbance signal between the iron detection channel (channel #1), and total iron in transferrin (channel #2). The first channel is saturated with reagent A. As the body fluid moves throughout the channel, iron (III) is reduced to iron (II). At the end of the channel is a detection sink saturated with reagent B. The reader is located at the sink. Measurements of body fluid iron concentration are taken by the reader. The second channel is divided into three sub-sections: a section saturated with iron, a section saturated with magnesium carbonate, and a section saturated with reagent A. Similar to the first channel, a detection sink is located at the end.

TIBC was also analyzed using the sensor strip and iPhone App, and the spectrophotometer method validated with LabCorp (Table 11), demonstrating the feasibility of the sensor strip use for TIBC assessment.

TABLE 11

Total iron binding capacity assessed with a sensor strip and an iPhone App, and its comparison with the spectrophotometric method validated with LabCorp Table 9

| Source | TIBC(µg/dL) | % Saturation |
|---|---|---|
| Phone app | 397 | 57 |
| Spectrophotometer | 464 | 50 |

Example 10: Integration of Total Iron and Total Iron Binding Capacity (TIBC) with Other Iron Panel Parameters Given the low noise nature of the smartphone-based reader, and the potential of optoelectronic systems based on LEDs and light detectors such as photodetectors, the addition of detection of other iron panel parameter is feasible, and therefore, the above-mentioned total iron detection and TIBC can be integrated to detection of color change-based detection reaction for ferritin and hemoglobin.

Example 11: Kinetics Study of Optimized Reaction for Sensor Strip

In order to obtain the iron (II)-ferene complex, two reactions are involved: the reduction of iron (III) with ascorbic acid and the complex formation between iron and ferene. In the protocols, the concentration of ascorbic acid is in excess relative to the other chemical species. To simplify the number of variables, the concentration of ascorbic acid remained constant and was factored in with the rate constant. In this case, the rate law was approximated as follows:

$$\frac{d[COM]}{dt} = k'[Fe^{3+}]^\alpha [Ferene]^\beta$$

$$k' = [AA] * k$$

Figure 26A:
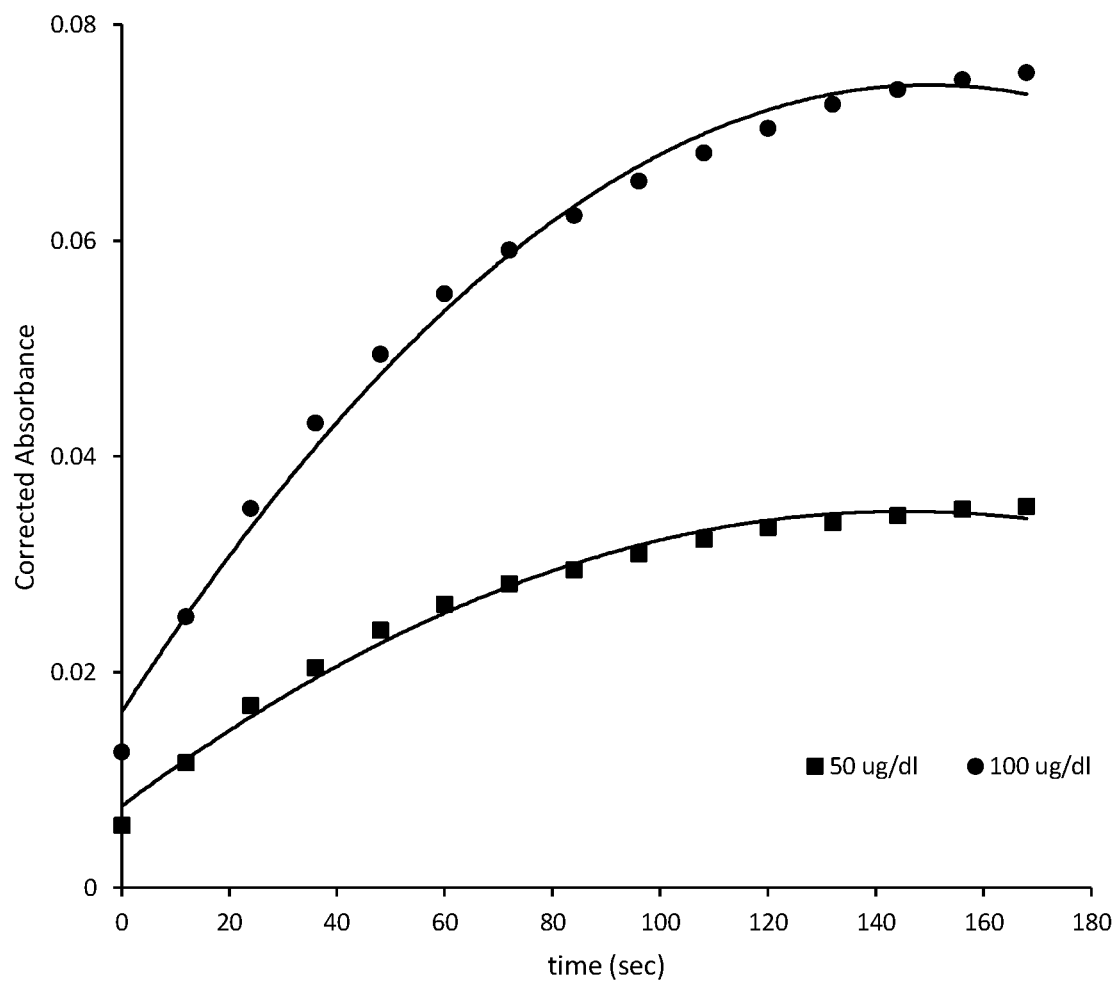
FIGS. 26A-26B illustrate the kinetics study of the iron detection reaction in the sensor strip.
Figure 26B:
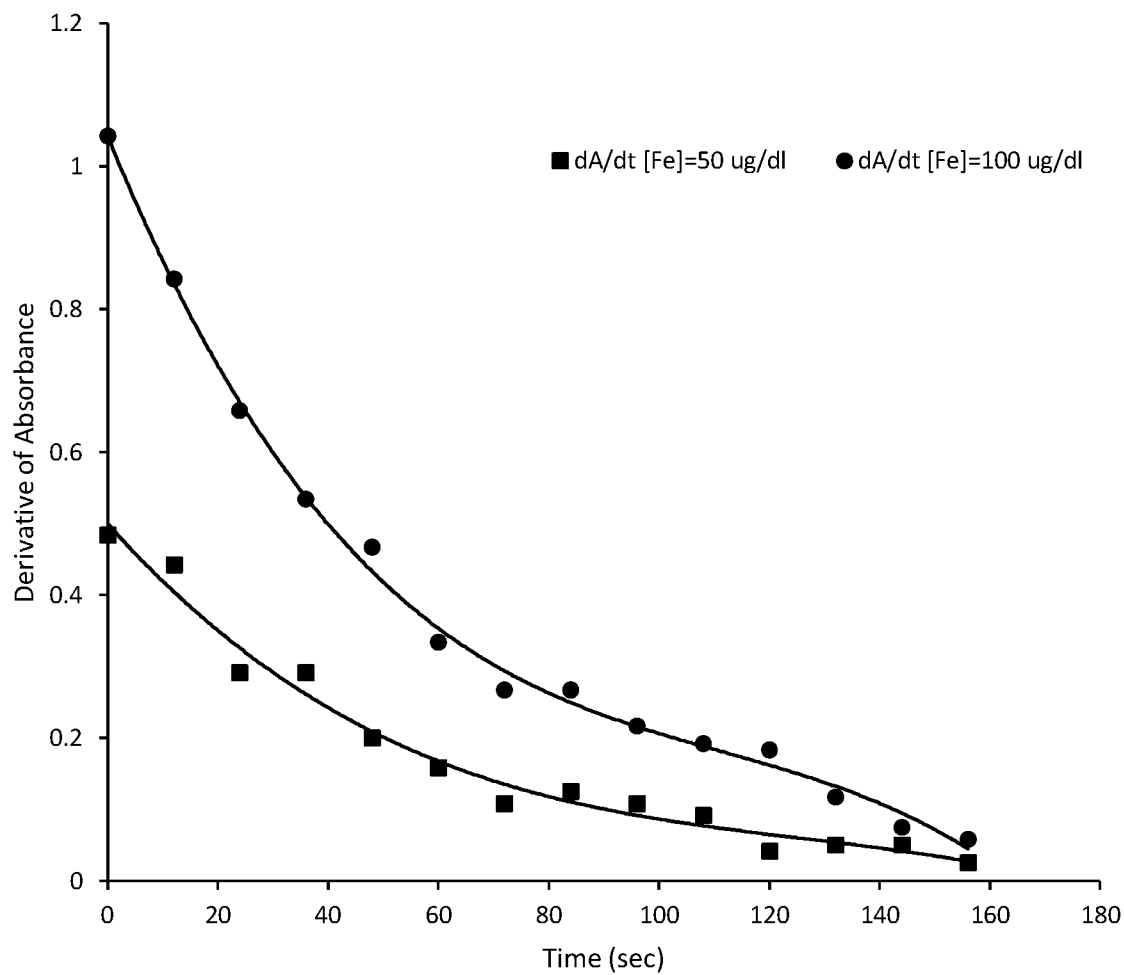
Figure 27A:
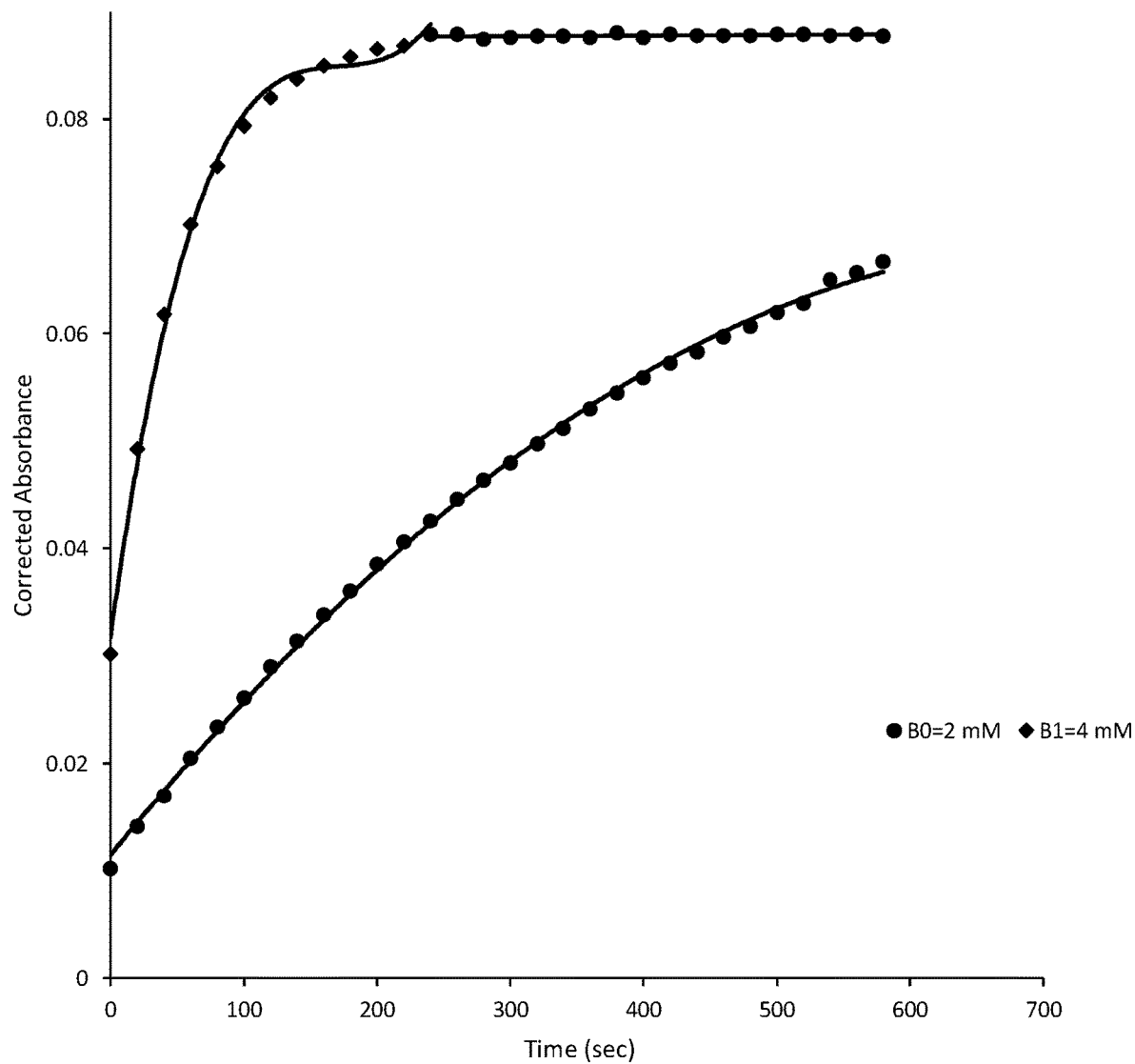
FIGS. 27A-27B illustrates the kinetics study of the iron detection reaction in the sensor strip.
Figure 27B:
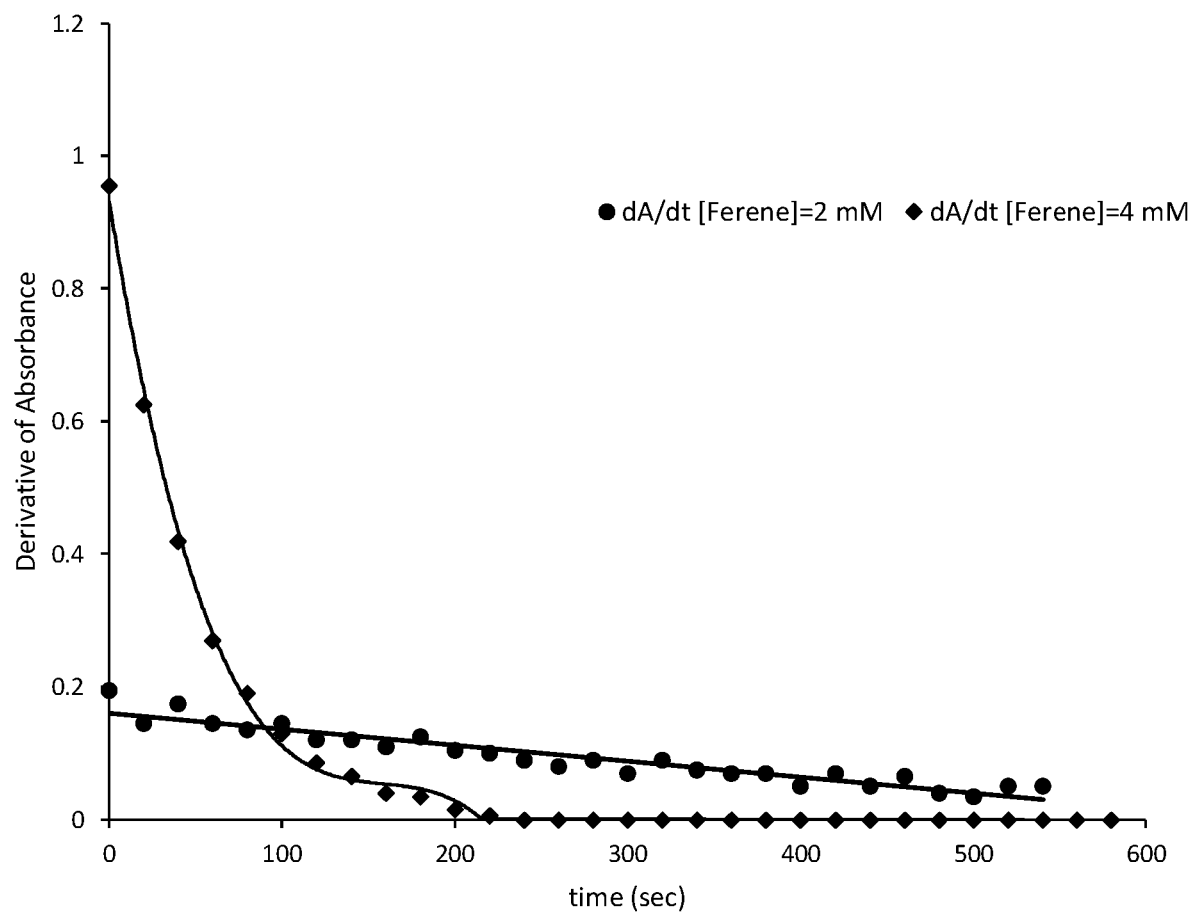

An initial slope analysis was conducted to determine $\alpha$ (FIG. 26A-26B) and $\beta$ (FIG. 27A-27B). The following assumptions and approximations were used:

At t=0, concentrations of reactants are equal to initial concentrations $$\frac{dC}{dt} = \frac{(C_{i+1} - C_{i-1})}{z\Delta t} \text{ for all points other than } t = 0$$

$$\frac{dC}{dt} = \frac{(C_1 - C_0)}{\Delta t} \text{ for } t = 0$$

The initial slope analysis was done by holding one reactant constant while changing the other reactant, and so:

If Iron concentrations are held constant:

$$\frac{\frac{d[COM]}{dt} t = 0, [Ferene]1}{\frac{d[COM]}{dt} t = 0, [Ferene]2} = \left(\frac{[Ferene]_1}{[Ferene]_2}\right)^\beta$$

By taking logarithmic on both sides, the above equation can be reduced to the following:

$$\ln\left(\frac{\frac{d[COM]}{dt} t = 0, [Ferene]1}{\frac{d[COM]}{dt} t = 0, [Ferene]2}\right) = \beta \frac{[Ferene]_1}{[Ferene]_2}$$

If Ferene concentrations are held constant:

$$\frac{\frac{d[COM]}{dt} t = 0, [Fe^{3+}]1}{\frac{d[COM]}{dt} t = 0, [Fe^{3+}]2} = \left(\frac{[Fe^{3+}]_1}{[Fe^{3+}]_2}\right)^\alpha$$

Similarly, by taking the logarithmic of the above equation:

$$\ln\left(\frac{\frac{d[COM]}{dt} t=0, [Fe^{3+}]1}{\frac{d[COM]}{dt} t=0, [Fe^{3+}]2}\right) = \alpha\left(\frac{[Fe^{3+}]_1}{[Fe^{3+}]_2}\right)$$

Using the initial slope method, the values of Alpha and Beta were determined by using duplicate testing:

| | |
|---|---|
| Alpha 1 | 1.06 |
| Alpha 2 | 1.29 |
| Beta 1 | 2.38 |
| Beta 2 | 2.22 |
| Alpha average | 1.17 |
| Beta Average | 2.30 |

Once the rate law powers are approximated, the rate constant was determined by evaluating the following expression at different instances.

$$\frac{d[COM]}{dt} - k'[Fe^{3+}]^\alpha [Ferene]^\beta$$

In order to do, absorbance measurements of the complex must be converted to concentration and then by stoichiometry, the concentrations of iron (III) and Ferene were calculated. Note that the following assumption was needed: the reaction goes to completion (i.e at $t \to \infty$, [Iron III]=0).

$$\frac{d[COM]}{dt} = -\frac{d[Fe^{3+}]}{dt} = -\frac{d[Ferene]}{3dt}$$

$$[COM] = [Fe^{3+}]_0 * \left(\frac{Abs_t}{Abs_\infty}\right)$$

$$[Fe^{3+}] = [Fe^{3+}]_0 * \left(1 - \left(\frac{Abs_t}{Abs_\infty}\right)\right)$$

$$[Ferene] = [Ferene]_0 - 3[Fe^{3+}]_0\left(\frac{Abs_t}{Abs_\infty}\right)$$

Once the concentrations are determined, a solver in excel was used to determine the value of the rate constant that will minimize the square of the error.

$$\min\left(\Sigma\left(\frac{d[COM]}{dt} - k'[Fe^{3+}]^\alpha [Ferene]^\beta\right)^2\right)$$

| | | |
|---|---|---|
| k'1 | 0.083 | mM$^{-1.47}$s$^{-1}$ |
| k'2 | 0.095 | mM$^{-1.47}$s$^{-1}$ |
| Average k' | 0.089 | mM$^{-1.47}$s$^{-1}$ |
| k | 0.0044 | mM$^{-2.47}$s$^{-1}$ |

Example 12: Detection of Total Iron from Whole Blood Samples

For point of care application, the final device 100/200 should host whole blood samples and output accurate measurements without any sample modification. With this said, various research groups and private companies have tried to isolate serum at the point of care with various paper membrane arrangements, volume increasing approaches, or even utilizing pressure differentials to enhance the capillary wicking effects of paper. However, challenges such as low rates of retained volume, slow capillary wetting, slow color development and above all, weak recovery rate of analyte in the filtered plasma were observed. A second-generation sensor 200 (FIGS. 2A-2C) was developed based on the original sensor design and including three unique submembranes that were tightly squeezed together as part of a first layer 202 (vertical flow of sample) (vertical flow of sample) as shown in FIG. 2A. The first layer 202A was chosen to be highly porous and thin functioning to capture the entire sample volume and attract it evenly onto the surface. No filtration takes place with this membrane besides incidental adsorption. The second and third sub membranes 202B and 202C function as whole blood separation via filtration, and finally, the second, third and/or fourth layers 204, 206, and/or 208A are hydrophilic membranes embedded in reagents embedded with the reducing and chelating agents for where the reaction takes place and a color change is detected.

Whole blood samples were collected with IRB study protocol (STUDY00008255). 50 ul of samples were applied onto the sampling port of the second-generation sensor and a smartphone measurement was obtained after five minutes. The same whole blood sample was then processed with a centrifuge and analyzed with the optimized reference method and statistical methods were used to measure agreement levels between the two methods.

Figure 28A:
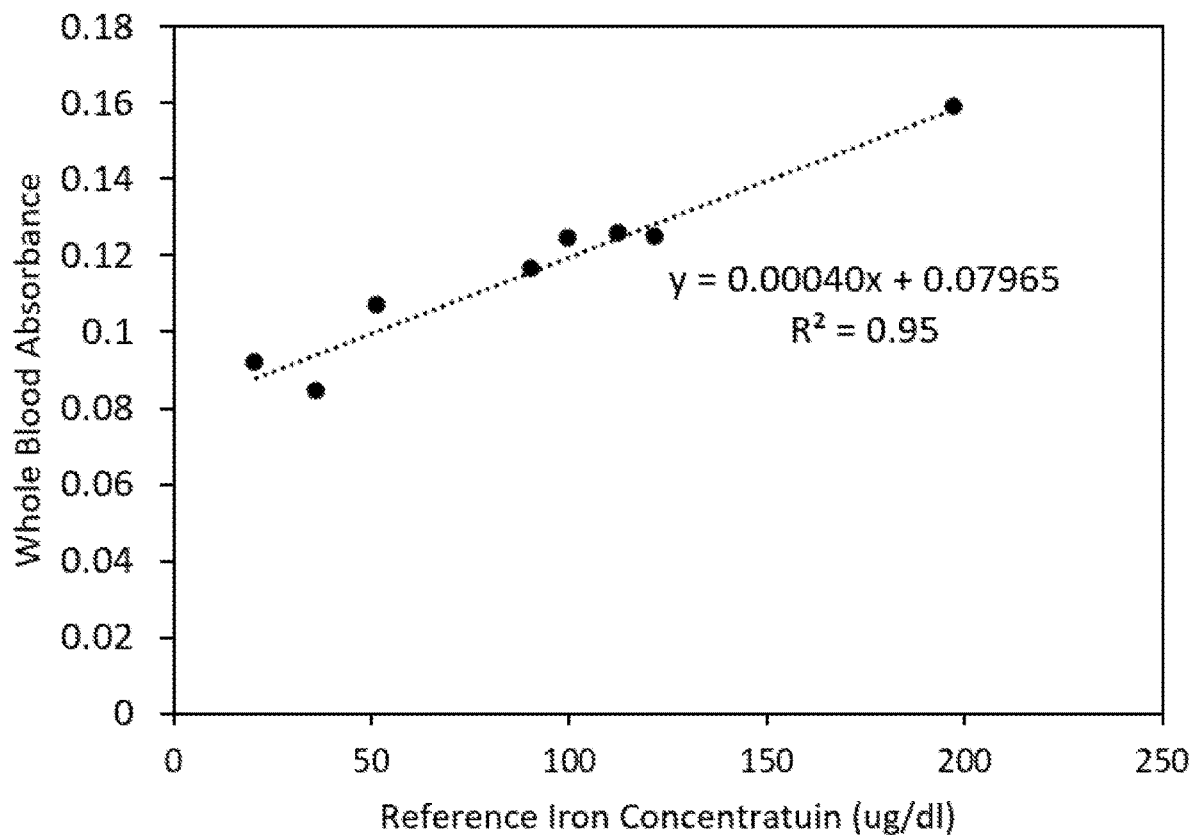
FIGS. 28A-28B illustrates a calibration curve between iron levels in whole blood and the optimized method (slope of 0.0004 and regression coefficient of 0.93) and a correlation plot (slope of 1.098 and regression coefficient of 0.96).
Figure 28B:
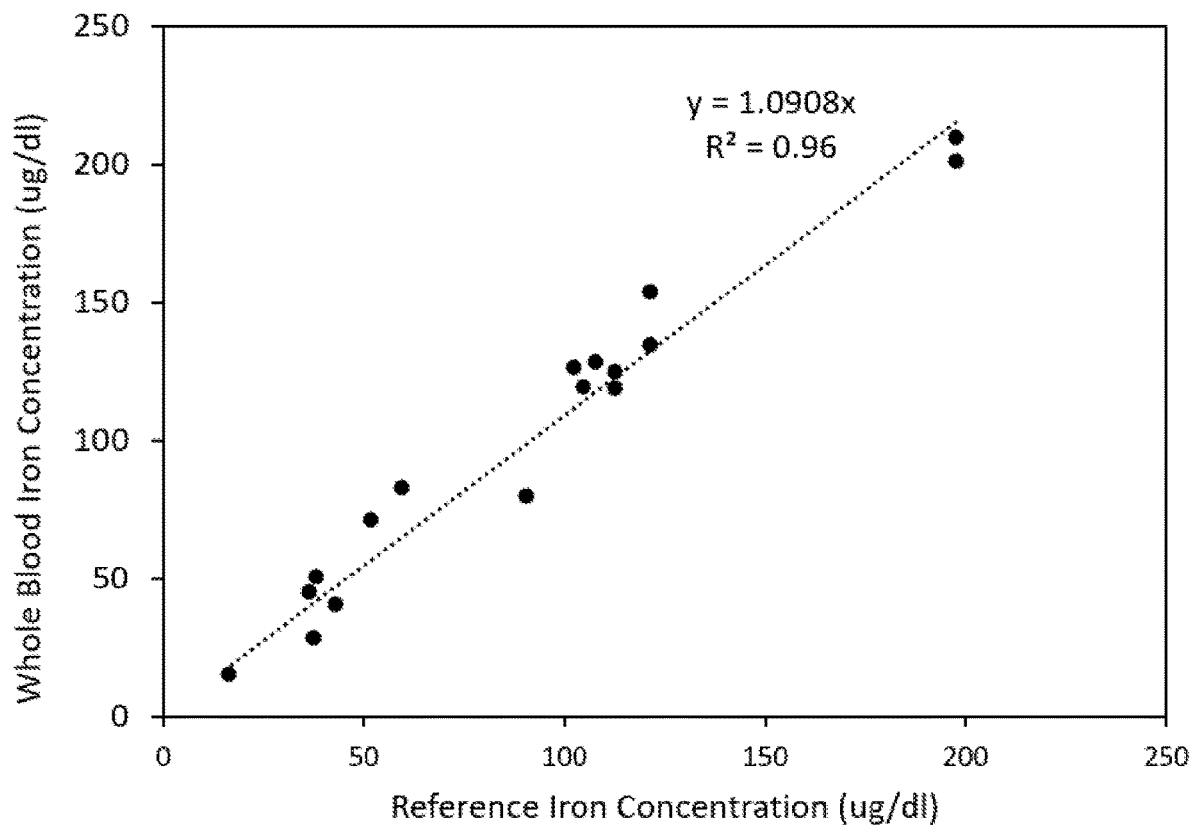
Figure 29:
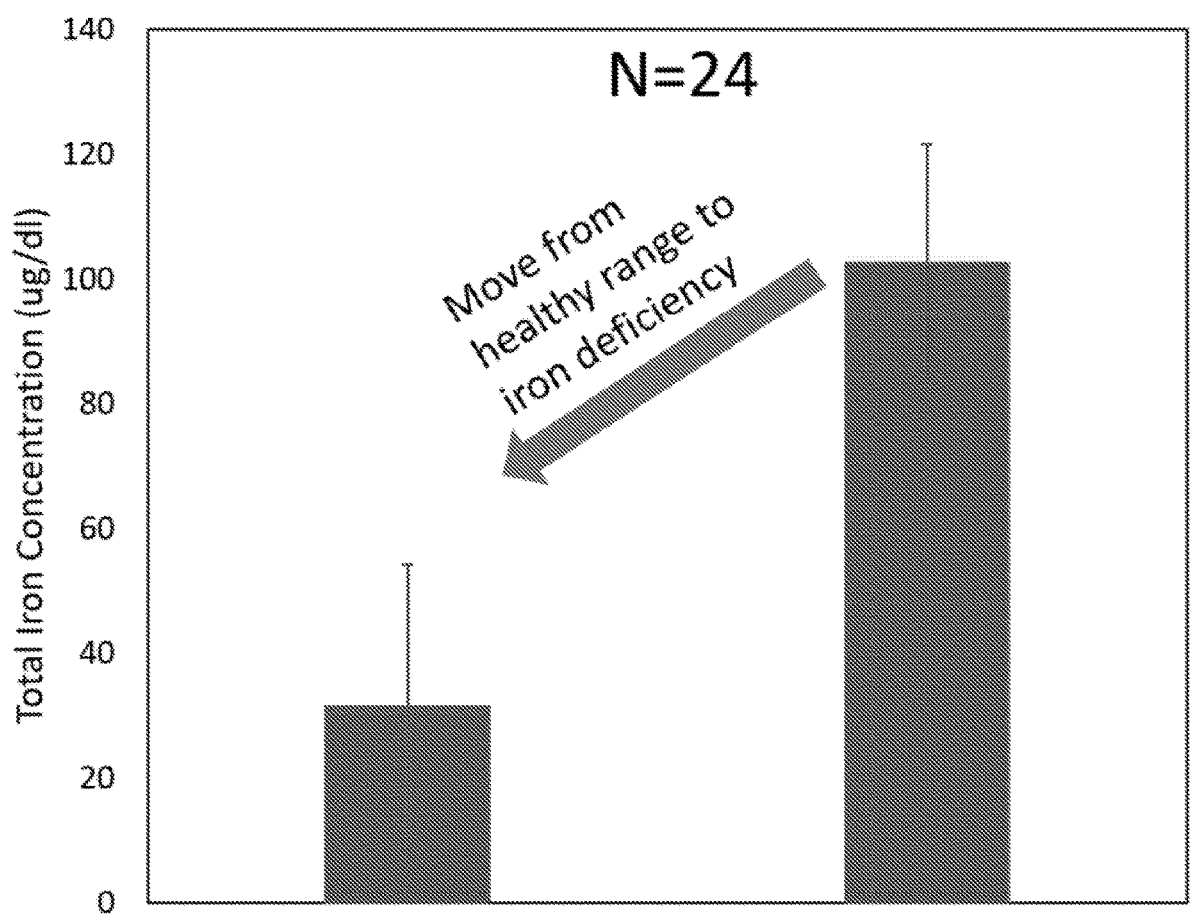
FIG. 29 illustrates a power law test for screening purposes where the device can distinguish between healthy and iron deficiency clinical cutoff values for total iron. A power of 1.0 was obtained.

A calibration curve between system output reading from whole blood samples and optimized spectrophotometric method is shown in FIG. 28A with regression coefficient of 0.95 and sensitivity of 0.0004 absorbance unit/ug/dl. With this calibration curve, several independent samples were utilized to interrogate the new system 200's iron concentration, a correlation plot between the two methods was determined with slope of 0.96 and regression coefficient of 0.95 indicating that the device output is in good agreement with the optimized method shown in FIG. 28B.

An alternative analysis method was used for screening application. Based on measurements obtained with the optimized method (reference spectrophotometer), the data was separated into three different categories: risk of iron deficiency (<60 ug/dl), healthy iron levels (60 ug/dl-150 ug/dl) and iron overload (>150 ug/dl). Then, a power law test was conducted with the corresponding experimental data to test if the device 200 can statistically distinguish between the different means. For example, a power of 1.0 for 24 samples indicated that the device can discriminate between the healthy and iron deficient range.

It should be understood from the foregoing that, while particular aspect have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for measuring the concentration of iron and total iron binding capacity in a body fluid sample, the system comprising:
   a sensor strip comprising:
      a first layer comprising a screening film operable to receive the body fluid sample;
      a second layer adjacent to the first layer, the second layer comprising a first reagent for reducing iron (III) to iron (II) in the body fluid sample;
      a third layer adjacent to the second layer, the third layer comprising a sensing area comprising a second reagent for chelating iron (II) to form a chromogen complex and a reference area without a reagent modification, wherein formation of the chromogen complex causes a color change to the sensor strip that correlates with the concentration of iron in the body fluid sample;
a fourth layer operable as a detection sink;
a fifth layer saturated with iron; and
a sixth layer saturated with magnesium carbonate for measuring total iron binding capacity; and
a processor configured for use in conjunction with the sensor strip, including instructions which, when executed, cause the processor to:
receive light intensity data comprising light intensities from the sensor strip after the body fluid sample is placed on the sensor strip and causes a color change to the sensor strip;
extract red-green-blue (RGB) component values or red spectrum light intensities from the light intensity data of the sensor strip;
calculate the absorbance of the RGB component values or red spectrum light intensities for the sensor strip; and
calculate iron concentration in the body fluid sample in the sensor strip from the absorbance of the RGB component values or red spectrum light intensity for the sensor strip.

2. The system of claim 1, wherein the first reagent comprises a reducing agent, an acid, a chelating agent, or combinations thereof, and the second reagent comprises a Ferene.

3. The system of claim 2, wherein the reducing agent is ascorbic acid, the acid is citric acid, and the chelating agent is thiourea.

4. The system of claim 1, further comprising a device, comprising a window for a light detector, a recess configured for receiving the sensor strip, and a plurality of LED lights.

* * * * *